United States Patent
Kim et al.

(10) Patent No.: US 11,368,867 B2
(45) Date of Patent: Jun. 21, 2022

(54) METHOD AND APPARATUS FOR COMMUNICATION IN NEXT GENERATION MOBILE COMMUNICATION SYSTEM

(71) Applicant: Samsung Electronics Co., Ltd., Suwon-si (KR)

(72) Inventors: Sangbum Kim, Suwon-si (KR); Soenghun Kim, Suwon-si (KR); Sangyeob Jung, Suwon-si (KR); Suyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 16/779,490

(22) Filed: Jan. 31, 2020

(65) Prior Publication Data

US 2020/0252822 A1 Aug. 6, 2020

(30) Foreign Application Priority Data

Feb. 1, 2019 (KR) .......................... 10-2019-0013777

(51) Int. Cl.
*G01R 31/08* (2020.01)
*G06F 11/00* (2006.01)
*H04W 24/10* (2009.01)
*H04W 76/15* (2018.01)
*H04L 5/00* (2006.01)
*H04W 24/08* (2009.01)

(52) U.S. Cl.
CPC ........... *H04W 24/10* (2013.01); *H04L 5/0048* (2013.01); *H04W 24/08* (2013.01); *H04W 76/15* (2018.02)

(58) Field of Classification Search
CPC ..... H04W 24/10; H04W 76/15; H04W 24/08; H04L 5/0048
USPC ........................................................ 370/252
See application file for complete search history.

(56) References Cited

U.S. PATENT DOCUMENTS

| 2012/0082051 A1 | 4/2012 | Kim et al. | |
| 2019/0045568 A1* | 2/2019 | Palat | H04W 76/18 |
| 2020/0044806 A1* | 2/2020 | Jassal | H04L 5/0053 |

OTHER PUBLICATIONS

Huawei (R2-1817864, "correction of frequency band indication in MeasObjectNR", Nov. 12-16, 2018) (Year: 2018).*

(Continued)

*Primary Examiner* — Maharishi V Khirodhar

(57) ABSTRACT

A method performed by a terminal according to the disclosure may comprise: receiving configuration information related to a measurement including measurement object information, wherein the measurement object information including a frequency of a synchronization signal block (SSB) and a measurement timing configuration information of the SSB; determining a reference cell to which the measurement timing configuration information of the SSB is applied based on a type of a signaling radio bearer (SRB) for which the configuration information is provided; measuring the SSB on the frequency of the SSB based on the reference cell and the measurement timing configuration information of the SSB; and transmitting a measurement report including a measurement result of the SSB on the frequency of the SSB.

16 Claims, 36 Drawing Sheets

(56) References Cited

OTHER PUBLICATIONS

MediaTek Inc. (R2-1816914, "Frequency band indication in MeasObjectNR", Nov. 12-16, 2018) (Year: 2018).*
Ericsson (R2-1812014, Aug. 20-24, 2018, support for SRBs for NE-DC and NGEN-DC) (Year: 2018).*
Of Ericsson ("R1-1809734, impact of dual SMTC on measurement procedures", Aug. 20-24, 2018) (Year: 2018).*

* cited by examiner

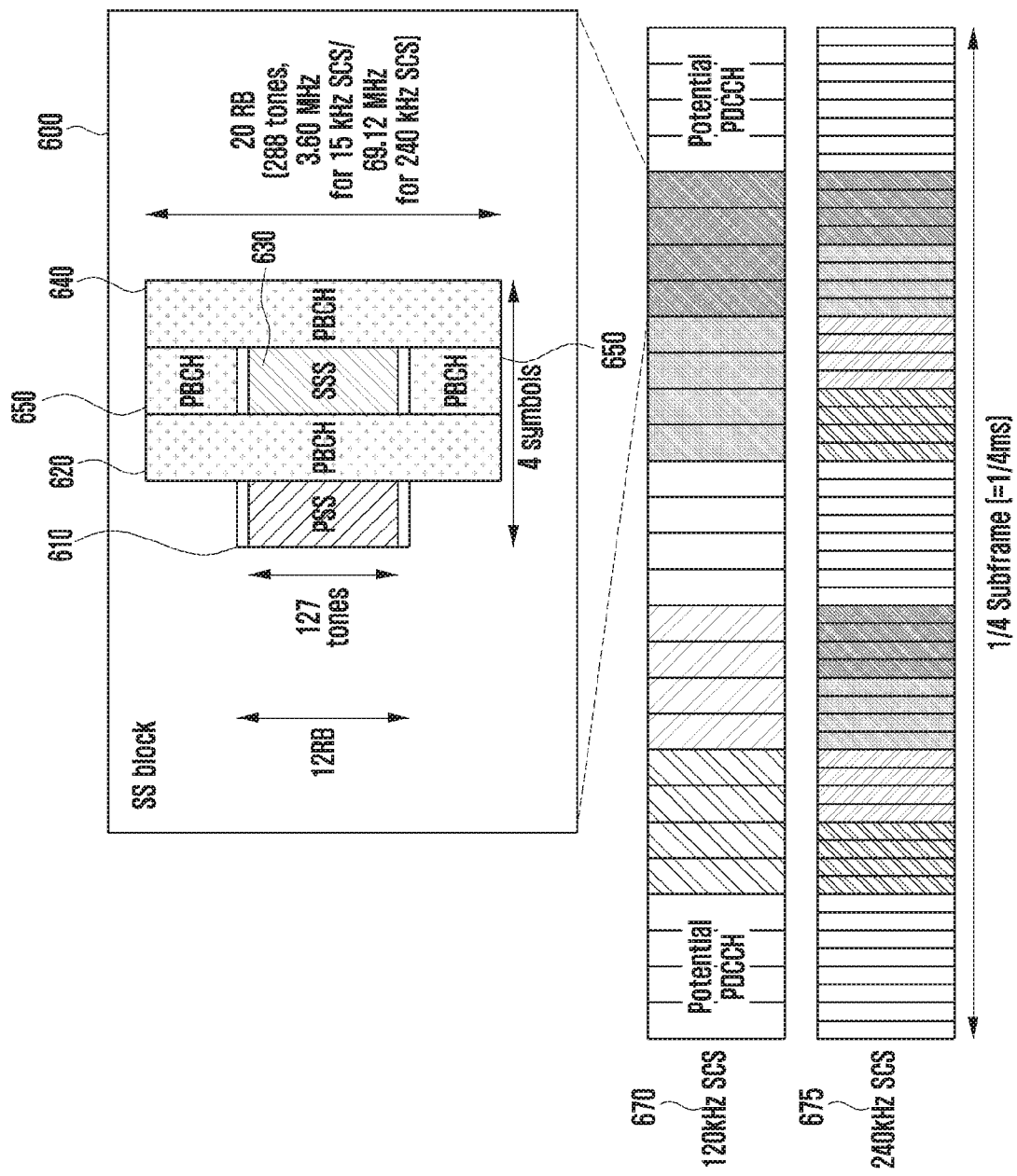

FIG. 1A1
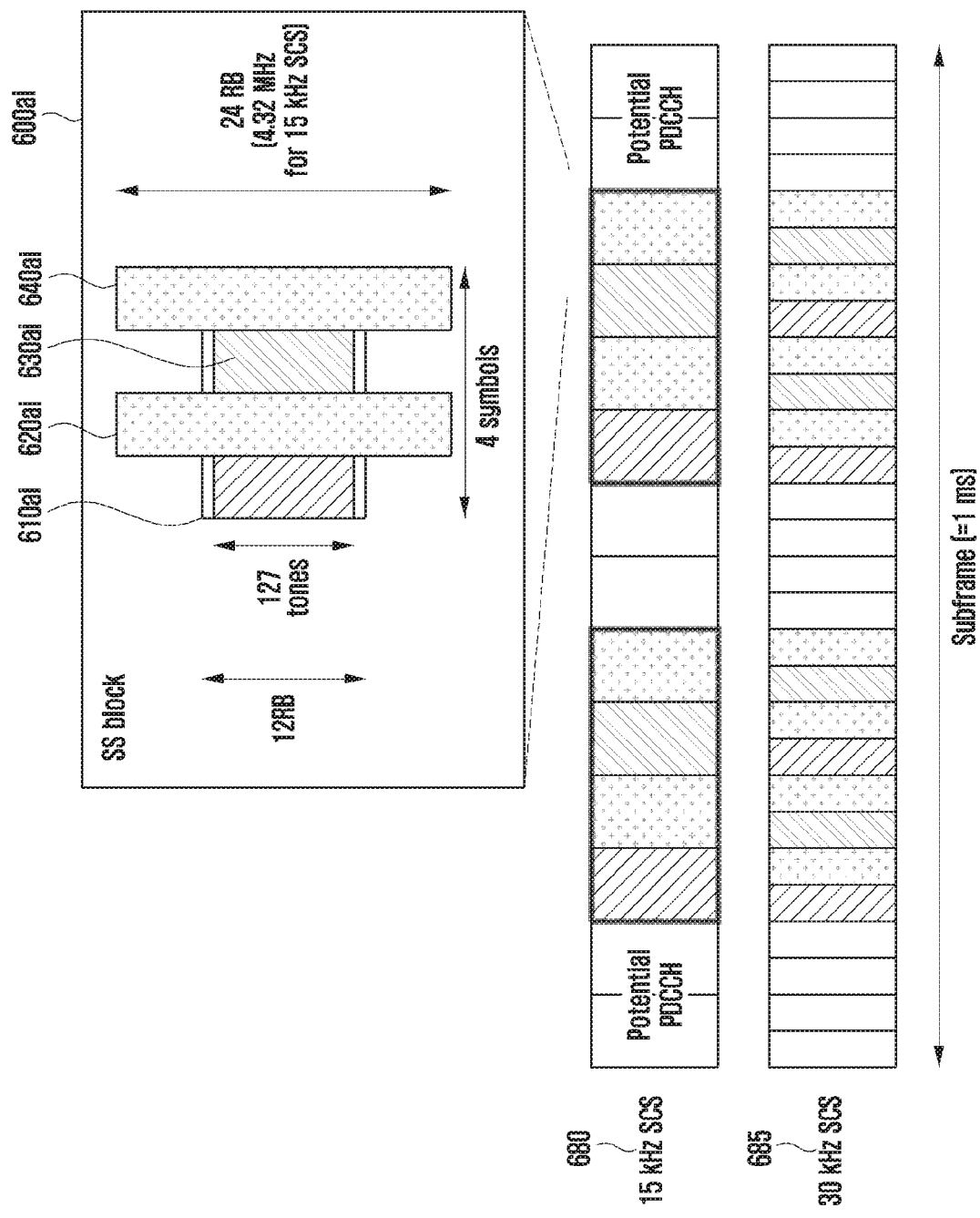

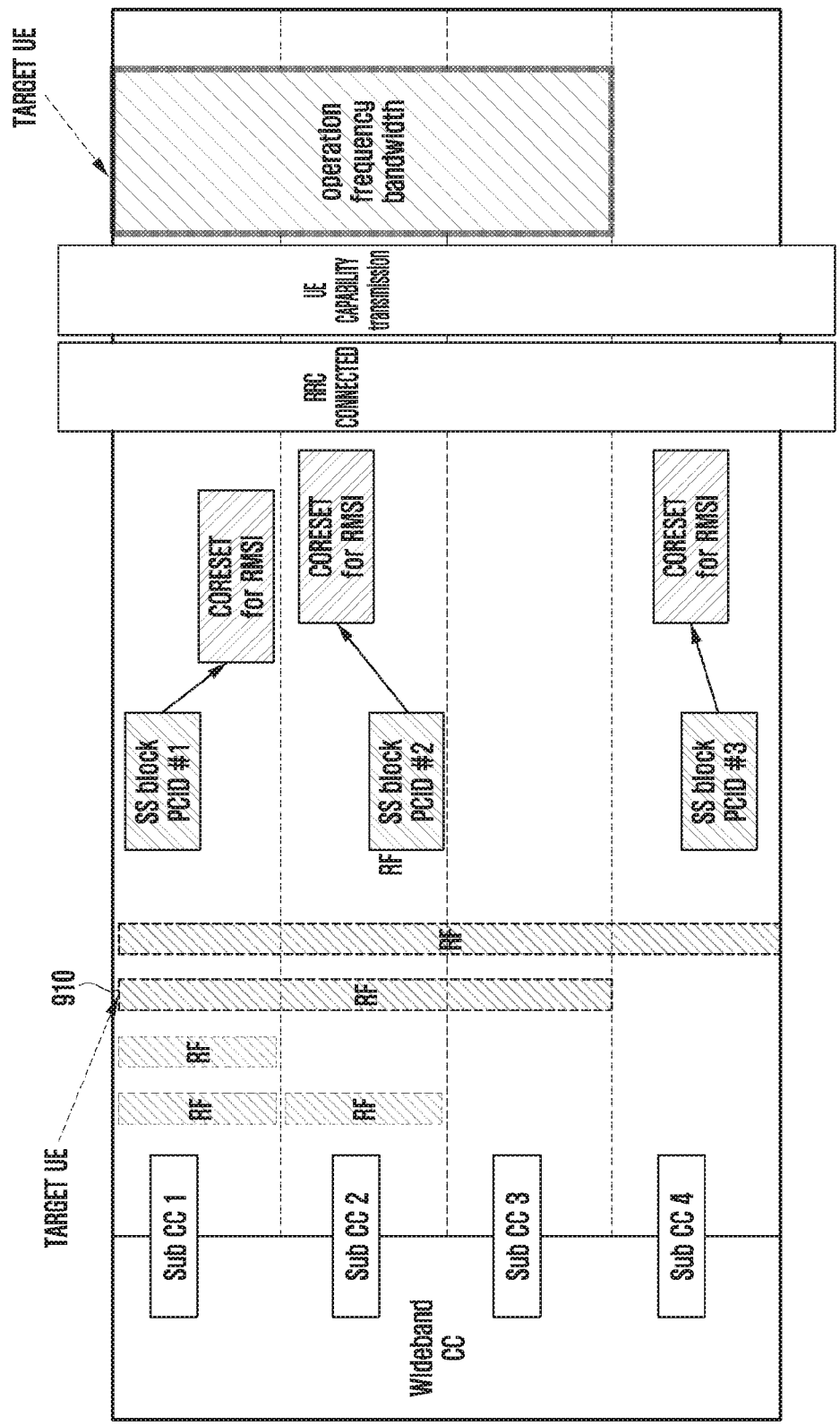

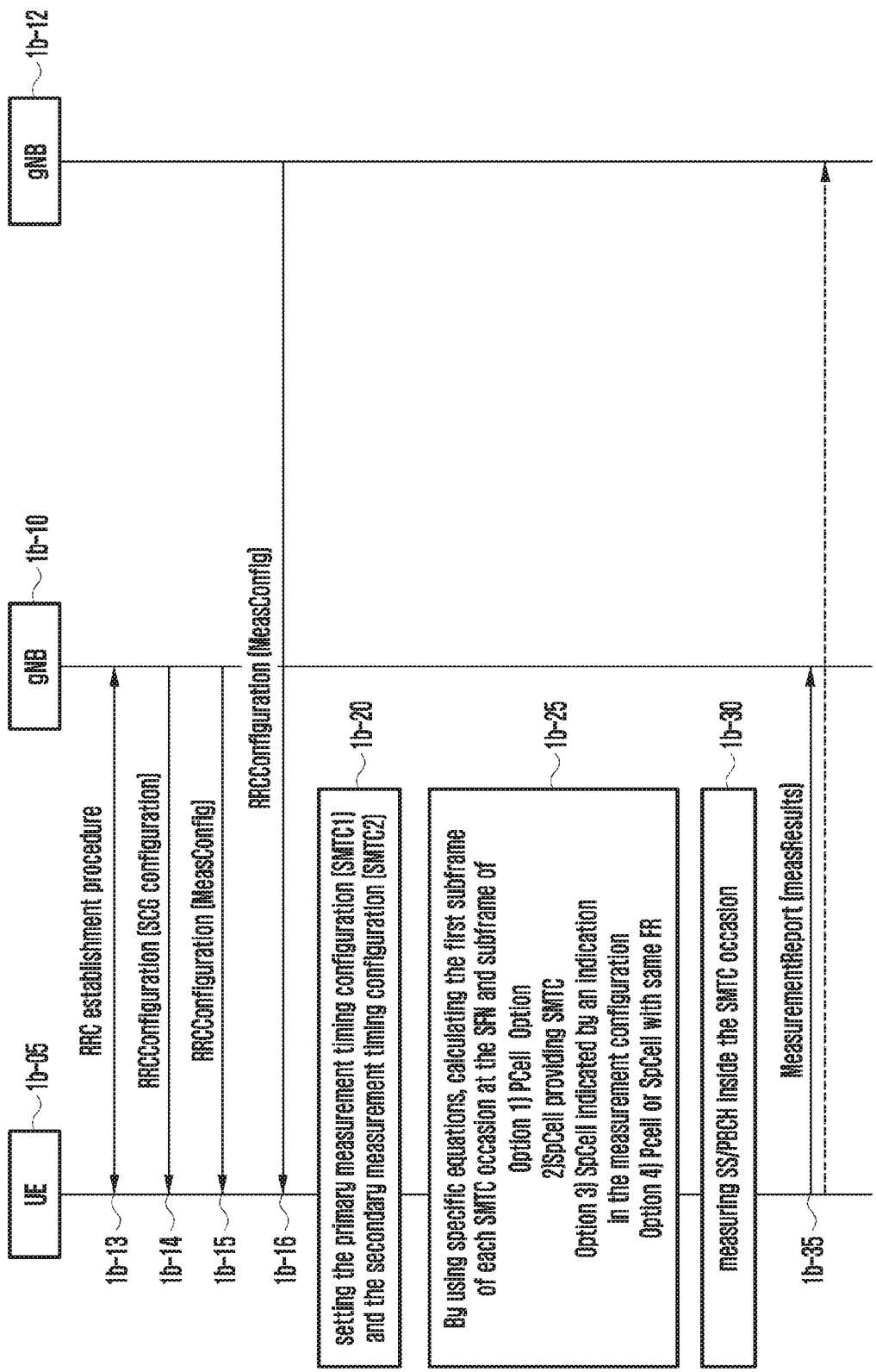

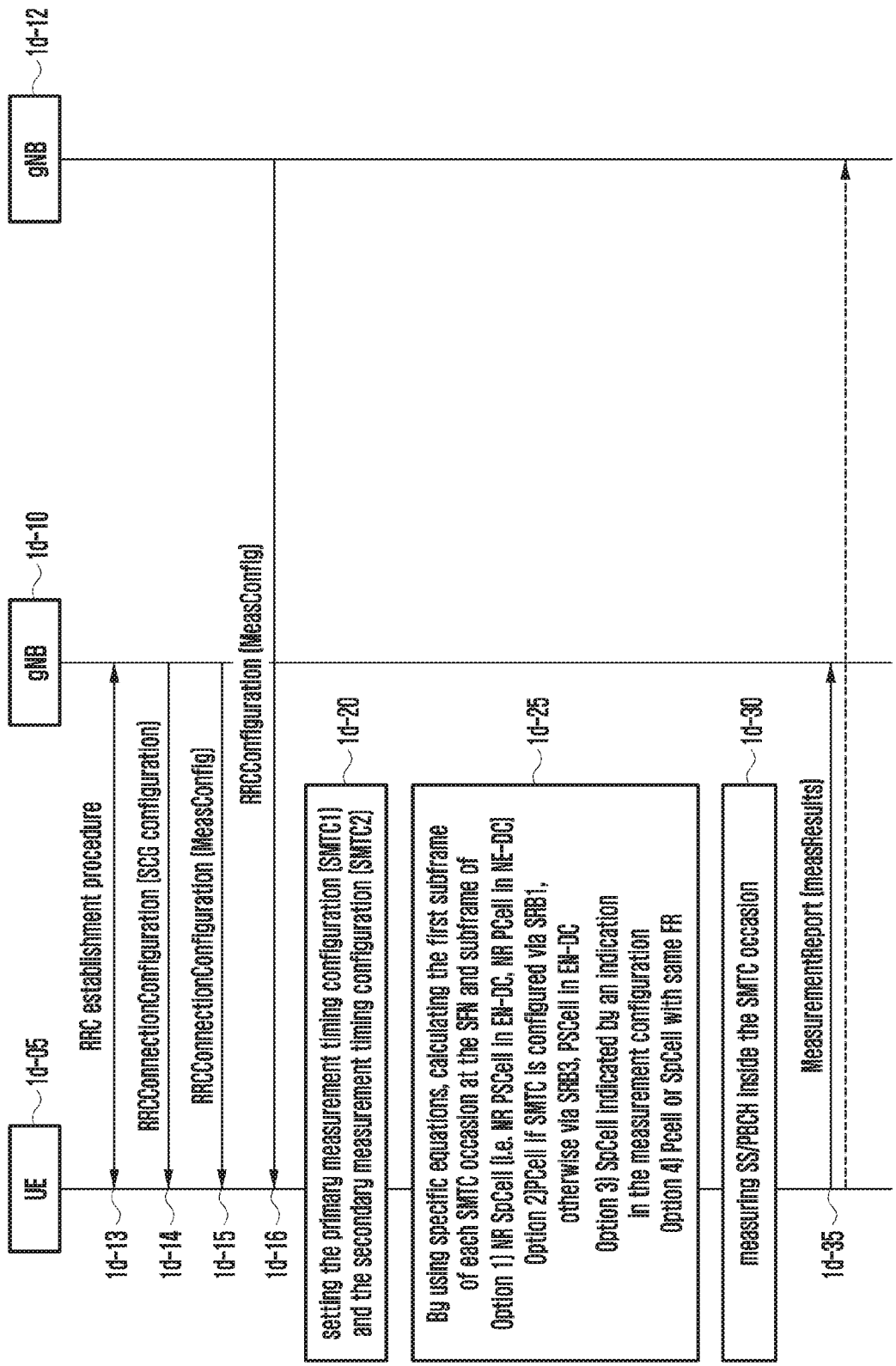

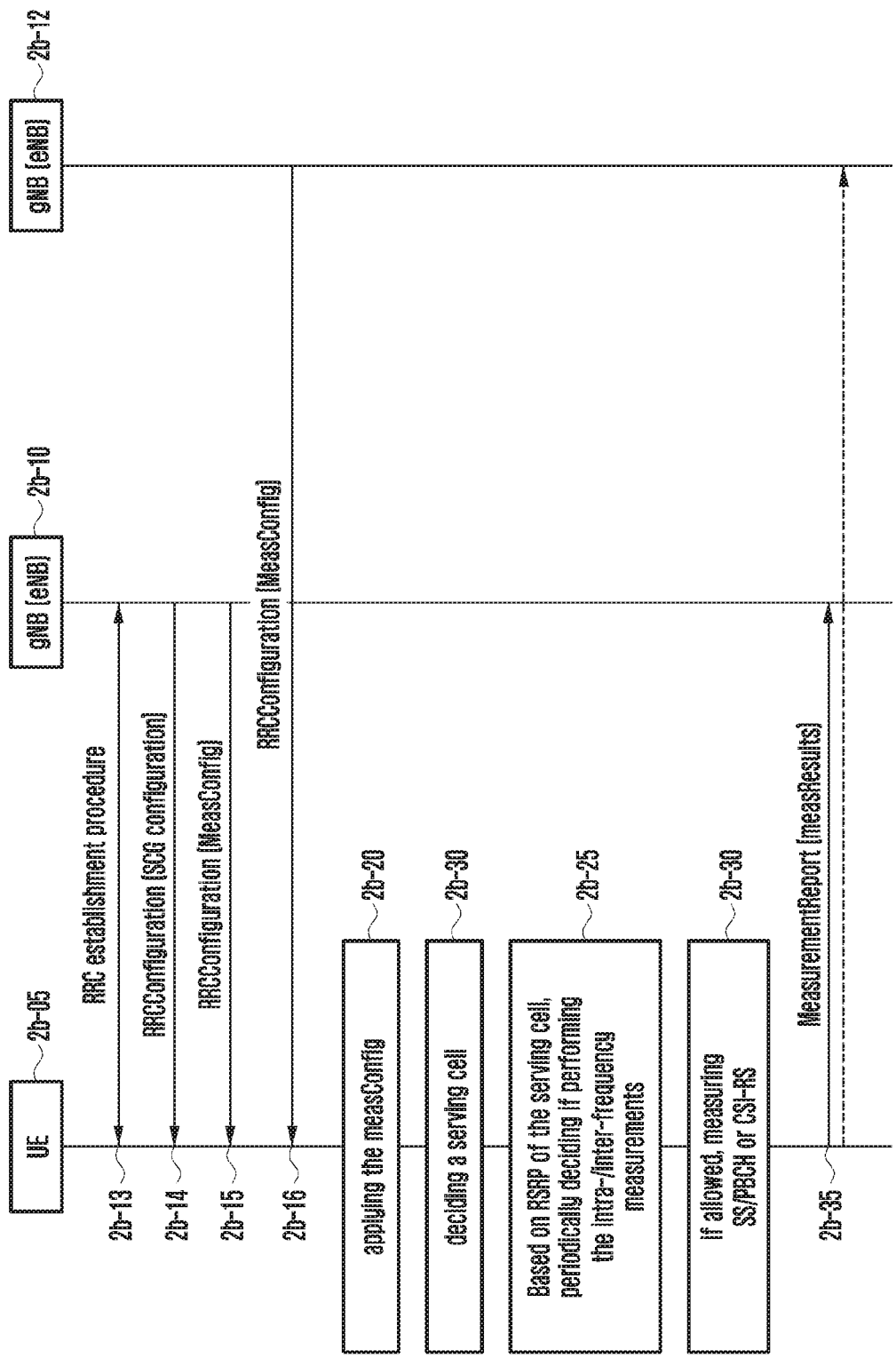

METHOD AND APPARATUS FOR COMMUNICATION IN NEXT GENERATION MOBILE COMMUNICATION SYSTEM

CROSS-REFERENCE TO RELATED APPLICATION

This application is based on and claims priority under 35 U.S.C. 119 from Korean Patent Application No. 10-2019-0013777 filed on Feb. 1, 2019 in the Korean Intellectual Property Office, the disclosure of which is herein incorporated by reference in its entirety.

BACKGROUND

1. Field

The disclosure relates to the operation of a terminal and a base station in a mobile communication system. The disclosure relates to a method and an apparatus for providing synchronization signal (SS)/physical broadcast channel (PBCH) block configuration information in a next-generation mobile communication system. In addition, the disclosure relates to a method and an apparatus for performing a cell measurement operation in order to minimize power consumption by a terminal in a next-generation mobile communication system. Further, the disclosure relates to a method and an apparatus for reporting a measurement result by a terminal supporting dual connectivity in a next-generation mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide a method and an apparatus for providing SS/PBCH block configuration information in a next-generation mobile communication system. Another aspect of the disclosure is to provide a method and an apparatus for performing a cell measurement operation in order to minimize power consumption by a terminal in a next-generation mobile communication system. Another aspect of the disclosure is to provide a method and an apparatus for reporting a measurement result by a terminal supporting dual connectivity in a next-generation mobile communication system.

An embodiment may provide a method performed by a terminal, the method comprising: receiving configuration information related to a measurement including measurement object information, wherein the measurement object information includes a frequency of a synchronization signal block (SSB) and a measurement timing configuration information of the SSB; determining a reference cell to which the measurement timing configuration information of the SSB is applied based on a type of a signaling radio bearer (SRB) for which the configuration information is provided; measuring the SSB on the frequency of the SSB based on the reference cell and the measurement timing configuration information of the SSB; and transmitting a measurement report including a measurement result of the SSB on the frequency of the SSB.

Further, an embodiment may provide a terminal comprising: a transceiver; and a controller configured to: receive, via the transceiver, configuration information related to a measurement including measurement object information, wherein the measurement object information includes a frequency of a synchronization signal block (SSB) and a measurement timing configuration information of the SSB, determine a reference cell to which the measurement timing configuration information of the SSB is applied based on a type of a signaling radio bearer (SRB) for which the configuration information is provided, measure the SSB on the frequency of the SSB based on the reference cell and the measurement timing configuration information of the SSB, and transmit, via the transceiver, a measurement report including a measurement result of the SSB on the frequency of the SSB.

Still, further, an embodiment may provide a method performed by a base station, the method comprising: transmitting, to a terminal configured with a dual connectivity (DC), configuration information related to a measurement including measurement object information, wherein the measurement object information includes a frequency of a synchronization signal block (SSB) and a measurement timing configuration information of the SSB; receiving, from the terminal, a measurement report including a measurement result of the SSB on the frequency of the SSB, wherein the measurement result is obtained based on a measurement of the SSB on the frequency of the SSB according to a reference cell and the configuration information, and wherein the reference cell to which the measurement timing configuration information of the SSB is applied is determined based on a type of a signaling radio bearer (SRB) for which the configuration information is provided.

Still, further, an embodiment may provide a terminal comprising: a transceiver; and a controller configured to: transmit, to a terminal configured with a dual connectivity (DC) via the transceiver, configuration information related to a measurement including measurement object information, wherein the measurement object information includes a frequency of a synchronization signal block (SSB) and a measurement timing configuration information of the SSB, and receive, from the terminal via the transceiver, a measurement report including a measurement result of the SSB on the frequency of the SSB, wherein the measurement result is obtained based on a measurement of the SSB on the frequency of the SSB according to a reference cell and the configuration information, and wherein the reference cell to which the measurement timing configuration information of the SSB is applied is determined based on a type of a signaling radio bearer (SRB) for which the configuration information is provided.

The technical subjects pursued in the disclosure may not be limited to the above mentioned technical subjects, and other technical subjects which are not mentioned may be clearly understood, through the following descriptions, by those skilled in the art of the disclosure.

According to embodiments of the disclosure, it is possible to provide a method and an apparatus for providing SS/PBCH block configuration information in a next-generation mobile communication system. In addition, according to embodiments of the disclosure, it is possible to provide a method and an apparatus for performing a cell measurement operation in order to minimize power consumption by a terminal in a next-generation mobile communication system. Further, according to embodiments of the disclosure, it is possible to provide a method and an apparatus for reporting a measurement result by a terminal supporting dual connectivity in a next-generation mobile communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1AB illustrates a diagram of an NR-DC structure according to an embodiment;

FIG. 1AC illustrates a diagram of an NR-DC structure according to an embodiment;

FIG. 1AD(a) illustrates a diagram of bandwidth parts (BWPs) according to an embodiment, FIG. 1AD(b) illustrates a diagram of bandwidth parts (BWPs) according to an embodiment, and FIG. 1AD(c) illustrates a diagram of bandwidth parts (BWPs) according to an embodiment;

FIG. 1AE illustrates a diagram of a BWP according to an embodiment;

FIG. 1AF illustrates a diagram of a radio protocol structure in an LTE system according to an embodiment;

FIG. 1AG illustrates a diagram of a radio protocol structure of a next-generation mobile communication system according to an embodiment;

FIG. 1AH illustrates a diagram of an SS/PBCH block according to an embodiment;

FIG. 1AI illustrates a diagram of an SS/PBCH block according to an embodiment;

FIG. 1AJ illustrates a diagram of an SS/PBCH block according to an embodiment;

FIG. 1AK illustrates a diagram of a method of transmitting an SS/PBCH block according to an embodiment;

FIG. 1AL illustrates a diagram of a frame structure according to an embodiment;

FIG. 1AM illustrates a diagram of an initial access procedure according to an embodiment;

FIG. 1B illustrates a flowchart of a process for deriving SS/PBCH block measurement timing in NR-DC (dual connectivity) according to an embodiment;

FIG. 1D illustrates a flowchart of a process of deriving SS/PBCH block measurement timing in EN-DC (NE-DC) according to an embodiment;

FIG. 2AB illustrates a diagram of a radio protocol structure in an LTE system according to an embodiment;

FIG. 2AC illustrates a diagram of a radio protocol structure of a next-generation mobile communication system according to an embodiment;

FIG. 2B illustrates a flowchart of a process of performing a cell measurement operation according to an embodiment;

DETAILED DESCRIPTION

Figure 1A:
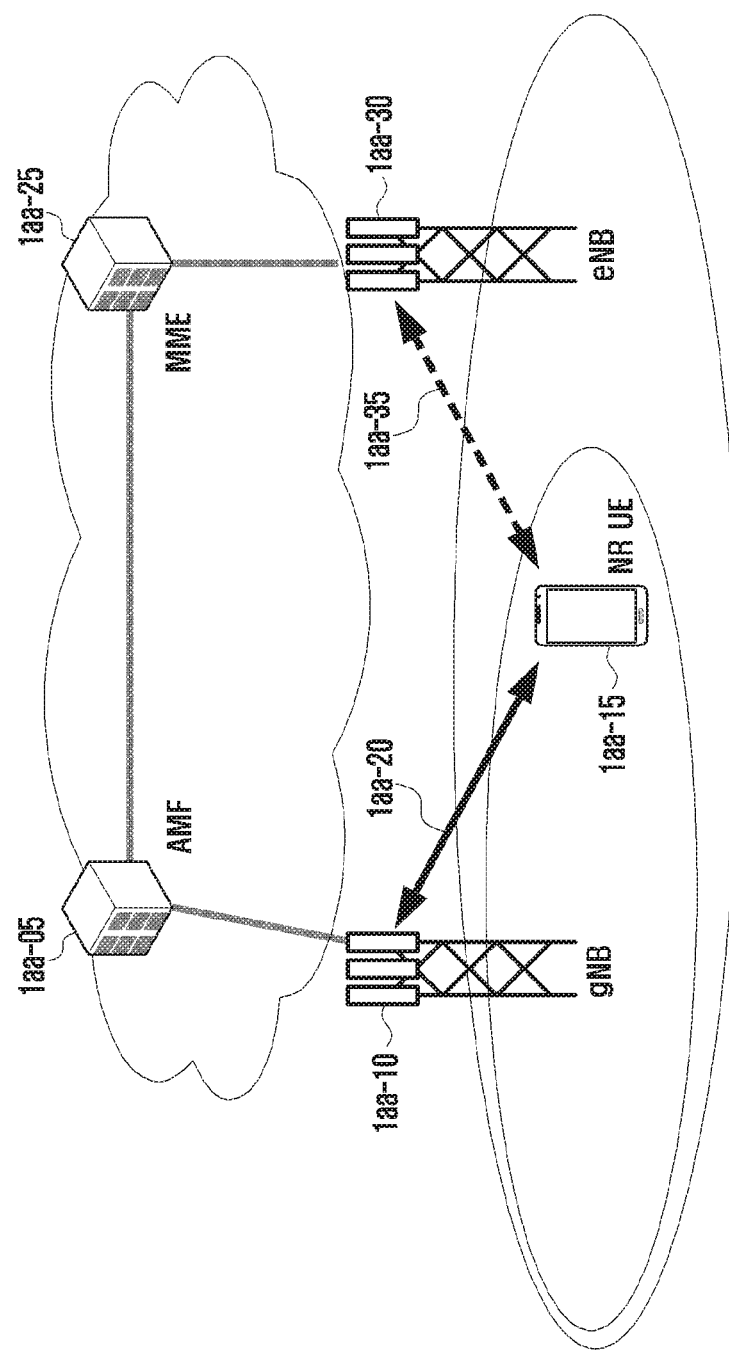
FIG. 1AA illustrates a diagram of the structure of a next-generation mobile communication system according to an embodiment.
Figure 1A:
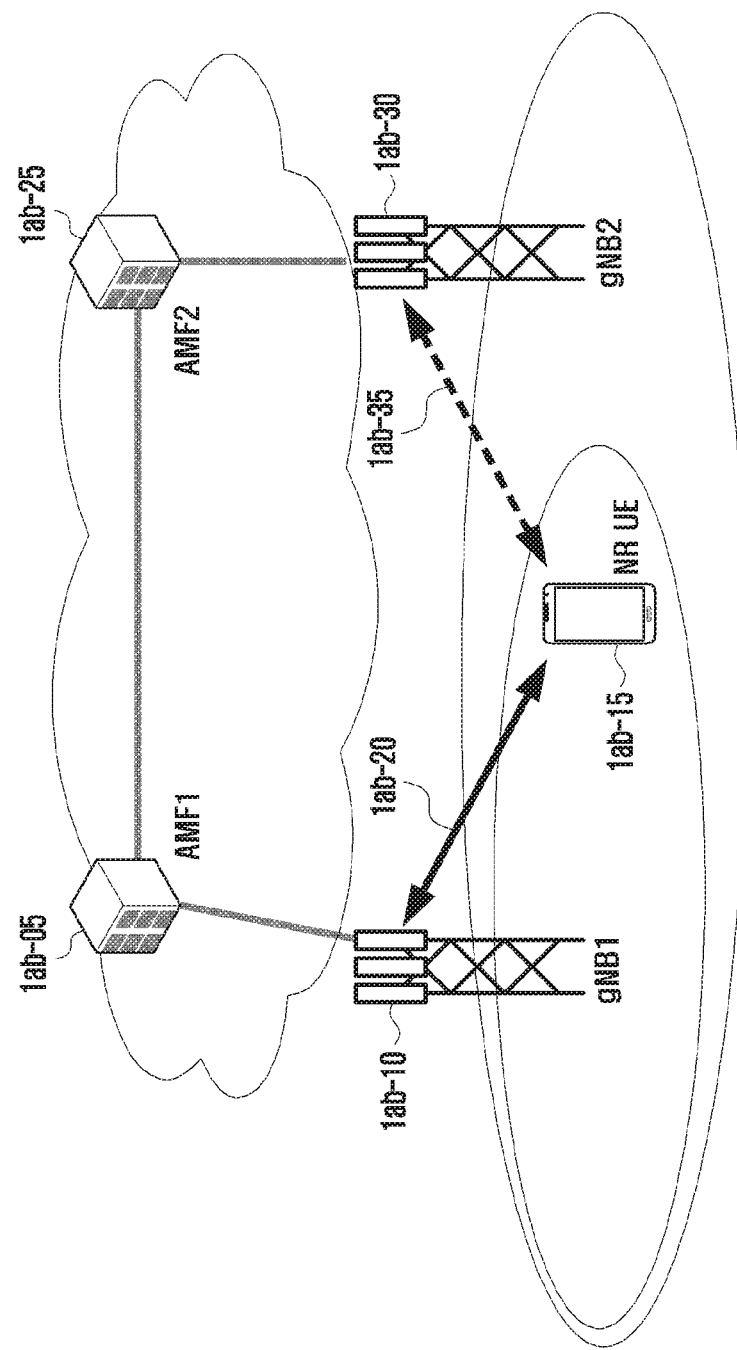
Figure 1A:
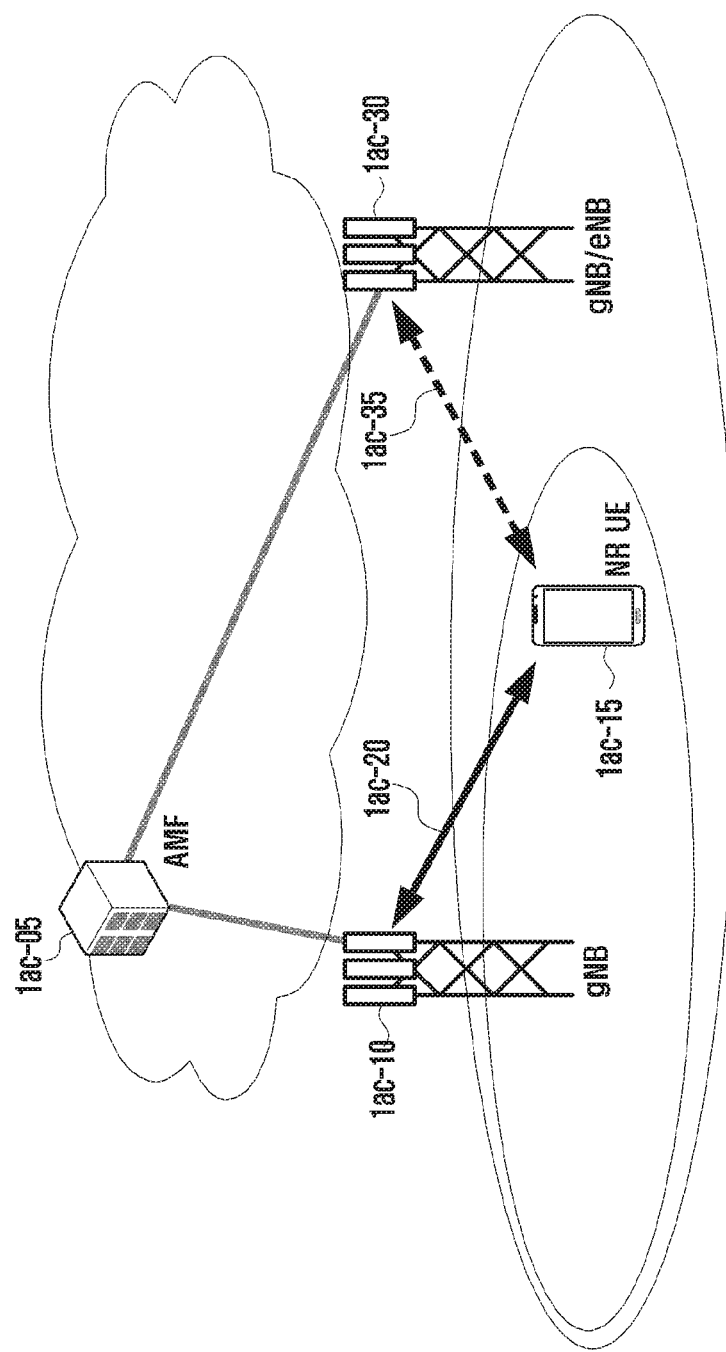
Figure 1A:
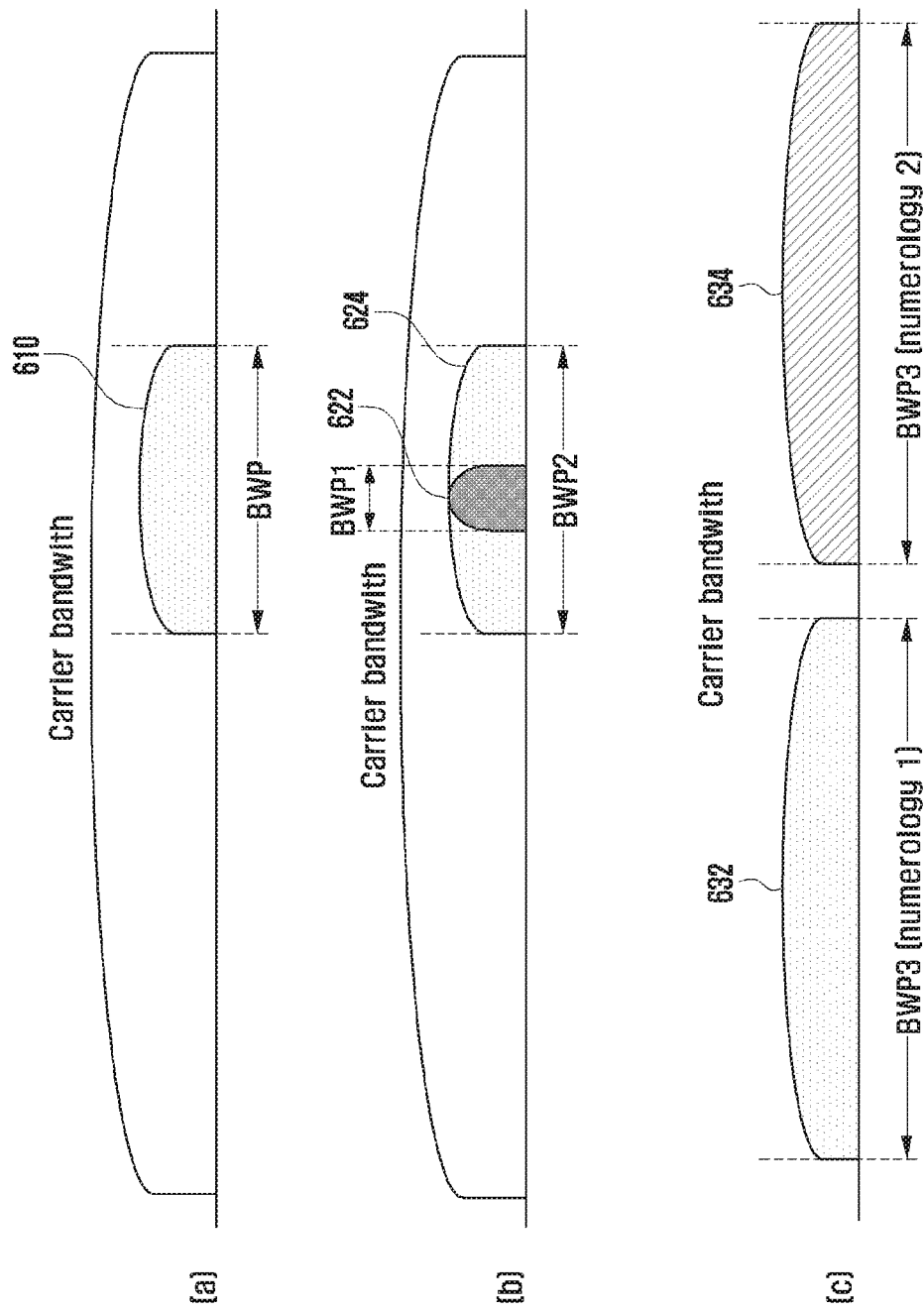
Figure 1A:
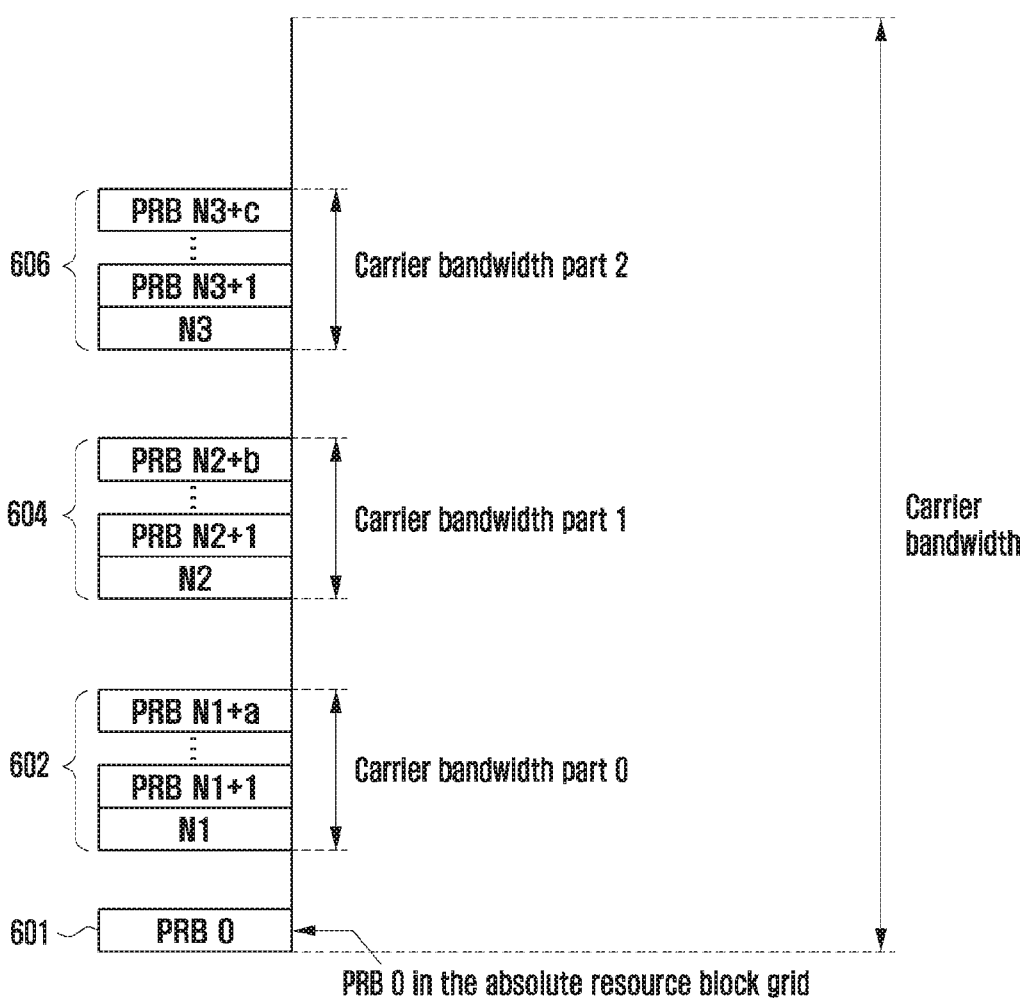
Figure 1A:
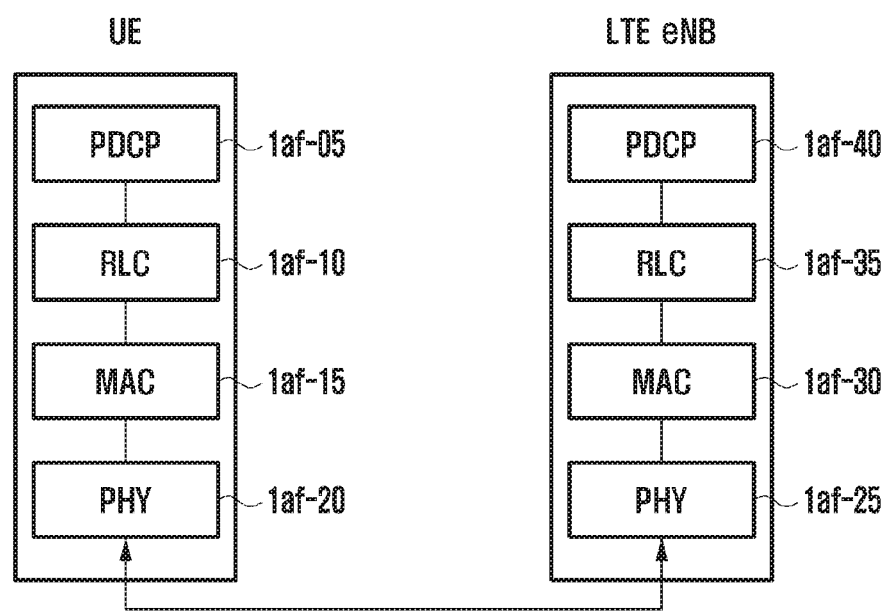
Figure 1A:
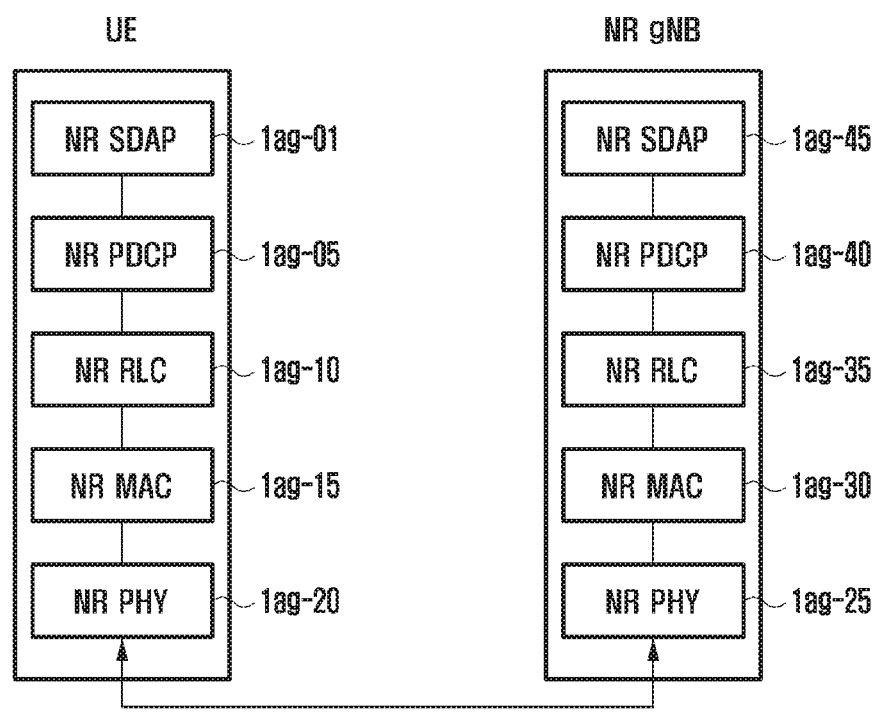
Figure 1A:
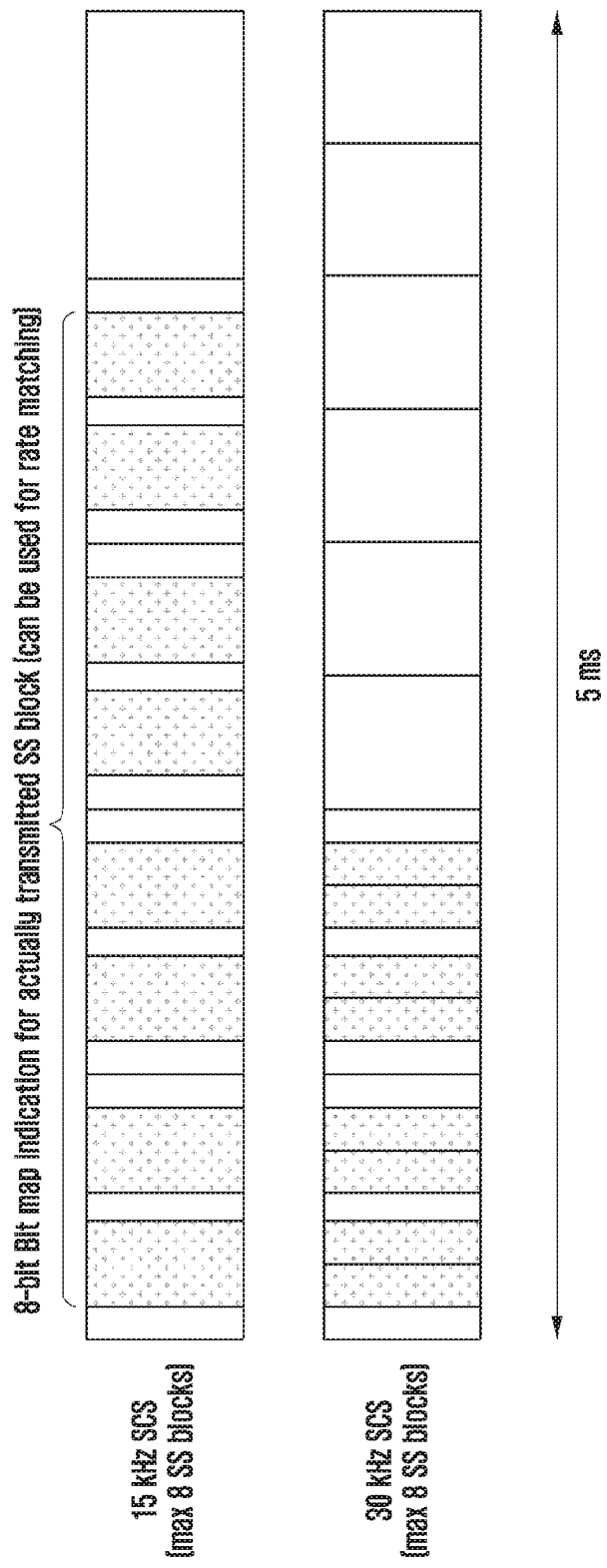
Figure 1A:
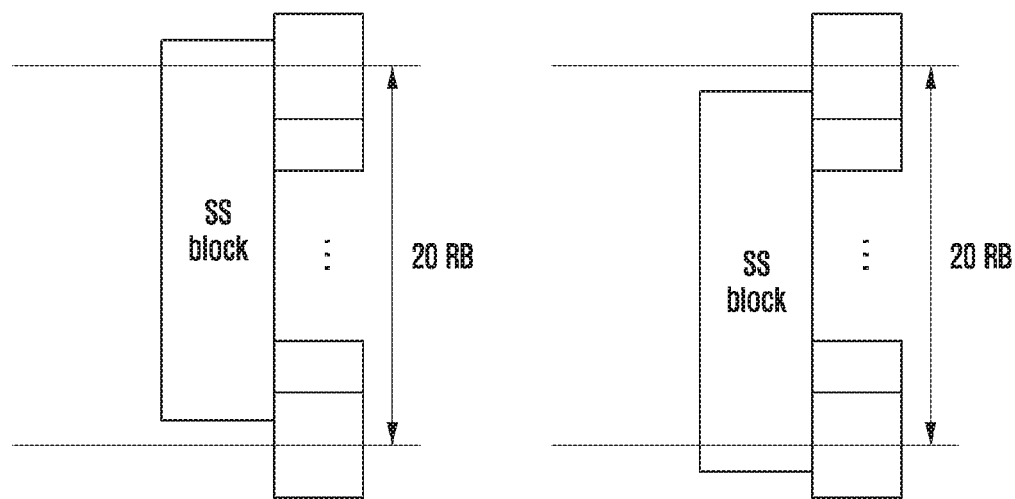
Figure 1A:
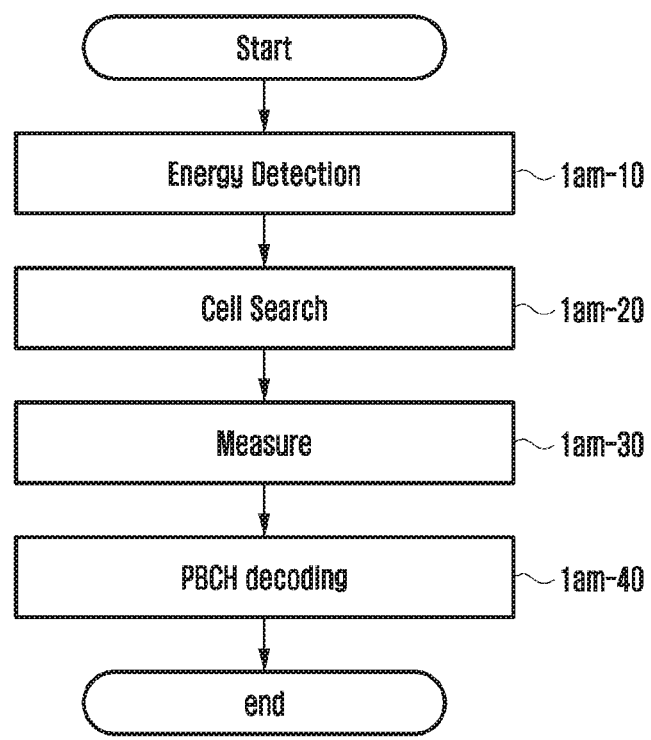

FIGS. 1AA through 3I, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, preferred embodiments of the disclosure will be described in detail with reference to the accompanying drawings. Here, it is noted that identical reference numerals denote the same structural elements in the accompanying drawings. Further, a detailed description of well-known functions and configurations incorporated herein will be omitted when it makes the subject matter of the disclosure rather unclear.

In a description of embodiments of the disclosure, a description of technologies that are already known to those skilled in the art and are not directly relevant to the disclosure is omitted. Such an omission of unnecessary descriptions is intended to prevent obscuring of the main idea of the disclosure and more clearly transfer the main idea.

For the same reason, some components are exaggerated, omitted, or schematically illustrated in the accompanying drawings. In addition, the size of each component does not fully reflect the actual size, and the same or corresponding components in the drawings are given the same reference numeral.

However, the disclosure is not limited to the embodiments disclosed below, but may be implemented in various different forms. The embodiments are provided to completely disclose the disclosure and fully convey the scope of the disclosure to those skilled in the art, and the disclosure is to be defined only by the scope of the claims. Like reference numerals refer to like elements throughout the specification.

First Embodiment

A first embodiment relates to a method and an apparatus for providing synchronization signal (SS)/physical broadcast channel (PBCH) block configuration information in a next-generation mobile communication system.

FIG. 1AA illustrates a diagram of the structure of a next-generation mobile communication system according to an embodiment.

Referring to FIG. 1AA, a radio access network of a next-generation mobile communication system {new radio (NR)} includes a new radio node B (hereinafter, referred to as a "gNB") 1aa-10, an access and mobility management entity (AMF) 1aa-05 (a new radio core network), as shown in the drawing. A new radio user equipment (hereinafter, referred to as an "NR UE" or a "terminal") 1aa-15 accesses an external network through the gNB 1aa-10 and the AMF 1aa-05.

In FIG. 1AA, the gNB 1aa-10 corresponds to an evolved node B (eNB) of an existing LTE system. The gNB 1aa-10 is connected to the NR UE 1aa-15 through a radio channel (1aa-20), and may provide services superior to those of the existing node B. In the next-generation mobile communication system, since all user traffic is served through a shared channel, a device for collecting status information, such as buffer status, available transmission power status, and channel status of UEs, and performing scheduling is required. The gNB 1aa-10 serves as such a device. One gNB typically controls multiple cells. In order to realize super-high data rates compared to existing LTE systems, the next-generation mobile communication system may have a bandwidth equal to or greater than the maximum bandwidth of existing systems, may use, as a radio access technique, orthogonal frequency division multiplexing (hereinafter, referred to as "OFDM"), and may further employ a beamforming technique in addition thereto. In addition, an adaptive modulation and coding (hereinafter, referred to as "AMC") scheme is applied to determine a modulation scheme and a channel coding rate in accordance with the channel status of a terminal.

The AMF 1aa-05 performs functions such as mobility support, bearer configuration, and quality-of-service (QoS) configuration. The AMF 1aa-05 is a device that performs various control functions, as well as a mobility management function for a terminal, and is connected to a plurality of base stations. In addition, the next-generation mobile communication system may interwork with an existing LTE system, and the AMF 1aa-05 is connected to the MME 1aa-25 through a network interface. The MME 1aa-25 is connected to the eNB 1aa-30, which is an existing base station. A terminal supporting LTE-NR dual connectivity may transmit/receive data to/from the eNB 1aa-30 while maintaining a connection to the eNB 1aa-30, as well as the gNB 1aa-10 (1aa-35).

FIGS. 1AB and 1AC illustrate an example of configuring NR-DC. As shown in the drawing, a radio access network of a next-generation mobile communication system {new radio (NR)} may include new radio node Bs (hereinafter, referred to as "gNB s") 1ab-10, 1ab-30, 1ac-10, and 1ac-30, AMFs 1ab-05, 1ab-25, and 1ac-05, and a new radio core network. New radio user equipment (hereinafter, referred to as "NR UE" or a "terminals") 1ab-15 or 1ac-15 accesses an external network through the gNBs 1ab-10 and 1ac-10 and the AMFs 1ab-05 and 1ac-05.

FIGS. 1AA, 1AB, and 1AC, the situation in which a macro cell and a pico cell are mixed may be considered. The macro cell is controlled by a macro base station and provides services over a relatively large area. On the other hand, the pico cell is controlled by a secondary base station {e.g., a secondary eNB (SeNB) or a secondary gNB (SgNB)} and typically provides services in a much smaller area than the macro cell. Although there is no strict criterion for distinguishing between the macro cell and the pico cell, for example, it may be assumed that the macro cell has an area of about 500 m in radius and the pico cell has an area of about several tens m in radius. In the embodiments, the pico cell will be used interchangeably with a small cell. Here, the macro cell may be an LTE base station (MeNB) or an NR base station (MgNB), and the pico cell may be an NR base station (SgNB) or an LTE base station (SeNB). In particular, a 5G base station supporting the pico cell may use a frequency band of 6 GHz or more.

In the embodiments, the situation in which the macro cell and the pico cell are mixed may be considered. The macro cell is controlled by a macro base station and provides service over a relatively large area. In this case, the macro cell may include an LTE base station (MeNB) and an LTE base station (SeNB). In another embodiment, the macro cell may include an LTE base station (MeNB) and an NR base station (SgNB). In another embodiment, the macro cell may include an NR base station (MgNB) and an LTE base station (SeNB). In another embodiment, the macro cell may include an NR base station (MgNB) and an NR base station (SgNB).

Both a 4G system (LTE) and a 5G system are based on orthogonal frequency-division multiplexing (OFDM). LTE has a fixed subcarrier spacing (SCS) of 15 kHz, whereas the 5G system may support a plurality of subcarrier spacings (SCS) (e.g., 7.5 kHz, 15 kHz, 30 kHz, 60 kHz, 120 kHz, etc.) in order to provide various services such as enhanced mobile broad band (eMBB), ultra-reliable low-latency communications (URLLC), massive machine-type communication (mMTC), and the like, and provide wireless communication in various frequency ranges (e.g., sub-6 GHz, above-6 GHz, etc.). In addition, the 5G system may allow a plurality of SCSs to be subject to time division multiplexing (TDM) or frequency division multiplexing (FDM) even within one carrier. In addition, the maximum bandwidth of one component carrier (CC) is assumed to be 20 MHz in LTE, whereas it may be considered to be up to 1 GHz in the 5G system.

Therefore, in the case of the 5G system, radio resources having different SCSs may be frequency-division-multiplexed or time-division-multiplexed. A subframe is assumed as a basic unit of scheduling in LTE, but a slot having 14 symbols may be assumed as a basic unit of scheduling in the 5G system. That is, the absolute time of a subframe is fixed to 1 ms in LTE, but the length of a slot may differ depending on the SCS in the 5G system.

In particular, in 3GPP, an SS/PBCH (physical broadcast channel) block has been defined with respect to the synchronization signal (SS) used in the initial access procedure. The SS/PBCH block may include at least a primary synchronization signal (PSS), a secondary synchronization signal (SSS), and a PBCH. In addition, the SS/PBCH block may always be transmitted in the order of the PSS, the SSS, and the PBCH. In addition, the SCS of the SS/PBCH block may be transmitted using a frequency of 15 kHz, 30 kHz, 120 kHz, or 240 kHz depending on the frequency band thereof. More specifically, an SCS having 15 kHz or 30 kHz may be transmitted in a frequency band of 6 GHz or less, and an SCS having 120 kHz or 240 kHz may be transmitted in a frequency band of more than 6 GHz. In addition, the above-described frequency bands may be classified in more detail, and then an SS/PBCH block configured as a single SCS may be transmitted for each frequency band.

In addition, several SS/PBCH blocks may be transmitted in a single operation band. This is intended to enable the terminals with various capabilities to coexist and operate within a system bandwidth. In this case, although the system bandwidth is increased, the location of the SS/PBCH block received by the terminal may vary depending on the network configuration. In addition, the transmission time of the SS/PBCH block may also vary depending on the network configuration. In addition, the transmission interval of the SS/PBCH blocks may not be constant.

The details of the DC described with reference to FIGS. 1AB and 1AC may be applied to a second embodiment and a third embodiment of the disclosure.

FIG. 1AD(a) illustrates a diagram describing bandwidth adaptation technology in accordance with various embodiments, FIG. 1AD(b) illustrates a diagram describing bandwidth adaptation technology in accordance with various embodiments, FIG. 1AD(c) illustrates a diagram describing bandwidth adaptation technology in accordance with various embodiments, and FIG. 1AE illustrates a diagram describing bandwidth adaptation technology in accordance with various embodiments.

Referring to FIGS. 1AD(a) to AD(c), a base station may provide information on a bandwidth part (hereinafter, also referred to as a "BWP") associated with carrier bandwidth. The terminal may receive information on the BWP from the base station. According to various embodiments, the information on the BWP may include bandwidth part configuration information. According to an embodiment, the bandwidth part configuration information may include configuration values necessary for the terminal to use the bandwidth of a transmission signal as a bandwidth part. For example, the bandwidth part configuration information may include the frequency resource position of the BWP, the bandwidth of a frequency resource of the BWP, and numerology information associated with the operation of the BWP. According to an embodiment, the numerology information of the BWP may include at least one of subcarrier spacing (SCS) information, the type of cyclic prefix (e.g., a normal cyclic prefix or an extended cyclic prefix) of orthogonal frequency division multiplexing (OFDM), and the number of symbols included in a single slot (e.g., 7 symbols or 14 symbols). According to various embodiments, the terminal may activate at least one BWP, based on the bandwidth part configuration information received from the base station, and may transmit and receive a control signal or data, based on the activated BWP.

Referring to FIG. 1AD(a), the terminal may receive bandwidth part configuration information on one BWP 610 from the base station, and may activate the BWP 610, based on bandwidth part configuration information on the BWP 610. According to an embodiment, the BWP 610 may be an operation band configured based on the radio frequency (RF) performance of the terminal.

Referring to FIG. 1AD(b), the terminal may receive bandwidth part configuration information on a plurality of BWPs (e.g., BWP1 622 and BWP2 624) from the base station. According to an embodiment, the plurality of BWPs may include a BWP (e.g., BWP1 622) associated with a basic operation band configured based on the RF performance of the terminal, and may further include a BWP (e.g., BWP2 624) associated with an additional operation band. According to various embodiments, there may be one or more BWPs associated with the additional operation band. According to various embodiments, the BWP associated with the additional operation band may have numerology features different from those of the basic operation band. According to various embodiments, the BWPs associated with at least two additional operation bands may have different numerology features. The terminal may select and activate one of BWP1 622 and BWP2 624, based on the bandwidth part configuration information on BWP1 622 and the bandwidth part configuration information on BWP2 624. According to an embodiment, the base station may instruct the terminal to select and activate one of BWP1 622 and BWP2 624.

Referring to FIG. 1AD(c), the terminal may receive, from the base station, bandwidth part configuration information about a plurality of BWPs having different numerology features {e.g., BWP3 (numerology1) 632 and BWP3 (numerology2) 634}. According to an embodiment, the plurality of BWPs may include BWP3 (numerology1) 632 having a first numerology feature or BWP3 (numerology2) 634 having a second numerology feature. The terminal may select and activate at least one of BWP3 (numerology1) 632 and BWP3 (numerology2) 634, based on numerology information included in the bandwidth part configuration information on BWP3 (numerology1) 632 and the bandwidth part configuration information on BWP3 (numerology2) 634. For example, the terminal may select and activate at least one of BWP3 (numerology1) 632 and BWP3 (numerology2) 634, based on at least one of subcarrier spacing (SCS) information, the type of cyclic prefix (e.g., a normal cyclic prefix or an extended cyclic prefix) of OFDM, and the number of symbols included in a single slot (e.g., 7 symbols or 14 symbols), among numerology information included in the bandwidth part configuration information on BWP3 (numerology1) 632 and the bandwidth part configuration information on BWP3 (numerology2) 634.

According to various embodiments, the terminal may select a BWP to be activated from among a plurality of BWPs, based on the reception of a radio resource control (RRC) signal from the base station, or may select a BWP to be activated based on activation/deactivation information included at least one piece of bandwidth part configuration information of the plurality of BWPs. As another example, the terminal may select a BWP to be activated based on the reception of downlink control information (DCI) from the base station. As another example, the terminal may select a BWP to be activated based on the reception of a MAC control element (MAC CE) from the base station.

In addition, according to an embodiment, in the case of using an RRC signal, the base station may include frequency resource information allocated from a network or at least one piece of BWP-related time information in the RRC signal, and may transmit the same. For example, the terminal may select and activate one of the BWPs, based on the frequency resource information allocated from a network included in the RRC signal or at least one piece of BWP-related time information included in the RRC signal. For example, the at least one piece of BWP-related time information may include a time pattern for changing the BWP. The time pattern may include operation slot information or subframe information of the BWPs or a specified operation time of the BWPs.

In addition, according to an embodiment, in the case of using bandwidth part configuration information, a bit map indicating activation/deactivation may be included in the bandwidth part configuration information of the BWPs. The terminal may select a BWP to be activated based on the bitmap. For example, the bitmap may have a value 0 or 1. The value 0 (or 1 or another specified value) may indicate activation, and the value 1 (or 0 or another specified value) may indicate deactivation. The terminal may select a BWP to be activated according to the bitmap value included in the bandwidth part configuration information of the BWPs.

In addition, according to an embodiment, in the case of using DCI, the base station may include information to activate at least one BWP in the DCI. The terminal may select a BWP to be activated from among a plurality of BWPs, based on the information included in the DCI. If the information included in the DCI is the same as the BWP (e.g., BWP1 622), which is in an active state, the terminal may ignore the DCI value, and if the information included in the DCI is different from the BWP1 622, which is in an active state, the terminal may switch the BWP1 622 in the active state to the BWP corresponding to the information included in the DCI (e.g., BWP2 624) and activate the same. For example, the terminal may activate the BWP2 624 a predetermined time (e.g., a slot-based time or a subframe-based time) after reception of the DCI.

In addition, according to an embodiment, in the case of using DCI, an index indicating activation/deactivation may be included in the bandwidth part configuration information. The terminal may select a BWP to be activated based on the index. In an embodiment, the bandwidth part configuration information may include an index of each BWP. For example, upon receiving the DCI including an index of the BWP for activation, the terminal may activate a corresponding BWP, and may deactivate other BWPs.

In addition, according to an embodiment, in the case of using the MAC CE, the base station may include information for activating at least one BWP in the MAC CE. The terminal may select a BWP to be activated from among the plurality of BWPs, based on the information included in the MAC CE. If the information included in the MAC CE is the same as the BWP (e.g., BWP1 610), which is in an active state, the terminal may ignore the information included in the MAC CE, and if the information included in the MAC CE is different from the BWP1 610, which is in an active state, the terminal may switch the BWP1 610 in the active state to the BWP corresponding to the information included in the MAC CE (e.g., BWP2 624) and activate the same. The terminal may activate the BWP2 624 a predetermined time (e.g., a slot-based time or a subframe-based time) after the reception of the MAC CE.

Referring to FIG. 1AE, according to various embodiments, BWPs {e.g., carrier bandwidth part0 (602), carrier bandwidth part1 (604), or carrier bandwidth part2 (606)} may be allocated within a carrier bandwidth. According to an embodiment, the BWPs 602, 604, and 606 may be allocated based on a physical resource block (hereinafter, also referred to as a "PRB") (e.g., PRB0 601) specified in the carrier bandwidth. The PRB may be, for example, a specified bandwidth unit available to the terminal. According to an embodiment, a plurality of PRBs may be allocated to a plurality of BWPs. For example, a plurality of PRBs, such as N1 to PRB N1+a, may be allocated to carrier bandwidth part0 (602); a plurality of PRBs, such as N2 to PRB N2+b, may be allocated to carrier bandwidth part1 (604); and a plurality of PRBs, such as N3 to PRB N3+c, may be allocated to carrier bandwidth part 2 (606). For example, N1, N2, or N3 may be a start PRB, and "a", "b", or "c" may be the number of PRBs, that is, the number of bandwidths of the BWP.

According to various embodiments, the terminal may use a bandwidth corresponding to the entire BWP, or may use a bandwidth corresponding to one or more PRBs included in the BWP.

The details of the BWPs described with reference to FIGS. 1AD and 1AE may also be applied to the second embodiment and the third embodiment.

FIG. 1AF illustrates a diagram of a radio protocol structure in an LTE system according to an embodiment.

Referring to FIG. 1AF, the radio protocol of an LTE system includes packet data convergence protocol (PDCP) 1af-05 or 1af-40, radio link control (RLC) 1af-10 or 1af-35, and medium access control (MAC) 1af-15 or 1af-30 in a terminal and an eNB, respectively. The PDCP performs operations, such as IP header compression/decompression and the like. The primary functions of the PDCP are summarized as follows.

Header compression and decompression (ROHC only)
Transfer of user data
In-sequence delivery of higher-layer PDUs at PDCP re-establishment procedure for RLC AM
Sequence reordering {for split bearers in DC (only support for RLC AM): PDCP PDU routing for transmission and PDCP PDU reordering for reception}
Duplicate detection of lower-layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

The radio link control (RLC) 1af-10 or 1af-35 reconfigures a PDCP PDU (packet data unit) to an appropriate size and performs ARQ operation and the like. The primary functions of the RLC are summarized as follows.

Data transfer function (transfer of higher-layer PDUs)
ARQ function {error correction through ARQ (only for AM data transfer)}
Concatenation, segmentation, and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC 1af-15 or 1af-30 is connected to a plurality of RLC entities configured in a terminal or a base station, multiplexes RLC PDUs into MAC PDUs, and demultiplexes RLC PDUs from MAC PDUs. The primary functions of the MAC are summarized as follows.

Mapping between logical channels and transport channels
Multiplexing/demultiplexing of MAC SDUs belonging to one or different logical channels into/from transport blocks (TB) delivered to/from the physical layer on transport channels
Scheduling information reporting
HARQ function (error correction through HARQ)
Priority handling between logical channels of one UE
Priority handling between UEs by means of dynamic scheduling
MBMS service identification
Transport format selection
Padding The physical layers 1af-20 and 1af-25 channel-code and modulate higher-layer data, and convert the same into OFDM symbols that are then transmitted through a radio channel, or demodulate OFDM symbols received through a radio channel and channel-decode the same, and then transmit the same to higher-layers.

The details of the configurations described with reference to FIG. 1AF may also be applied to the second embodiment and the third embodiment.

FIG. 1AG illustrates a diagram of a radio protocol structure of a next-generation mobile communication system according to an embodiment.

Referring to FIG. 1AG, the radio protocol of the next-generation mobile communication system includes NR service data adaption protocol (SDAP) 1ag-01 or 1ag-45, NR PDCP 1ag-05 or 1ag-40, NR RLC 1ag-10 or 1ag-35, NR MAC 1ag-15 or 1ag-30, and NR PHY 1ag-20 or 1ag-25 in a terminal and an NR base station, respectively.

The primary functions of the NR SDAP 1ag-01 or 1ag-45 may include some of the following functions.

Transfer of user plane data
Mapping between QoS flow and DRB for downlink and uplink
Marking QoS flow ID in both downlink and uplink packets
Mapping reflective QoS flow to DRB for UL SDAP PDUs With regard to the SDAP layer entity, the terminal may receive a configuration indicating whether or not to use a header of the SDAP layer entity or whether or not to use functions of the SDAP layer entity for each PDCP layer entity, for each bearer, or for each logical channel through a radio resource control (RRC) message. In the case where the SDAP header is configured, a 1-bit non-access stratum (NAS) reflective quality-of-service (QoS) configuration indicator and a 1-bit access stratum (AS) reflective QoS configuration indicator of the SDAP header may instruct the terminal to update or reconfigure mapping information between the QoS flow and the data bearers in uplink and downlink. The SDAP header may include QoS flow ID information indicating the QoS. The QoS information may be used as data processing priority, scheduling information, or the like in order to support effective services.

The primary functions of the NR PDCP 1ag-05 or 1ag-40 may include some of the following functions.
Header compression and decompression (ROHC only)
Transfer of user data
In-sequence delivery of higher-layer PDUs
Out-of-sequence delivery of higher-layer PDUs
Sequence reordering (PDCP PDU reordering for reception)
Duplicate detection of lower-layer SDUs
Retransmission of PDCP SDUs
Ciphering and deciphering
Timer-based SDU discard in uplink The above reordering function of the NR PDCP entity may denote a function of reordering PDCP PDUs received from a lower-layer, based on a PDCP sequence number (SN). The reordering function of the NR PDCP entity may include a function of transmitting data to a higher layer in the reordered order, may include a function of directly transmitting data to a higher-layer without consideration of the order thereof, may include a function of reordering the sequence and recording lost PDCP PDUs, may include a function of sending a status report of the lost PDCP PDUs to the transmitting end, and may include a function of making a request for retransmission of the lost PDCP PDUs.

The primary functions of the NR RLC 1ag-10 or 1ag-35 may include some of the following functions.
Data transfer function (transfer of higher-layer PDUs)
In-sequence delivery of higher-layer PDUs
Out-of-sequence delivery of higher-layer PDUs
ARQ function (error correction through ARQ)
Concatenation, segmentation, and reassembly of RLC SDUs
Re-segmentation of RLC data PDUs
Reordering of RLC data PDUs
Duplicate detection
Protocol error detection
RLC SDU discard
RLC re-establishment The above in-sequence delivery function of the NR RLC entity may denote a function of transferring RLC SDUs received from a lower-layer to a higher-layer in sequence. The in-sequence delivery function of the NR RLC entity may include a function of, if one original RLC SDU is divided into a plurality of RLC SDUs and received, reassembling and transmitting the same.

The in-sequence delivery function of the NR RLC entity may include a function of reordering the received RLC PDUs, based on an RLC sequence number (SN) or a PDCP sequence number (SN), may include a function of reordering the sequence and recording lost RLC PDUs, may include a function of sending a status report of the lost RLC PDUs to the transmitting end, and may include a function of making a request for retransmission of the lost RLC PDUs.

The in-sequence delivery function of the NR RLC 1ag-10 or 1ag-35 entity may include a function of, if there is a lost RLC SDU, transmitting only the RLC SDUs prior to the lost RLC SDU to a higher-layer in sequence. In addition, the in-sequence delivery function of the NR RLC entity may include a function of, if a predetermined timer expires even though there is a lost RLC SDU, transmitting all RLC SDUs received before the timer starts to a higher-layer in sequence. In addition, the in-sequence delivery function of the NR RLC entity may include a function of, if a predetermined timer expires even though there is a lost RLC SDU, transmitting all RLC SDUs received until the present to a higher-layer in sequence.

The NR RLC 1ag-10 or 1ag-35 entity may process the RLC PDUs in the order of reception, regardless of a serial number, and may transmit the same to the PDCP 1ag-05 or 1ag-40 entity in an out-of-sequence delivery manner.

In the case of receiving segments, the NR RLC 1ag-10 or 1ag-35 entity may receive the segments, which are stored in the buffer or will be received later, may reconfigure the same into one complete RLC PDU, and may transmit the complete RLC PDU to the NR PDCP entity.

The NR RLC layer may not include a concatenation function, which may be performed in the NR MAC layer or may be replaced with a multiplexing function of the NR MAC layer.

In the above description, the out-of-sequence delivery of the NR RLC entity may denote a function of directly delivering RLC SDUs received from a lower-layer to a higher-layer regardless of the sequence thereof. The out-of-sequence delivery of the NR RLC entity may include a function of, if one original RLC SDU is divided into a plurality of RLC SDUs and is received, reassembling and delivering the same. The out-of-sequence delivery of the NR RLC entity may include a function of storing and ordering RLC SNs or PDCP SNs of the received RLC PDUs, thereby recording the lost RLC PDUs.

The NR MAC 1ag-15 or 1ag-30 may be connected to a plurality of NR RLC entities configured in a single terminal, and the primary functions of the NR MAC may include some of the following functions.
Mapping between logical channels and transport channels
Multiplexing/demultiplexing of MAC SDUs
Scheduling information reporting
HARQ function (error correction through HARQ)
Priority handling between logical channels of one UE
Priority handling between UEs by means of dynamic scheduling
MBMS service identification
Transport format selection
Padding The NR PHY layers 1ag-20 and 1ag-25 may perform operations of channel-coding and modulating the higher-layer data into OFDM symbols and transmitting the same through a radio channel, or operations of demodulating and channel-decoding the OFDM symbols received through the radio channel and transmitting the same to the higher-layer.

The details of the configuration described with reference to FIG. 1AG may also be applied to the second embodiment and the third embodiment.

FIGS. 1AH, 1AI, and 1AJ are diagrams illustrating an example of an SS/PBCH block according to an embodiment, and FIG. 1AK is a diagram illustrating a method of transmitting an SS/PBCH block according to an embodiment.

Referring to FIG. 1AH, in a 5G system defined in 3GPP, one or more SS/PBCH blocks 600 may be included in an arbitrary frequency bandwidth {e.g., wide bandwidth (CC)}. In addition, the SS/PBCH block may be transmitted while including PBCHs 620, 640, and 650, as well as a PSS 610/SSS 630.

The SS/PBCH block may be transmitted in the structure as shown in FIG. 1AH. The PSS 610, the first PBCH 620, the SSS 630, and the second PBCH 640 are transmitted in different symbols, and a frequency of 20 RBs may be used for the transmission of the SS/PBCH block 600. In addition, a portion 650 of the PBCH may be transmitted in the symbol for transmitting the SSS 630. In addition, the PSS 610, the SSS 630, and the PBCHs 620, 640, and 650 may be aligned with respect to the centers thereof.

In addition, referring to FIG. 1AK, in 3GPP, it is possible to transmit the SS/PBCH block with an offset of an OFDM subcarrier grid, instead of transmitting the same to conform to an RB grid. The offset value of the subcarrier grid applied thereto may be indicated by the PBCH.

Referring back to FIG. 1AH, candidate positions, in which the SS/PBCH blocks 600 including four symbols are able to be transmitted, may be determined in two consecutive slots (14 symbols) of 120 kHz, as shown by reference numeral 670. For reference, one slot may include 14 symbols in 3GPP. Alternatively, one slot may include 7 symbols. In addition, as illustrated by reference numeral 675 in FIG. 1AH, candidate positions, in which the SS/PBCH blocks 600 including four symbols are able to be transmitted, may be determined in four consecutive slots (14 symbols) of 240 kHz. In an embodiment, a total of 64 candidate positions for transmission of the SS/PBCH block 600 may be determined at a frequency above 6 GHz (240 kHz), based on the arrangement in the slot illustrated in FIG. 1AH.

In addition, the transmission pattern of the SS/PBCH block 600 on the time axis may be repeated for a predetermined period. The transmission pattern on the time axis may be configured such that the candidate positions, in which the SS/PBCH blocks 600 are able to be transmitted, are determined in a slot in 3GPP, and such that up to 64 SS/PBCH blocks (above 6 GHz, 8 for below 6 GHz) may be transmitted during the initial 5 ms. In addition, the network may determine the pattern that is actually transmitted from among these candidate positions. The above pattern may be repeated for a period of 5, 10, . . . , 160 ms, which may be determined by the base station. However, the terminal may primarily regard the repetition period of the pattern as 20 ms in the initial access procedure, thereby performing the initial access procedure.

Meanwhile, the candidate positions capable of transmitting the SS/PBCH blocks 600 at a frequency below 6 GHz may be the same as those illustrated in FIG. 1AI. As illustrated by reference numeral 680, the positions capable of transmitting two SS/PBCH blocks 600 may be determined in a single slot (14 symbols) at a frequency of 15 kHz. In addition, as illustrated by reference numeral 685, the positions capable of transmitting four SS/PBCH blocks 600 may be determined in two consecutive slots (14 symbols) at a frequency of 30 kHz. 600*ai*, 610*ai*, 620*ai*, 630*ai*, and 640*ai* refer to the corresponding configurations in FIG. 1AH.

In addition, as illustrated in FIG. 1AJ, the positions capable of transmitting up to eight SS/PBCH blocks 600*aj* may be determined at a frequency below 6 GHz.

In addition, the transmission pattern of the SS/PBCH block 600 on the time axis may be repeated for a predetermined period. The transmission pattern on the time axis may be configured such that the candidate positions capable of transmitting the SS/PBCH blocks 600 are determined in a slot in 3GPP, and such that up to 8 SS/PBCH blocks (above 6 GHz, 8 for below 6, and 4 for below 3) may be transmitted during the initial 5 ms. In addition, the network may determine the pattern that is actually transmitted from among these candidate positions. The above pattern may be repeated for a period of 5, 10, . . . , 160 ms, which may be determined by the base station. However, the terminal may primarily regard the repetition period of the pattern as 20 ms in the initial access procedure, thereby performing the initial access procedure.

A plurality of SS/PBCH blocks may be transmitted on the frequency axis within a frequency band operated by a single base station. In this case, the network may also determine the frequency position in which the SS/PBCH block is transmitted, and may be detected by the terminal using an interval for discovering the SS/PBCH block defined in the standard.

In the 5G system, at least one cell may exist in a frequency band operated by a single base station. One cell may be associated with one SS/PBCH block in terms of the terminal. The SS/PBCH block may be referred to as an "SS/PBCH block associated with a cell", an "SS/PBCH block defining a cell", a "cell-defining SS/PBCH block", or the like, but is not limited thereto. That is, in the case where the terminal completes DL/UL synchronization and an RRC connection/NAS connection, based on the SS/PBCH block discovered in the frequency detection process, the SS/PBCH block for the corresponding cell may be referred to as a "cell-defining SS/PBCH block".

The details of the SS/PBCH block and the transmission method described with reference to FIGS. 1AH, 1AI, and 1AJ may also be applied to the second embodiment and the third embodiment.

FIG. 1AL illustrates a diagram of a frame structure according to an embodiment.

Referring to FIG. 1AL, a plurality of sub-operation frequency bands (referred to as a "sub CC" in the disclosure) may be included in a system frequency band (wideband CC) of a base station. For example, four sub-operation frequency bands, such as sub CC1, sub CC2, sub CC3, and sub CC4, are illustrated, but the disclosure is not limited thereto, and three or fewer sub-operation frequency bands or five or more sub-operation frequency bands may be included in the operation frequency band of the base station. The sub-operation frequency band is only an example for the convenience of description, and may not be logically or physically separated in standards or actual implementations.

RF capability 910, which is one of the UE capabilities, indicates the bandwidth (BW) that can be supported by the terminal using one RF. In FIG. 1AL, it is assumed that a terminal (e.g., target UE) supports three consecutive CCs (sub CC 1, sub CC 2, and sub CC 3) through one RF. Accordingly, the operation frequency band of the terminal may be the frequency band including sub CC 1, sub CC 2, and sub CC 3.

In addition, in the example shown in FIG. 1AL, it may be assumed that the SS/PBCH blocks are provided in sub CC 1, sub CC 2, and sub CC 4. Further, the SS/PBCH block of sub CC 2 is assumed to be a cell-defining SS block of a target UE. In the example in FIG. 1AL, the base station may instruct the terminal to measure the SS/PBCH block included in sub CC 1 or sub CC 4. In this case, the base station transmits, to the terminal, a configuration message for measurement including a frequency value {NR absolute radio-frequency channel number (NR ARFCN)} of a corresponding SS/PBCH block.

In FIG. 1AL, physical cell identity (PCID) #1, PCID #2, and PCID #3 in the respective SS/PBCH blocks provided in sub CC 1, sub CC 2, and sub CC 4 may have the same value or different values. In addition, at least two PCIDs may be the same. For example, PCID #1 and PCID #2 of SS/PBCH block 1 and SS/PBCH block 2 in consecutive sub CC 1 and sub CC 2 may have the same value, and PCID #3 of SS/PBCH block 3 in sub CC 4 may have a value different therefrom.

The frame structure according to FIG. 1AL may also be applied to the second and third embodiments.

FIG. 1AM illustrates a diagram of an example of an initial access procedure in accordance with an embodiment. The initial access procedure may be performed in the process in which the terminal camps on the cell at the beginning when the terminal is turned on. The initial access procedure may also be performed when the PLMN is changed. Alternatively, the initial access procedure may be performed in the process in which the terminal missing the network camps on the cell again. Alternatively, the initial access procedure may be performed in the process in which the terminal in an idle state relocates and camps on the cell corresponding to the relocated area. Alternatively, the initial access procedure may be performed in the process in which the terminal in a connected state camps on a neighboring cell according to an indication of the base station or a determination of the terminal.

An initial access procedure of a terminal will be described based on the example of the system assumed in FIG. 1AL. This is a description of only one of multiple possible scenarios, and the disclosure is not limited thereto.

Referring to FIG. 1AM, in step 1010, the terminal may perform energy detection, and may search for an SS/PBCH block. The terminal may search for the SS/PBCH block in the carrier frequency band using synchronization signal (SS) raster information. In this case, the SS raster information indicates the position at which the synchronization signal can be detected, and may be, for example, a global synchronization channel number (GSCN) or an NR ARFCN. Accordingly, the terminal may detect a PSS and an SSS of sub CC 2 in the scenario in FIG. 1AL.

According to an embodiment, the terminal may detect a plurality of SS/PBCH blocks included in a band, based on the sequence of PSSs, thereby selecting a single SS/PBCH block from among the plurality of detected SS/PBCH blocks. Information on the plurality of detected SS/PBCH blocks may be utilized in a measurement operation.

According to an embodiment, the terminal may select the SS/PBCH block having the highest correlation peak value. Alternatively, the terminal may select the SS/PBCH block having the highest SNR (signal-to-noise ratio)/RSSI (received signal strength indicator).

Meanwhile, in the case where the SS/PBCH block is transmitted through multiple beams, the terminal may select one of the SS/PBCH blocks received through an Rx beam of the terminal.

In step 1020, the terminal may perform cell searching. The terminal may identify whether or not there is a cell mapped to the PSS or the SSS detected in step 1010 using the known PSS and SSS sequences. Accordingly, the PCID of the corresponding cell may be detected. In addition, a process of performing DL synchronization may be conducted simultaneously with this step or before or after this step.

In step 1030, the terminal may perform measurement. The terminal may calculate or measure quality, based on reference signal received power (RSRP) of the selected SS/PBCH block and RSRP of the PBCH DMRS identified based on the determined PCID. This process may be performed before step 1020, may be performed simultaneously with step 1020, or may be performed after step 1020.

In step 1040, the terminal may perform decoding of the PSS/SSS and the PBCH in the SS/PBCH block detected in step 1020. According to the scenario in FIG. 1AL, the terminal may perform decoding of the PSS/SSS and the PBCH in the SS/PBCH block of sub CC 2.

The terminal may obtain control resource set (CORESET) information related to remaining minimum system information (RMSI) in the PBCH. The terminal may obtain RMSI data by decoding a CORESET related to the RMSI, based on the obtained information. In addition, the terminal may obtain random access channel (RACH) configuration information from the RMSI. The terminal may perform a RACH procedure, based on the RACH configuration information obtained from the RMSI. In addition, in the case where the terminal receives an RRC configuration message in MSG 4 during the RACH procedure, the RRC state of the terminal may switch to an RRC connected state.

In addition, the terminal may identify the temporal position of the SS/PBCH block transmitted from the actual network, which is included in the RRC reconfiguration message.

The terminal having switched to the RRC connected state may transmit UE capability information. The UE capability information may include bandwidth information and information about a band in which the terminal is capable of operation. In addition, the UE capability may include a time required for the terminal to process received data. More specifically, the UE capability may include time information required for the terminal to process scheduling information received for uplink data and transmit the uplink data based on the processed scheduling information. In addition, the UE capability may include a time required for the terminal to process received uplink data and transmit ACK/NACK for the downlink data, based on the same. In addition, the UE capability may include information on a combination of bands for which the terminal is capable of performing carrier aggregation. Subsequently, the operation bandwidth of the terminal may be configured as an operation bandwidth conforming to the UE RF capability through an RRC reconfiguration message. For example, referring to the scenario shown FIG. 1AL, sub CC 1 to sub CC 3 may be configured as the operation bandwidth of the terminal.

In addition, one or more bandwidth parts may be configured (at least one BWP is configured in a band including sub CC 1 to sub CC 3 of the scenario in FIG. 1AL) through an RRC reconfiguration message, and the terminal may receive an RRC reconfiguration message including information related to the neighboring cell in which the measurement is performed, for example, at least one piece of frequency and time information related to the SS/PBCH block and the CSI-RS.

The initial access procedure described in connection with FIG. 1AM may also be applied to the second and third embodiments.

In the next-generation mobile communication system, the terminal derives reference signal received power (RSRP) from the SS/PBCH block broadcast by the next-generation base station in order to recognize the downlink channel quality. An embodiment proposes a method of determining the timing at which the SS/PBCH block is transmitted.

FIG. 1B illustrates a flowchart of a process for deriving SS/PBCH block measurement timing in NR-DC according to an embodiment.

The terminal 1b-05 performs a connection establishment procedure with a first NR base station 1b-10 and then switches to a connected mode (1b-13). The first base station consults a second NR base station 1b-12, and then configures the serving cell(s) belonging to the second base station 1b-12 to the terminal 1b-05 (1b-14). At this time, the terminal 1b-05 is in an NR DC state in which the terminal is connected to the two NR base stations 1b-10 and 1b-12. Here, "dual connectivity (DC)" refers to technology in which a terminal receives a wireless communication service while being connected to a plurality of base stations. The first base station 1b-10 is a master node (MN), and configures, to the terminal 1b-05, one or more serving cells of the second base station 1b-12. {i.e., a secondary node (SN)} (1b-14). If both the first base station 1b-10 and the second base station 1b-12 are NR base stations, the state may be referred to as "NR-DC"; if the first base station 1b-10 is an LTE base station and if the second base station 1b-12 is an NR base station, the state may be referred to as "EN-DC"; and if the first base station 1b-10 is an NR base station and if the second base station 1b-12 is an LTE base station, the state may be referred to as "NE-DC".

The first base station 1b-10 or the second base station 1b-12 transmits configuration information related to cell measurement to the terminal 1b-05 in the connected mode through a predetermined RRC message (1b-15 and 1b-17). The configuration information related to cell measurement (measConfig IE) may be primarily including "measObject", "reportConfig", and "measId" indicating a combination of one "measObject" and one "reportConfig". "measObject" contains information on the frequency and the cell to be measured, and "reportConfig" includes information to be applied for reporting the collected measurement information, periodic or event-based report time information, measurement information to report, and the like. "measObject", "reportConfig", and "measId" are configured in the form of a list, such as "measObjectToRemoveList", "measObjectToAddModList", "reportConfigToRemoveList", "reportConfigToAddModList", "measIdToRemoveList", and "measIdToAddModList", and are provided to the terminal 1b-05. In addition, configuration information related to cell measurement, such as "s-MeasureConfig", "quantityConfig", "measGapConfig", "measGapSharingConfig", and the like, is provided to the terminal 1b-05.

Since an NR base station may have a plurality of SCSs of the SS/PBCH to be transmitted, "MeasObjectNR" information may indicate the SCS value of the SS/PBCH block to be measured. In addition, since several SS/PBCH blocks may be located in the operating cell, the base station is capable of informing the terminal of the frequency position of the SS/PBCH block that is to be measured by the terminal. Since an NR terminal has one or more configured BWPs, the base station is capable of configuring one or more BWPs to be measured and informing the terminal of the same. The terminal may measure the BWP, based on the information received from the base station. Alternatively, the NR terminal is capable of measuring the SS/PBCH block or the CSI-RS included in the activated BWP.

TABLE 1

MeasObjectNR information element

```
--ASN1START
--TAG-MEAS-OBJECT-NR-START
MeasObjectNR :: =              SEQUENCE {
   ssbFrequency                ARFCN-ValueNR
   ssbSubcarrierSpacing        SubcarrierSpacing
   smtc1                       SSB-MTC
   smtc2                       SSB-MTC2
   ...,
   [[
   freqBandIndicatorNR-v1530 FreqBandIndicatorNR
   ]]
}
```

One "measObject IE" includes frequency information and SS/PBCH block measurement timing configuration information. Up to two types of SS/PBCH block measurement timing configuration information may be provided to the terminal 1b-05 in a connected mode. First configuration information is primary SS/PBCH measurement timing configuration, which is referred to as "SMTC1", and second configuration information is secondary SS/PBCH measurement timing configuration, which is referred to as "SMTC2". SMTC1 contains timing information on the SS/PBCH blocks of intra-frequency or inter-frequency cells indicated by "measObject IE". The information is period and offset information on a measurement time interval for receiving the SS/PBCH block and duration information on the measurement time interval. SMTC2 contains timing information on the SS/PBCH blocks of cells belonging to the PCI list at the frequency indicated by "measObject IE". The information is PCI list information and period information. The ASN.1 structures of SMTC1 and SMTC2 are shown in Table 2 below.

TABLE 2

SSB-MTC information element

```
--ASN1START
--TAG-SSB-MTC-START
SSB-MTC :: =        SEQUENCE {
   periodicityAndOffset          CHOICE {
      sf5                INTEGER (0..4),
      sf10               INTEGER (0..9),
      sf20               INTEGER (0..19),
      sf40               INTEGER (0..39),
      sf80               INTEGER (0..79),
      sf160              INTEGER (0..159)
   },
   duration          ENUMERATED {sf1, sf2, sf3, sf4, sf5}
}
SSB-MTC2 :: =       SEQUENCE {
   pci-ListSEQUENCE (SIZE (1..maxNrofPCIsPerSMTC))
      OF PhysCellId
OPTIONAL,  -Need M
   periodicity       ENUMERATED {sf5, sf10, sf20, sf40, sf80,
      spare3, spare2, spare1}
}
--TAG-SSB-MTC-STOP
--ASN1STOP
```

Upon receiving the information, the terminal 1b-05 stores the SMTC1 and SMTC2 information (1b-20). The terminal 1b-05 derives the timing of the SS/PBCH block, based on a system frame number (SFN) and a subframe of a predetermined cell, using the stored SMTC1 and SMTC2 configuration information and a predetermined equation (1b-25). The predetermined equation is expressed as follows. SMTC1 and SMTC2 are substituted into the following equation, respectively. SFN, in which the measurement time interval of each SS/PBCH block exists, satisfies the following equation.

SFN mod $T$=(FLOOR(Offset/10))

If the period is greater than 5 subframes, the subframe in which the first SS/PBCH block of the interval is transmitted satisfies the following equation.

subframe=Offset mod 10

Otherwise, subframe=Offset or (Offset+5)

Here, $T$=CEIL (Periodicity/10).

In the next-generation mobile communication system, the terminal may communicate with a plurality of base stations and one or more serving cells. The respective serving cells may have different SFNs and subframe timings. Therefore, it is necessary to determine the SFN and the subframe of a serving cell to be a reference based on which the timing of the SS/PBCH block is derived. In an embodiment, the cell may be determined to be a reference by the following method. The cell determined as described below is equally applicable both to SMTC1 and to SMTC2. In another embodiment, the cell determined as described below may be independently applied to SMTC1 and SMTC2.

Option 1) The SS/PBCH block timing is derived based on the SFN and the subframe of a primary cell (PCell). The PCell is not changed unless handover is established. Therefore, if the PCell is applied, it is possible to minimize the trouble of adjusting the SFN and the subframe as a reference when the serving cell is changed or released. In the case of option 1, the SS/PBCH timing may be derived based on the SFN and the subframe of the PCell, regardless of whether the terminal is connected to one base station or is in the DC state.

Option 2) The SS/PBCH block timing is derived based on the SFN and the subframe of a special cell (SpCell) of a cell group that provides SMTC configuration information. RRC managing each cell group configures cell measurement configuration in dual connectivity. In this case, if the timing is applied based on the SFN and the subframe of the SpCell acting as a central serving cell of each cell group (providing PUCCH in the cell group, providing downlink synchronization information of the cell group, etc.), it is possible to minimize the trouble of adjusting the SFN and the subframe as a reference when the serving cell is changed or released. The SpCell may be configured for each cell group, and the SpCell does not change frequently as other serving cells. The SpCell may denote a PCell in the case of a master cell group (MCG), and may denote a primary secondary cell (PSCell) in the case of a secondary cell group (SCG). In the case of option 2, if the terminal is connected to one base station, the SS/PBCH timing may be derived based on the SFN and the subframe of the PCell. If the terminal is configured in DC, the SS/PBCH timing may be derived based on the SFN and the subframe of each SpCell by recognizing the SpCell of each cell group. That is, the terminal may operate differently depending on whether the terminal is connected to one base station or establishes a DC connection with two or more base stations. Meanwhile, the cell group providing the SMTC configuration information may correspond to the cell group producing SMTC configuration information. The case in which the RRC managing each cell group configures the cell measurement configuration in dual connectivity has been described above. For example, if the SMTC configuration information produced by the SCG is transmitted to the MCG and is then transmitted from the MCG to the terminal, the timing for applying the SMTC configuration information may be determined based on the SFN and the subframe of the SCG that has produced the SMTC configuration information.

Option 3) The SS/PBCH block timing is derived based on the SFN and the subframe of the SpCell separately indicated by SMTC configuration information. The SMTC configuration information includes information indicating the SFN and the subframe of the SpCell, which is configured as a reference. If separate indication information is configured for the reference of the SMTC configuration information, previously received indication information may be valid until the next indication information is configured by the base station.

Option 4) The SS/PBCH block timing is derived based on the SFN and the subframe of the SpCell having the same frequency range (FR) according to the operation frequency of the serving cell. In an embodiment, although the reference generally follows the SFN of the PCell, in the case where the FR of the PCell and the FR of the serving cell are different from each other, the reference follows the SFN and the subframe of the SpCell operating in the same FR. In the case of option 4, the SS/PBCH timing may be derived based on the SFN and the subframe of the PCell when the terminal is connected to one base station. If the terminal establishes DC with the base stations operating in the same FR, the terminal may derive the SS/PBCH timing, based on the SFN and the subframe of the PCell. If the terminal establishes DC with the base stations operating in different FRs, the terminal may detect the base station operating as an SpCell from among the base stations operating in the FRs different from that of the PCell, and may derive the SS/PBCH timing, based on the SFN and the subframe of the corresponding base station. That is, in the case where the terminal establishes a DC connection with two or more base stations, the terminal may operate differently by recognizing the frequencies of the respective base stations.

The terminal 1b-05 receives the SS/PBCH during the derived measurement time interval, and derives a measurement result, such as RSRP and reference signal received quality (RSRQ), corresponding thereto (1b-30). The terminal 1b-05 includes the measured result in a predetermined RRC message periodically or on an event basis, and reports the same to the base stations 1b-10 and 1b-12 (1b-35).

Figure 1C:
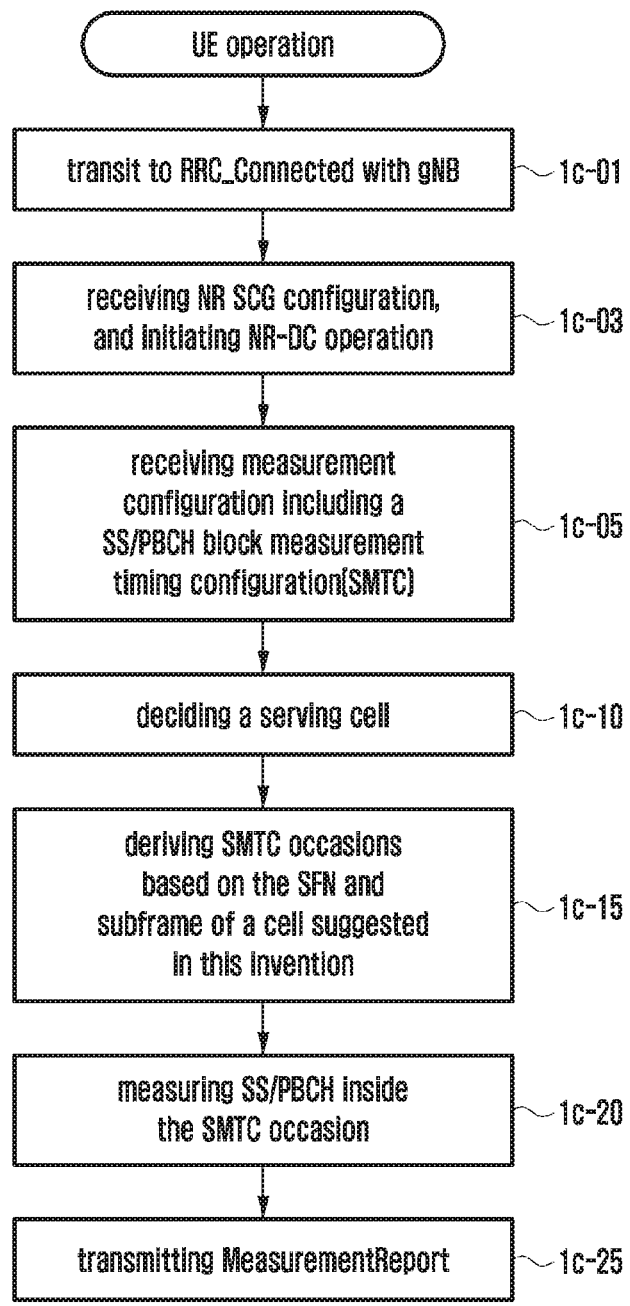
FIG. 1C illustrates a flowchart of the operation of a terminal for deriving SS/PBCH block measurement timing in NR-DC according to an embodiment.

FIG. 1C illustrates a flowchart of the operation of a terminal for deriving SS/PBCH block measurement timing in NR-DC according to an embodiment.

In step 1c-01, the terminal connects to one NR base station.

In step 1c-03, the terminal receives configuration information on an NR-DC operation from the NR base station. That is, the serving cell(s) belonging to the NR base station is configured.

In step 1c-05, the terminal receives and stores SMTC configuration information from two base station in the DC state.

In step 1c-10, the terminal determines one serving cell providing the SFN and the subframe as a reference in order to determine the SS/PBCH block measurement timing. The serving cell is determined by applying the method described with reference to the embodiment in FIG. 1B.

In step 1c-15, the terminal derives SS/PBCH block timing, based on the SFN and the subframe of the selected serving cell using SMTC1 and SMTC2 configuration information and a predetermined equation.

In step 1c-20, the terminal measures the SS/PBCH block by applying each SS/PBCH block measurement timing derived through the SMTC1 and SMTC2 configuration information.

In step 1c-25, the terminal reports the measured result to the base station using a predetermined RRC message.

The specific operation of the terminal is not limited thereto, and may include the operation of the terminal described with reference to FIG. 1B.

FIG. 1D illustrates a flowchart of a process of deriving SS/PBCH block measurement timing in EN-DC (NE-DC) according to an embodiment.

The terminal 1d-05 performs a connection establishment procedure with a first LTE base station 1d-10 and then switches to a connected mode (1d-13). The first base station consults a second NR base station 1d-12, and then configures the serving cell(s) belonging to the second base station 1d-12 to the terminal 1d-05 (1d-14). At this time, the terminal 1d-05 is in an EN-DC state in which the terminal is connected to the two base stations 1d-10 and 1d-12. In case that an NE-DC, the first base station 1d-10 may be an NR base station, and the second base station 1d-12 may be an LTE base station. In case that an NN-DC, the first base station 1d-10 may be an NR base station and the second base station 1d-12 may be an NR base station.

The first base station 1d-10 or the second base station 1d-12 transmits configuration information related to cell measurement to the terminal 1d-05 in the connected mode through a predetermined RRC message (1d-15 and 1d-17). The configuration information related to cell measurement (measConfig IE) may be primarily including "measObject", "reportConfig", and "measId" indicating a combination of one "measObject" and one "reportConfig". "measObject" contains information on the frequency and the cell to be measured, and "reportConfig" includes information to be applied for reporting the collected measurement information, periodic or event-based report time information, measurement information to report, and the like. "measObject", "reportConfig", and "measId" are configured in the form of a list, such as "measObjectToRemoveList", "measObjectToAddModList", "reportConfigToRemoveList", "reportConfigToAddModList", "measIdToRemoveList", and "measIdToAddModList", and are provided to the terminal 1d-05. In addition, configuration information related to cell measurement, such as "s-MeasureConfig", "quantityConfig", "measGapConfig", "measGapSharingConfig", and the like, is provided to the terminal 1d-05.

Since an NR base station may have a plurality of SCSs of the SS/PBCH to be transmitted, "MeasObjectNR" information may indicate the SCS value of the SS/PBCH block to be measured. In addition, since several SS/PBCH blocks may be located in the operating cell, the base station is able to inform the terminal of the frequency position of the SS/PBCH block that is to be measured by the terminal. Since an NR terminal has one or more configured BWPs, the base station is capable of configuring one or more BWPs to be measured and informing the terminal of the same. The terminal may measure the BWP, based on the information received from the base station. Alternatively, the NR terminal is capable of measuring the SS/PBCH block or the CSI-RS included in the activated BWP.

See Table 1 for MeasObjectNR information element.

One "measObject IE" includes frequency information and SS/PBCH block measurement timing configuration information. Up to two types of SS/PBCH block measurement timing configuration information may be provided to the terminal 1d-05 in a connected mode. First configuration information is primary SS/PBCH measurement timing configuration, which is referred to as "SMTC1", and second configuration information is secondary SS/PBCH measurement timing configuration, which and is referred to as "SMTC2". SMTC1 contains timing information on the SS/PBCH blocks of intra-frequency or inter-frequency cells indicated by "measObject IE". The information is period and offset information of a measurement time interval for receiving the SS/PBCH block and duration information of the measurement time interval. SMTC2 contains timing information of the SS/PBCH blocks of cells belonging to the PCI list at the frequency indicated by "measObject IE". The information is PCI list information and period information. See Table 2 for the ASN.1 structures of SMTC1 and SMTC2.

Upon receiving the information, the terminal 1d-05 stores SMTC1 and SMTC2 information (1d-20). The terminal 1d-05 derives the timing of the SS/PBCH block, based on the SFN and the subframe of a predetermined cell using the stored SMTC1 and SMTC2 configuration information and a predetermined equation (1d-25). The predetermined equation is expressed as follows. SMTC1 and SMTC2 are substituted into the following equation, respectively. The SFN, in which the measurement time interval of each SS/PBCH block exists, satisfies the following equation.

SFN mod $T$=(FLOOR(Offset/10))

If the period is greater than 5 subframes, the subframe in which the first SS/PBCH block of the interval is transmitted satisfies the following equation.

subframe=Offset mod 10

Otherwise, subframe=Offset or (Offset+5)

Here, $T$=CEIL (Periodicity/10).

In EN-DC or NE-DC, the terminal may communicate with one or more serving cells in the NR base station. The respective serving cells may have different SFNs and subframe timings. Therefore, it is necessary to determine the SFN and the subframe of the serving cell based on which the timing of the SS/PBCH block is derived. In an embodiment, the cell as a reference may be determined by the following method. The cell determined as described below is equally applicable both to SMTC1 and to SMTC2.

Option 1) The SS/PBCH block timing is derived based on the SFN and the subframe of an NR SpCell (in the case of EN-DC). On the other hand, if MN is an NR base station and if SN is an LTE base station (in the case of NE-DC), the SS/PBCH block timing is derived based on the SFN and the subframe of an NR PCell. In the case of option 1, the SS/PBCH timing may be derived based on the SFN and the subframe of the PCell, regardless of whether the terminal is connected to one base station or is in the DC state.

Option 2) According to the type of SRB of an RRC message providing SMTC configuration information, if the SMTC configuration information is provided while being contained in an RRC message belonging to SRB1, the SS/PBCH block timing is derived based on the SFN and the subframe of the PCell. On the other hand, if the SMTC configuration information is provided while being contained in an RRC message belonging to SRB3, the SS/PBCH block timing is derived based on the SFN and the subframe of the PSCell. This option may also be applied to the EN-DC scenario, which is dual connectivity of the LTE base station and the NR base station. All RRC messages transmitted by the SN belong to SRB3 in the EN-DC. Therefore, if the SMTC configuration information contained in the RRC message belonging to the SRB3 is received, for the same reason as in option 2, the SFN and the subframe of the PSCell may be configured as a reference. In the case of option 2, in the case where the terminal is connected to one base station, the SS/PBCH timing may be derived based on the SFN and the subframe of the PCell. If the terminal is configured in DC, the SS/PBCH timing may be derived based on the SFN and the subframe of each SpCell by recognizing the SpCell of each cell group according to the configuration of the SRB providing the SMTC. That is, the terminal may operate differently depending on whether the terminal is connected to one base station or establishes a DC connection with two or more base stations. More specifically, the terminal may determine a reference cell for deriving the SS/PBCH timing, based on RRC information for configuring DC. Meanwhile, the bearer providing the SMTC configuration information may correspond to the cell group that produces the SMTC configuration information. The case in which the RRC managing each cell group configures the cell measurement configuration in the case of dual connectivity has been described above. If the SMTC configuration information is provided through an RRC message of SRB1, the application of the SMTC may follow the timing of the PCell, and if the SMTC configuration information is provided through an RRC message of SRB3, the application of the SMTC may follow the timing of the PSCell. However, in the case where the SMTC configuration information produced in the SCG is provided through SRB1 because SRB3 is not configured, the application of the SMTC may follow the timing of the PSCell.

Option 3) The SS/PBCH block timing is derived based on the SFN and the subframe of the SpCell separately indicated by SMTC configuration information. The SMTC configuration information includes information indicating the SFN and the subframe of the SpCell, which is configured as a reference. If separate indication information is configured for the reference of the SMTC configuration information, previously received indication information may be valid until the next indication information is configured by the base station.

Option 4) The SS/PBCH block timing is derived based on the SFN and the subframe of the SpCell having the same frequency range (FR) according to the operation frequency of the serving cell. In an embodiment, although the reference generally follows the SFN of the PCell, in the case where the FR of the PCell and the FR of the serving cell are different from each other, the reference follows the SFN and the subframe of the SpCell operating in the same FR. In the case of option 4, the SS/PBCH timing may be derived based on the SFN and the subframe of the PCell when the terminal is connected to one base station. If the terminal establishes DC with the base stations operating in the same FR, the terminal may derive the SS/PBCH timing, based on the SFN and the subframe of the PCell. If the terminal establishes DC with the base stations operating in different FRs, the terminal may detect the base station operating as an SpCell from among the base stations operating in the FRs different from that of the PCell, and may derive the SS/PBCH timing, based on the SFN and the subframe of the corresponding base station. That is, in the case where the terminal establishes a DC connection with two or more base stations, the terminal may operate differently by recognizing the frequencies of the respective base stations. More specifically, the terminal may determine a reference cell for deriving the SS/PBCH timing, based on the RRC information for configuration of DC.

The terminal 1$d$-05 receives the SS/PBCH during the derived measurement time interval, and derives a measurement result, such as RSRP and RSRQ, corresponding thereto (1$b$-30). The terminal 1$d$-05 includes the measured result in a predetermined RRC message periodically or on an event basis, and reports the same to the base stations 1$d$-10 and 1$d$-12 (1$d$-35).

Figure 1E:
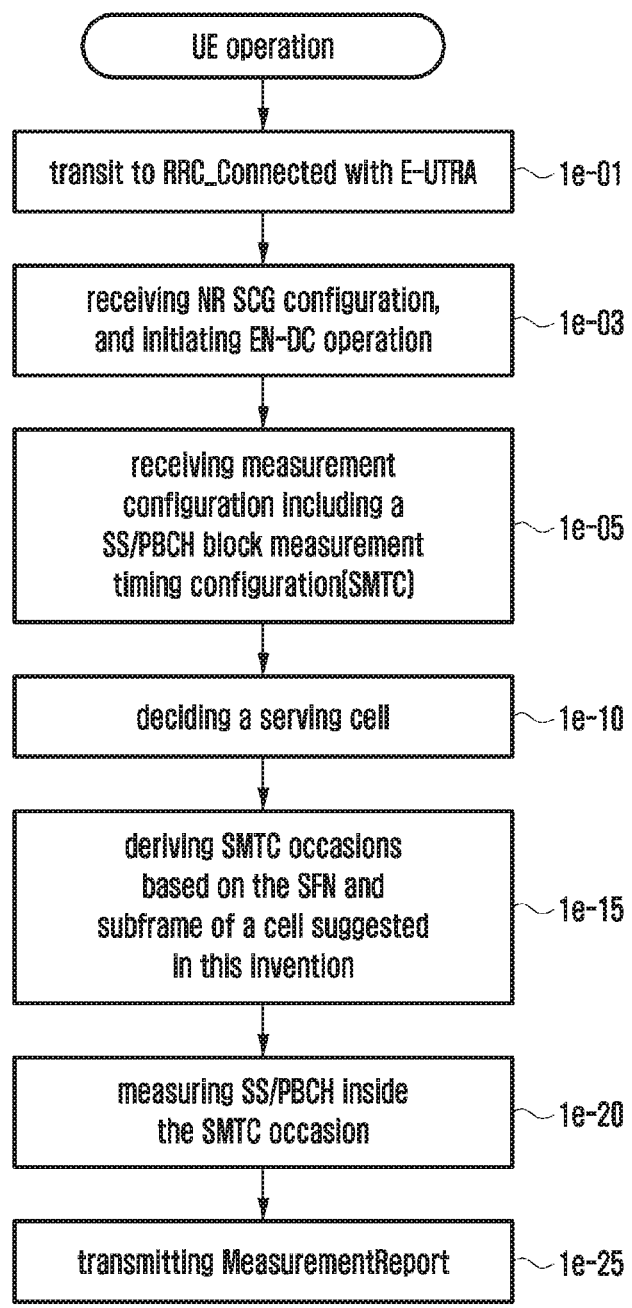
FIG. 1E illustrates a flowchart of the operation of a terminal for deriving SS/PBCH block measurement timing in EN-DC (NE-DC) according to an embodiment.

FIG. 1E illustrates a flowchart of the operation of a terminal for deriving SS/PBCH block measurement timing in EN-DC (NE-DC) according to an embodiment.

In step 1$e$-01, the terminal connects to one LTE base station.

In step 1$e$-03, the terminal receives configuration information on an EN-DC operation from the LTE base station. That is, the serving cell(s) belonging to the NR base station is configured.

In step 1$e$-05, the terminal receives and stores SMTC configuration information from the base station.

In step 1$e$-10, the terminal determines one serving cell providing the SFN and the subframe as a reference in order to determine the SS/PBCH block measurement timing. The serving cell is determined by applying the method described with reference to the embodiment in FIG. 1D.

In step 1$e$-15, the terminal derives the SS/PBCH block timing, based on the SFN and the subframe of the selected serving cell using SMTC1 and SMTC2 configuration information and a predetermined equation.

In step 1$e$-20, the terminal measures the SS/PBCH block by applying each SS/PBCH block measurement timing derived through the SMTC1 and SMTC2 configuration information.

In step 1$e$-25, the terminal reports the measured result to the base station using a predetermined RRC message.

The specific operation of the terminal is not limited thereto, and may include the operation of the terminal described with reference to FIG. 1D.

Figure 1F:
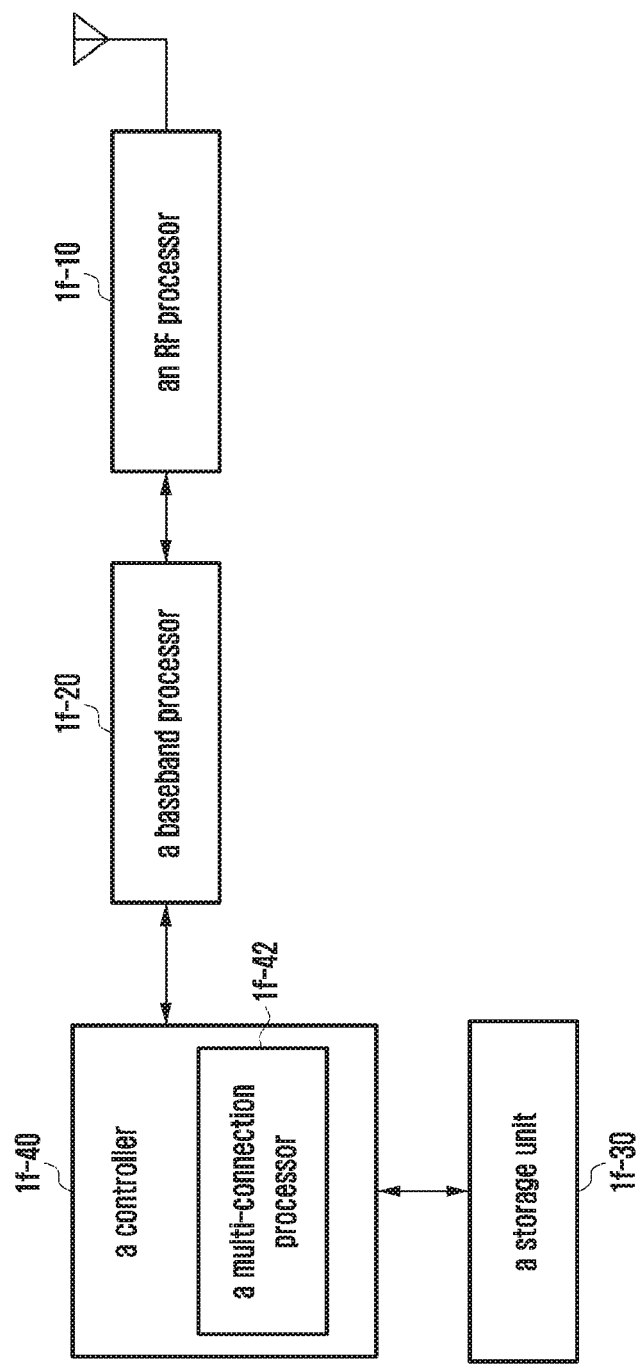
FIG. 1F illustrates a diagram of the configuration of a terminal according to an embodiment.

FIG. 1F illustrates a diagram of the configuration of a terminal according to an embodiment.

Referring to FIG. 1F, the terminal includes a radio frequency (RF) processor 1$f$-10, a baseband processor 1$f$-20, a storage unit 1$f$-30, and a controller 1$f$-40. The controller 1$f$-40 may further include a multi-connection processor 1$f$-42.

The RF processor 1$f$-10 performs a function of transmitting and receiving a signal through a radio channel, such as band conversion and amplification of a signal. That is, the RF processor 1$f$-10 up-converts a baseband signal provided from the baseband processor 1$f$-20 to an RF band signal to thus transmit the same through an antenna, and down-converts an RF band signal received through the antenna to a baseband signal. For example, the RF processor 1$f$-10 may include a transmission filter, a reception filter, an amplifier, a mixer, an oscillator, a digital-to-analog converter (DAC), an analog-to-digital converter (ADC), and the like. Although only one antenna is illustrated in FIG. 1F, the terminal may have a plurality of antennas. In addition, the RF processor 1$f$-10 may include a plurality of RF chains. Further, the RF processor 1$f$-10 may perform beamforming. To perform beamforming, the RF processor 1$f$-10 may adjust the phases and magnitudes of signals transmitted and received through a plurality of antennas or antenna elements. In addition, the RF processor may perform MIMO, and may receive multiple layers when performing the MIMO operation.

The baseband processor 1$f$-20 performs a function of conversion between a baseband signal and a bit string according to the physical layer specification of the system. For example, in the case of data transmission, the baseband processor 1*f*-20 encodes and modulates transmission bit strings, thereby generating complex symbols. In addition, upon receiving data, the baseband processor 1*f*-20 demodulates and decodes a baseband signal provided from the RF processor 1*f*-10 to thus recover reception bit strings. For example, in the case where an orthogonal frequency division multiplexing (OFDM) scheme is applied, when transmitting data, the baseband processor 1*f*-20 generates complex symbols by encoding and modulating transmission bit strings, maps the complex symbols to subcarriers, and then configures OFDM symbols through an inverse fast Fourier transform (IFFT) operation and cyclic prefix (CP) insertion. In addition, when receiving data, the baseband processor 1*f*-20 divides the baseband signal provided from the RF processor 1*f*-10 into OFDM symbol units, restores the signals mapped to the subcarriers through a fast Fourier transform (FFT) operation, and then restores reception bit strings through demodulation and decoding.

The baseband processor 1*f*-20 and the RF processor 1*f*-10 transmit and receive signals as described above. Accordingly, the baseband processor 1*f*-20 and the RF processor 1*f*-10 may be referred to as a "transmitter", a "receiver", a "transceiver", or a "communication unit". Further, at least one of the baseband processor 1*f*-20 and the RF processor 1*f*-10 may include a plurality of communication modules in order to support a plurality of different radio access techniques. In addition, at least one of the baseband processor 1*f*-20 and the RF processor 1*f*-10 may include different communication modules to process signals in different frequency bands. For example, the different radio access techniques may include a wireless LAN (e.g., IEEE 802.11), a cellular network (e.g., LTE), and the like. In addition, the different frequency bands may include super-high frequency (SHF) (e.g., 2.NRHz or NRHz) bands or millimeter wave (e.g., 60 GHz) bands.

The storage unit 1*f*-30 stores data such as fundamental programs, application programs, and configuration information for the operation of the terminal. In particular, the storage unit 1*f*-30 may store information related to a second access node that performs wireless communication using a second radio access technique. In addition, the storage unit 1*f*-30 provides the stored data at the request of the control unit 1*f*-40.

The controller 1*f*-40 controls the overall operation of the terminal. For example, the controller 1*f*-40 transmits and receives signals through the baseband processor 1*f*-20 and the RF processor 1*f*-10. In addition, the controller 1*f*-40 records and reads data in and from the storage unit 1*f*-30. To this end, the controller 1*f*-40 may include at least one processor. For example, the controller 1*f*-40 may include a communication processor (CP) for controlling communication and an application processor (AP) for controlling higher-layers such as application programs.

Figure 1G:
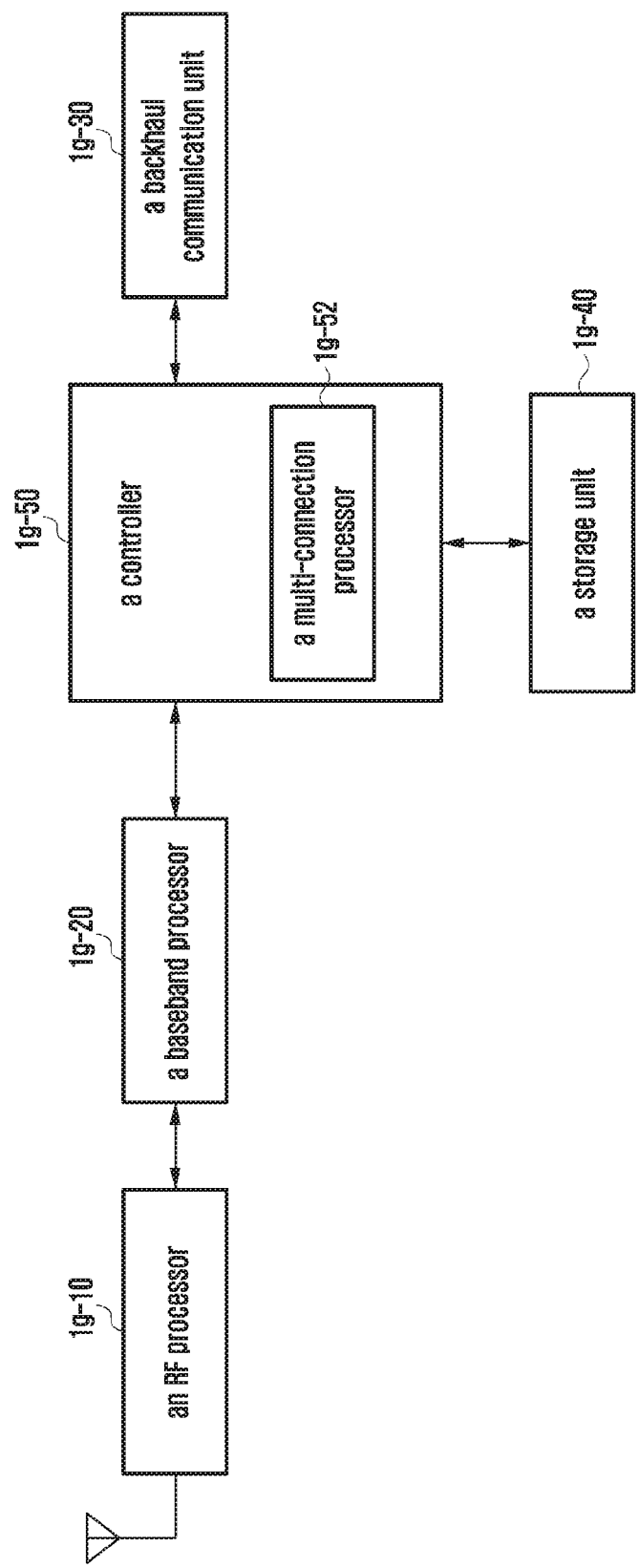
FIG. 1G illustrates a diagram of the configuration of a base station according to an embodiment.

FIG. 1G illustrates a diagram of the configuration of a base station according to an embodiment.

As shown in FIG. 1G, the base station includes an RF processor 1*g*-10, a baseband processor 1*g*-20, a backhaul communication unit 1*g*-30, a storage unit 1*g*-40, and a controller 1*g*-50. The controller 1*g*-50 may further include a multi-connection processor 1*g*-52.

The RF processor 1*g*-10 performs a function of transmitting and receiving signals, such as band conversion and amplification of a signal, through a radio channel. That is, the RF processor 1*g*-10 up-converts a baseband signal provided from the baseband processor 1*g*-20 to an RF band signal to thus transmit the same through an antenna, and down-converts an RF band signal received through the antenna to a baseband signal. For example, the RF processor 1*g*-10 may include a transmission filter, a reception filter, an amplifier, a mixer, an oscillator, a DAC, an ADC, and the like. Although only one antenna is shown in the drawing, the first access node may have a plurality of antennas. In addition, the RF processor 1*g*-10 may include a plurality of RF chains. Further, the RF processor 1*g*-10 may perform beamforming. To perform beamforming, the RF processor 1*g*-10 may adjust the phases and magnitudes of signals transmitted and received through a plurality of antennas or antenna elements. The RF processor may perform a downlink MIMO operation by transmitting one or more layers.

The baseband processor 1*g*-20 performs a function of conversion between a baseband signal and a bit string according to a physical layer specification of a first radio access technique. For example, in the case of data transmission, the baseband processor 1*g*-20 encodes and modulates transmission bit strings, thereby generating complex symbols. In addition, upon receiving data, the baseband processor 1*g*-20 demodulates and decodes a baseband signal provided from the RF processor 1*g*-10 to thus recover reception bit strings. For example, in the case where an OFDM scheme is applied, when transmitting data, the baseband processor 1*g*-20 generates complex symbols by encoding and modulating transmission bit strings, maps the complex symbols to subcarriers, and then configures OFDM symbols through the IFFT operation and CP insertion. In addition, when receiving data, the baseband processor 1*g*-20 divides the baseband signal provided from the RF processor 1*g*-10 into OFDM symbol units, restores the signals mapped to the subcarriers through the FFT operation, and then restores reception bit strings through demodulation and decoding. The baseband processor 1*g*-20 and the RF processor 1*g*-10 transmit and receive signals as described above. Accordingly, the baseband processor 1*g*-20 and the RF processor 1*g*-10 may be referred to as a "transmitter", a "receiver", a "transceiver", a "communication unit", or a "wireless communication unit".

The backhaul communication unit 1*g*-30 provides an interface for performing communication with other nodes in the network. That is, the backhaul communication unit 1*g*-30 converts a bit string, transmitted from the base station to another node, such as a secondary base station, a core network, etc., into a physical signal, and converts physical signals received from other nodes into bit strings.

The storage unit 1*g*-40 stores data such as fundamental programs, application programs, and configuration information for the operation of the base station. In particular, the storage unit 1*g*-40 may store information about bearers allocated to a connected terminal, a measurement result reported from a connected terminal, and the like. In addition, the storage unit 1*g*-40 may store information that is a criterion for determining whether a multi-connection is provided to the terminal or is released. In addition, the storage unit 1*g*-40 provides the stored data in response to a request from the controller 1*g*-50.

The controller 1*g*-50 controls the overall operation of the base station. For example, the controller 1*g*-50 transmits and receives signals through the baseband processor 1*g*-20 and the RF processor 1*g*-10 or the backhaul communication unit 1*g*-30. In addition, the controller 1*g*-50 records and reads data in and from the storage unit 1*g*-40. To this end, the controller 1*g*-50 may include at least one processor.

Figure 1H:
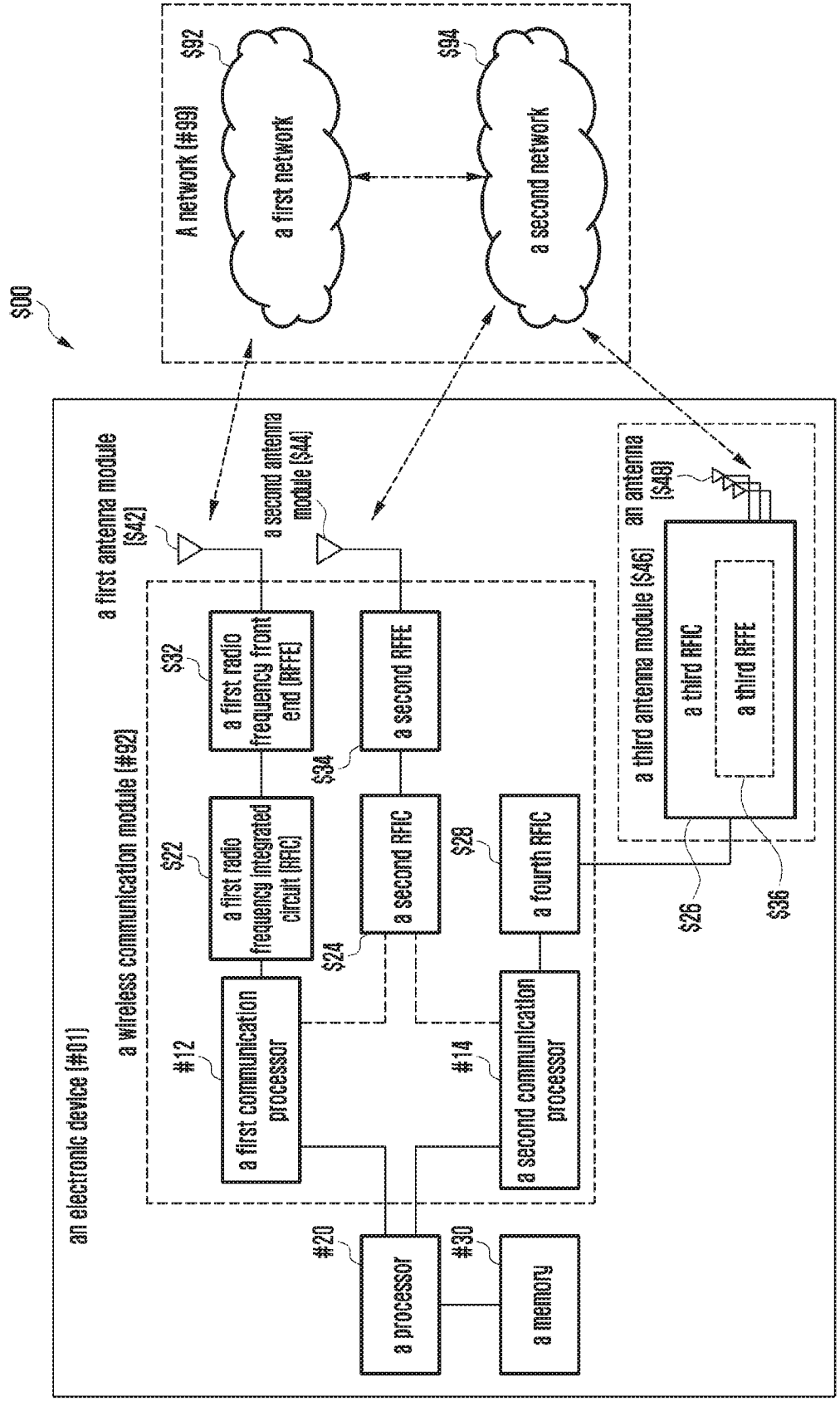
FIG. 1H illustrates a diagram of the configuration of an electronic device according to an embodiment.

FIG. 1H illustrates a diagram of the configuration of an electronic device according to an embodiment. FIG. 1H is a block diagram $00 of electronic device #01 for supporting legacy network communication and 5G network communication according to various embodiments. FIG. 1H may be applied to the first embodiment, the second embodiment, or the third embodiment.

Referring to FIG. 1H, electronic device #01 includes a first communication processor $12, a second communication processor $14, a first radio frequency integrated circuit (RFIC) $22, a second RFIC $24, a third RFIC $26, a fourth RFIC $28, a first radio frequency front end (RFFE) $32, a second RFFE $34, a third RFFE $36, a first antenna module $42, a second antenna module $44, and an antenna $48. Electronic device #01 may further include a processor #20 and a memory #30. A network #99 may include a first network $92 and a second network $94. According to another embodiment, electronic device #01 may further include at least one of the components described in FIG. 1F or 1G, and the network #99 may further include at least one of other networks. According to an embodiment, the first communication processor $12, the second communication processor $14, the first RFIC $22, the second RFIC $24, the fourth RFIC $28, the first RFFE $32, and the second RFFE $34 may constitute at least a portion of the wireless communication module #92. According to another embodiment, the fourth RFIC $28 may be omitted or included as part of the third RFIC $26.

The first communication processor $12 may support establishment of a communication channel of a band to be used for wireless communication with the first network $92, and legacy network communication through the established communication channel. According to various embodiments, the first network may be a legacy network including a second generation (2G), 3G, 4G, or long-term evolution (LTE) network. The second communication processor $14 may support establishment of a communication channel corresponding to a specified band (e.g., about 6 GHz to about 60 GHz), among the bands to be used for wireless communication with the second network $94, and 5G network communication through the established communication channel. According to various embodiments, the second network $94 may be a 5G network defined in 3GPP. Additionally, according to an embodiment, the first communication processor $12 or the second communication processor $14 may support establishment of a communication channel corresponding to another specified band (e.g., about 6 GHz or below), among the bands to be used for wireless communication with the second network $94, and 5G network communication through the established communication channel. According to an embodiment, the first communication processor $12 and the second communication processor $14 may be implemented in a single chip or a single package. According to various embodiments, the first communication processor $12 or the second communication processor $14 may be provided in a single chip or a single package together with the processor #20, the coprocessor #23, or the communication module #90.

In the case of transmission, the first RFIC $22 may convert the baseband signal generated by the first communication processor $12 into a radio frequency (RF) signal of about 700 MHz to about 3 GHz used in the first network $92 (e.g., a legacy network). In the case of reception, an RF signal may be obtained from the first network $92 (e.g., a legacy network) through an antenna (e.g., a first antenna module $42), and may be preprocessed through an RFFE (e.g., the first RFFE $32). The first RFIC $22 may convert the preprocessed RF signal into a baseband signal so as to be processed by the first communication processor $12.

When transmitting a signal, the second RFIC $24 may convert a baseband signal generated by the first communication processor $12 or the second communication processor $14 into the RF signal of a Sub 6 band (e.g., about 6 GHz or less) (hereinafter, referred to as a "5G Sub-6 RF signal") used in the second network $94 (e.g., a 5G network). When receiving a signal, a 5G Sub-6 RF signal may be obtained from the second network $94 (e.g., a 5G network) through an antenna (e.g., the second antenna module $44), and may be preprocessed through an RFFE (e.g., the second RFFE $34). The second RFIC $24 may convert the preprocessed 5G Sub-6 RF signal into a baseband signal so as to be processed by the corresponding communication processor of the first communication processor $12 or the second communication processor $14.

The third RFIC $26 may convert a baseband signal generated by the second communication processor $14 into an RF signal of a 5G Above-6 band (e.g., about 6 GHz to about 60 GHz) (hereinafter, referred to as a "5G Above-6 RF signal") to be used in the second network $94 (e.g., a 5G network). When receiving a signal, the 5G Above-6 RF signal may be obtained from the second network $94 (e.g., a 5G network) through an antenna (e.g., the antenna $48), and may be preprocessed through the third RFFE $36. The third RFIC $26 may convert the preprocessed 5G Above-6 RF signal into a baseband signal so as to be processed by the second communication processor $14. According to an embodiment, the third RFFE $36 may be configured as a part of the third RFIC $26.

According to an embodiment, electronic device #01 may include a fourth RFIC $28 separately from the third RFIC $26 or as at least a part thereof. In this case, the fourth RFIC $28 may convert the baseband signal generated by the second communication processor $14 into an RF signal (hereinafter, referred to as an "IF signal") in an intermediate frequency band (e.g., about 9 GHz to about 11 GHz), and may transmit the IF signal to the third RFIC $26. The third RFIC $26 may convert the IF signal into a 5G Above-6 RF signal. When receiving a signal, the 5G Above-6 RF signal may be received from the second network $94 (e.g., a 5G network) through an antenna (e.g., the antenna $48), and may be converted to an IF signal by the third RFIC $26. The fourth RFIC $28 may convert the IF signal into a baseband signal so as to be processed by the second communication processor $14.

According to an embodiment, the first RFIC $22 and the second RFIC $24 may be implemented as a single chip or at least a part of a single package. According to an embodiment, the first RFFE $32 and the second RFFE $34 may be implemented as a single chip or at least a part of a single package. According to an embodiment, at least one of the first antenna module $42 or the second antenna module $44 may be omitted, or may be combined with another antenna module, thereby processing RF signals of a plurality of corresponding bands.

According to an embodiment, the third RFIC $26 and the antenna $48 may be disposed on the same substrate, thereby configuring the third antenna module $46. For example, the wireless communication module #92 or the processor #20 may be disposed on a first substrate (e.g., a main PCB). In this case, the third RFIC $26 may be disposed on a portion (e.g., a lower surface) of the second substrate (e.g., a sub-PCB) separately from the first substrate, and the antenna $48 may be disposed in another portion (e.g., an upper surface) thereof, thereby configuring the third antenna module $46. According to an embodiment, the antenna $48 may include an antenna array that can be used, for example, in beamforming. It is possible to reduce the length of the transmission line between the third RFIC $26 and the antenna $48 by arranging the same on the same substrate. This may reduce, for example, the loss (e.g., attenuation) of a signal of a high-frequency band (e.g., about 6 GHz to about 60 GHz) used in a 5G network communication, which is caused due to the transmission line. As a result, electronic device #01 may improve the quality or speed of communication with the second network $94 (e.g., a 5G network).

The second network $94 (e.g., a 5G network) may operate independently of the first network $92 (e.g., a legacy network) {for example, a stand-alone (SA) network}, or may operate while being connected thereto {for example, a non-stand-alone (NSA) network}. For example, the 5G network may have only an access network {e.g., 5G radio access network (RAN) or a next-generation RAN (NG RAN)}, and may have no core network {e.g., a next-generation core (NGC)}. In this case, electronic device #01 may access the access network of the 5G network, and may then access an external network (e.g., the Internet) under the control of the core network {e.g., an evolved packed core (EPC)} of the legacy network. Protocol information for communication with a legacy network (e.g., LTE protocol information) or protocol information for communication with a 5G network {e.g., new radio (NR) protocol information} may be stored in the memory $30, so that other components (e.g., the processors #20, the first communication processor $12, or the second communication processor $14) may access the memory.

Second Embodiment

A second embodiment relates to a method and an apparatus for performing a cell measurement operation in order to minimize power consumption by a terminal in a next-generation mobile communication system.

Figure 2A:
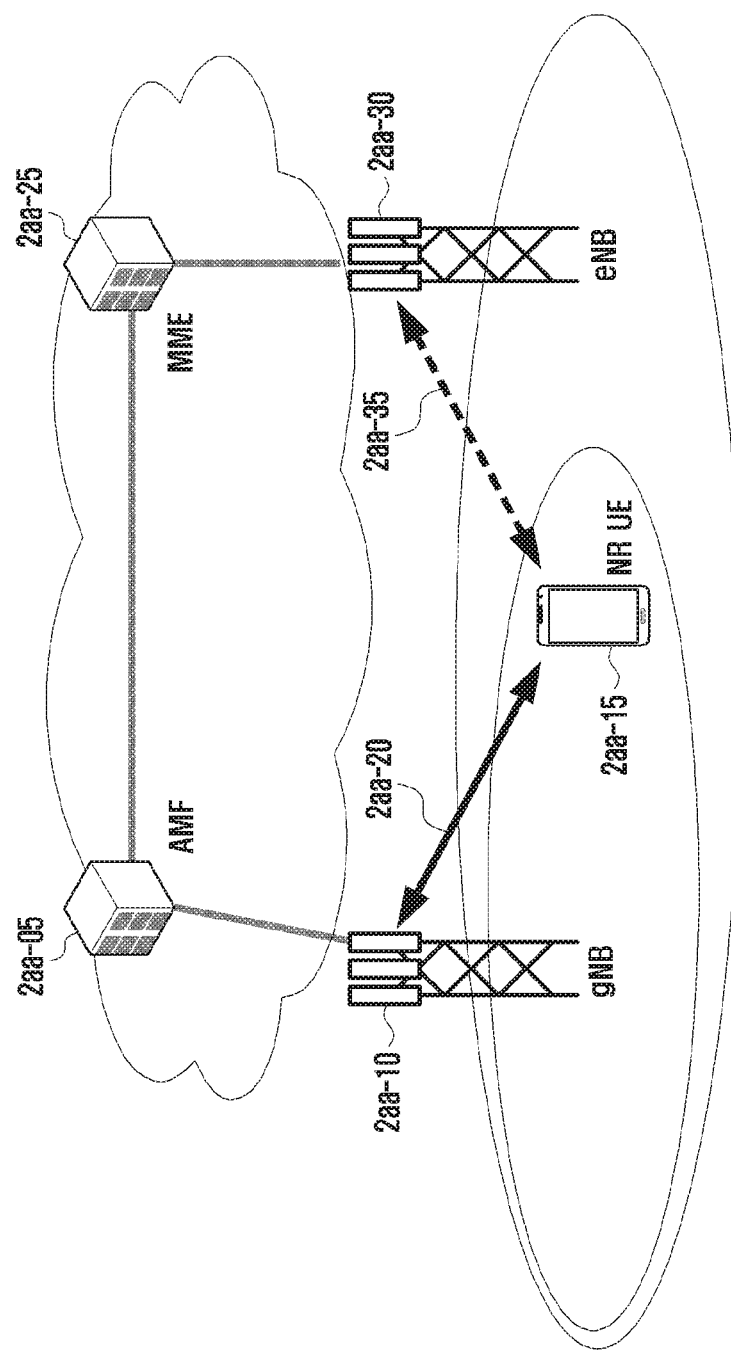
FIG. 2AA illustrates a diagram of the structure of a next-generation mobile communication system according to an embodiment.
Figure 2A:
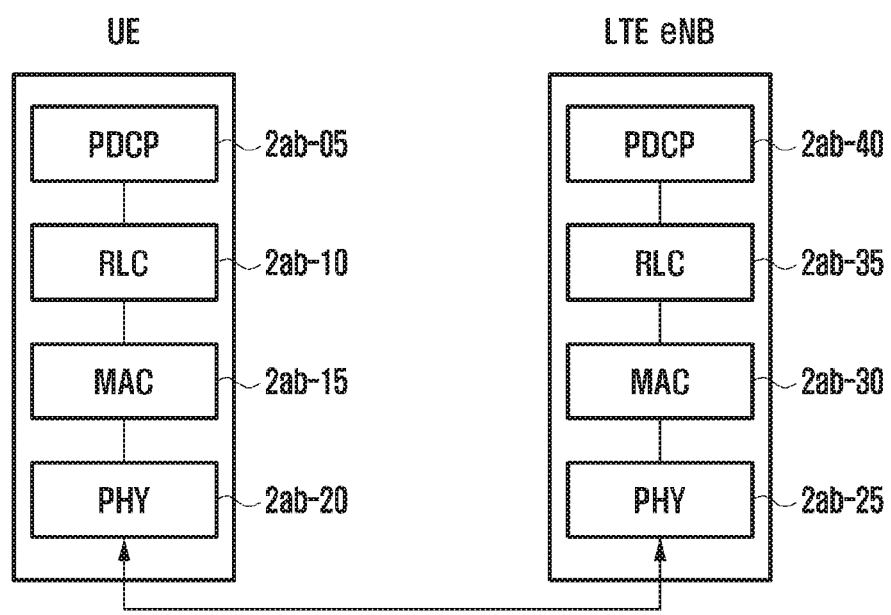
Figure 2A:
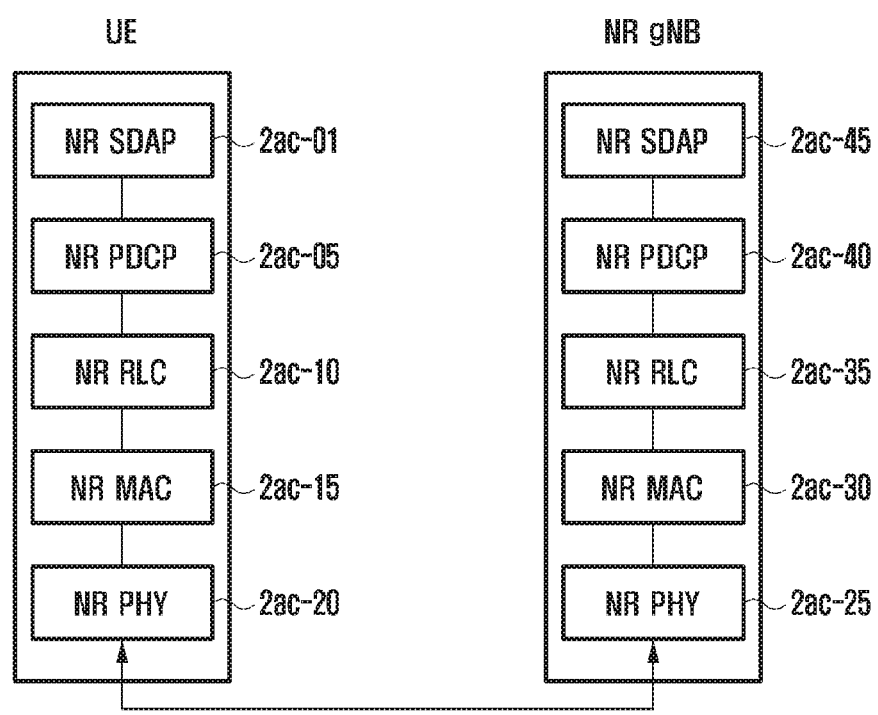

FIG. 2AA illustrates a diagram illustrating the structure of a next-generation mobile communication system according to an embodiment.

Referring to FIG. 2AA, a radio access network of a next-generation mobile communication system {new radio (NR)} includes a new radio node B (hereinafter, referred to as a "gNB") 2*aa*-10, an AMF 2*aa*-05, and a new radio core network, as shown in the drawing. A new radio user equipment (hereinafter, referred to as an "NR UE" or a "terminal") 2*aa*-15 accesses an external network through the gNB 2*aa*-10 and the AMF 2*aa*-05.

In FIG. 2AA, the gNB 2*aa*-10 corresponds to an evolved node B (eNB) of an existing LTE system. The gNB 2*aa*-10 is connected to the NR UE 2*aa*-15 through a radio channel 2*aa*-20, and may provide services superior to those of the existing node B. In the next-generation mobile communication system, since all user traffic is served through a shared channel, a device for collecting status information, such as buffer status, available transmission power status, and channel status of UEs, and performing scheduling is required. The gNB 2*aa*-10 serves as such a device. One gNB typically controls multiple cells. In order to realize super-high data rates compared to the existing LTE system, the next-generation mobile communication system may have a bandwidth equal to or greater than the maximum bandwidth of the existing system, may use, as a radio access technique, orthogonal frequency division multiplexing (hereinafter, referred to as "OFDM"), and may further employ a beamforming technique in addition thereto. In addition, an adaptive modulation and coding (hereinafter, referred to as "AMC") scheme is applied to determine a modulation scheme and a channel coding rate in accordance with the channel status of a terminal.

The AMF 2*aa*-05 performs functions such as mobility support, bearer configuration, and quality-of-server (QoS) configuration. The AMF 2*aa*-05 is a device that performs various control functions, as well as a mobility management function for a terminal, and is connected to a plurality of base stations. In addition, the next-generation mobile communication system may interwork with an existing LTE system, and the AMF 2*aa*-05 is connected to the MME 2*aa*-25 through a network interface. The MME 2*aa*-25 is connected to the eNB 2*aa*-30, which is an existing base station. A terminal 2*aa*-15 supporting LTE-NR dual connectivity may transmit/receive data to/from the eNB 2*aa*-30 while maintaining the connection to the eNB 2*aa*-30, as well as the gNB 2*aa*-10 (2*aa*-35).

For the definition and system configuration of the NR-DC, reference is to be made to the description made with reference to FIGS. 1AB and 1AC in the first embodiment. For the configuration of a BWP, reference is to be made to the description made with reference to FIGS. 1AE and 1AD in the first embodiment.

One of the reasons for measuring the neighbor cells and reporting the same to the base station is to support mobility of the terminal. If the signal quality of the current serving cell deteriorates, and if the signal quality of a neighboring cell becomes good, the base station instructs the terminal to perform handover to the neighboring cell. On the other hand, if the signal quality of the current serving cell is excellent, the operation of measuring the neighbor cell merely increases the power consumption by the terminal. Accordingly, the disclosure proposes a method of pausing the operation of measuring neighboring cells in consideration of dual connectivity technology, in order to reduce power consumption by the terminal, if a current serving cell provides a signal of a predetermined strength or more. In the disclosure, the above operation is called an "s-measure operation". The s-measure operation is limited to the NR frequency and cell.

FIG. 2AB illustrates a diagram of a radio protocol structure in an LTE system according to an embodiment.

Referring to FIG. 2AB, the radio protocol of an LTE system may include a packet data convergence protocol (PDCP) 2*ab*-05 or 2*ab*-40, a radio link control (RLC) 2*ab*-10 or 2*ab*-35, and a medium access control (MAC) 2*ab*-15 or 2*ab*-30 in a terminal and an eNB, respectively. The PDCP performs operations, such as IP header compression/decompression and the like. For the primary functions of the PDCP, the RLC, and the MAC, reference is to be made to FIG. 1AF in the first embodiment.

FIG. 2AC illustrates a diagram of a radio protocol structure of a next-generation mobile communication system according to an embodiment.

Referring to FIG. 2AC, the radio protocol of the next-generation mobile communication system includes NR service data adaption protocol (SDAP) 2*ac*-01 or 2*ac*-45, NR PDCP 2*ac*-05 or 2*ac*-40, NR RLC 2*ac*-10 or 2*ac*-35, NR MAC 2*ac*-15 or 2*ac*-30, and NR PHY 2*ac*-20 or 2*ac*-25 in a terminal and an NR base station, respectively. For the primary functions of the NR PDCP, the NR RLC, and the NR MAC, reference is to be made to FIG. 1AG in the first embodiment.

For the configuration of the SS block and the method of transmitting the SS block, reference is to be made to the configuration described with reference to FIGS. 1AH, 1AI, 1AJ, and 1AK of the first embodiment. For the frame structure, reference is to be made to the configuration described with reference to FIG. 1AL of the first embodiment. For the initial access procedure, reference is to be made to the configuration described with reference to FIG. 1AM of the first embodiment.

FIG. 2B illustrates a flowchart of a process of performing a cell measurement operation according to an embodiment.

The terminal 2b-05 performs a connection establishment procedure with a first base station 2b-10 and then switches to a connected mode (2b-13). The first base station 2b-10 consults a second base station 2b-12, thereby triggering dual connectivity (DC). The dual connectivity (DC) refers to technology in which a terminal receives a wireless communication service while being connected to a plurality of base stations. The first base station 2b-10 is a master node (MN), and configures, to the terminal 2b-05, one or more serving cells of the second base station 2b-12 {i.e., a secondary node (SN)} (2b-14). If both the first base station 2b-10 and the second base station 2b-12 are NR base stations, the state may be referred to as "NR-DC"; if the first base station 2b-10 is an LTE base station and if the second base station 2b-12 is an NR base station, the state may be referred to as "EN-DC"; and if the first base station 2b-10 is an NR base station and if the second base station 2b-12 is an LTE base station, the state may be referred to as "NE-DC".

The first base station 2b-10 transmits configuration information related to cell measurement to the terminal 2b-05 in a connected mode through a predetermined RRC message (2b-15). The configuration information related to cell measurement (measConfig IE) may be primarily including "measObject", "reportConfig", and "measId" indicating a combination of one "measObject" and one "reportConfig". "measObject" contains information on the frequency and the cell to be measured, and "reportConfig" includes information to be applied for reporting the collected measurement information, periodic or event-based report time information, measurement information to report, and the like. "measObject", "reportConfig", and "measId" are configured in the form of a list, such as "measObjectToRemoveList", "measObjectToAddModList", "reportConfigToRemoveList", "reportConfigToAddModList", "measIdToRemoveList", and "measIdToAddModList", and are provided to the terminal 2b-05. In addition, configuration information related to cell measurement, such as "s-MeasureConfig", "quantityConfig", "measGapConfig", "measGapSharingConfig", and the like, is provided to the terminal 2b-05. In addition, configuration information related to cell measurement, such as "s-MeasureConfig", "quantityConfig", "measGapConfig", "measGapSharingConfig", and the like, is also provided to the terminal 2b-05. The second base station 2b-12 may also transmit the information related to the cell measurement to the terminal 2b-05 in a connected mode through a predetermined RRC message (2b-17).

Since an NR base station may have a plurality of SCSs of the SS/PBCH to be transmitted, "MeasObjectNR" information may indicate the SCS value of the SS/PBCH block to be measured. In addition, since several SS/PBCH blocks may be located in the operating cell, the base station is able to inform the terminal of the frequency position of the SS/PBCH block that is to be measured by the terminal. Since an NR terminal has one or more configured BWPs, the base station is capable of configuring one or more BWPs to be measured and informing the terminal of the same. The terminal may measure the BWP, based on the information received from the base station. Alternatively, the NR terminal is capable of measuring the SS/PBCH block or the CSI-RS included in the activated BWP.

See Table 1 for the MeasObjectNR information element.

Upon receiving the information, the terminal 2b-05 applies the cell measurement information (2b-20).

In the disclosure, the terminal 2b-05 determines one serving cell for the s-measure operation (2b-30). If DC is not configured in the terminal 2b-05, the terminal always selects the PCell. On the other hand, if DC is configured in the terminal 2b-05, in an embodiment, the terminal selects the SpCell belonging to NR. More specifically, since the SpCell belonging to NR is the PSCell in EN-DC, and since the SpCell belonging to NR is the PCell in NE-DC, only one SpCell can belong to NR in EN-DC and NE-DC. Accordingly, the cell belonging to NR is selected. On the other hand, there are a PCell and a PSCell as the SpCells belonging to NR in NR-DC. According to an embodiment, the PCell is always selected from among the SpCells belonging to NR in NR-DC.

In another embodiment, the terminal in the NR-DC, EN-DC, or NE-DC state, if one NR SpCell is configured according to the number of SpCells belonging to the configured NR, selects an NR PSCell and an NR PCell in EN-DC and NE-DC, respectively, and if two or more NR SpCells are configured, the terminal always selects an NR PCell.

In another embodiment, it is possible to determine the serving cell for each operation frequency if DC is configured. In an embodiment, the terminal in the NR-DC, EN-DC, or NE-DC state, if one NR SpCell is configured according to the number of SpCells belonging to the configured NR, selects an NR PSCell and an NR PCell in EN-DC and NE-DC, respectively. If two or more NR SpCells are configured, and if there are NR SpCell 1 operating in FR1 and NR SpCell 2 operating in FR2, the terminal selects both NR SpCell 1 and NR SpCell 2 as serving cells. More specifically, the terminal may determine the serving cell for "s-measure", based on the RRC information for configuring DC.

In another embodiment of NR-DC, each of the MN and the SN provides a separate "s-measure" to be applied to the cell measurement operation, which is configured by the MN and the SN, to the terminal. Upon receiving the two "s-measures", the terminal 2b-05 compares the RSRP of the PCell of the MN with "s-measure" applied to the cell measurement operation, which is configured by the MN, and compares the RSRP of the PSCell of the SN with "s-measure" applied to the measurement operation, which is configured by the SN. The MN may provide both "s-measure" applied to the cell measurement operation, which is configured by the MN, and "s-measure" applied to the cell measurement operation, which is configured by the SN, to the terminal 2b-05, and the SN may provide "s-measure" applied to the cell measurement operation, which is configured by the SN. If both the MN and the SN provide the terminal 2b-05 with "s-measures" applied to the cell measurement operation, which are configured by the SN, one of the two values is selected and applied. In this case, "s-measure" having the highest value may be applied, or "s-measure" provided by a specific node may be applied.

"s-MeasureConfig" stores a predetermined SSB-RSRP threshold and a CSI-RSRP threshold. If "s-MeasureConfig" is not provided, if the RSRP value measured from the SSB of the selected serving cell is less than the SSB-RSRP threshold, or if the RSRP value measured from the CSI-RS of the selected serving cell is less than the SSB-RSRP threshold (2b-25), the terminal 2b-05 measures the frequency indicated by "measObject" (2b-30). The determination as to whether or not to perform measurement is made every predetermined period. If "rsType" contained in "reportConfig" indicates "csi-rs", the terminal 2b-05 derives an RSRP or RSRQ value obtained by measuring the CSI-RS, which will be described below. If "rsType" contained in "reportConfig" indicates an SSB, the terminal derives an RSRP or RSRQ value obtained by measuring the SSB, which will be described below.

If "reportQuantityRS-Indexes" and "maxNrofRS-IndexesToReport" are contained in "reportConfig", the terminal derives a measurement value indicated by "reportQuantityRS-Indexes" contained in "reportConfig" by performing 3-filtered beam measurement. "reportQuantityRS-Indexes" may have one of RSRP, RSRQ, and SINR (signal-to-interference plus noise ratio).

In addition, the terminal derives a measurement value of the cell level indicated by "reportQuantityCell" contained in "measObject". "reportQuantityCell" may have one of RSRP, RSRQ, and SINR.

The terminal 2b-05 includes the measured result in a predetermined RRC message periodically or on an event basis, and reports the same to the base stations 2b-10 and 2b-12 (2b-35).

Figure 2C:
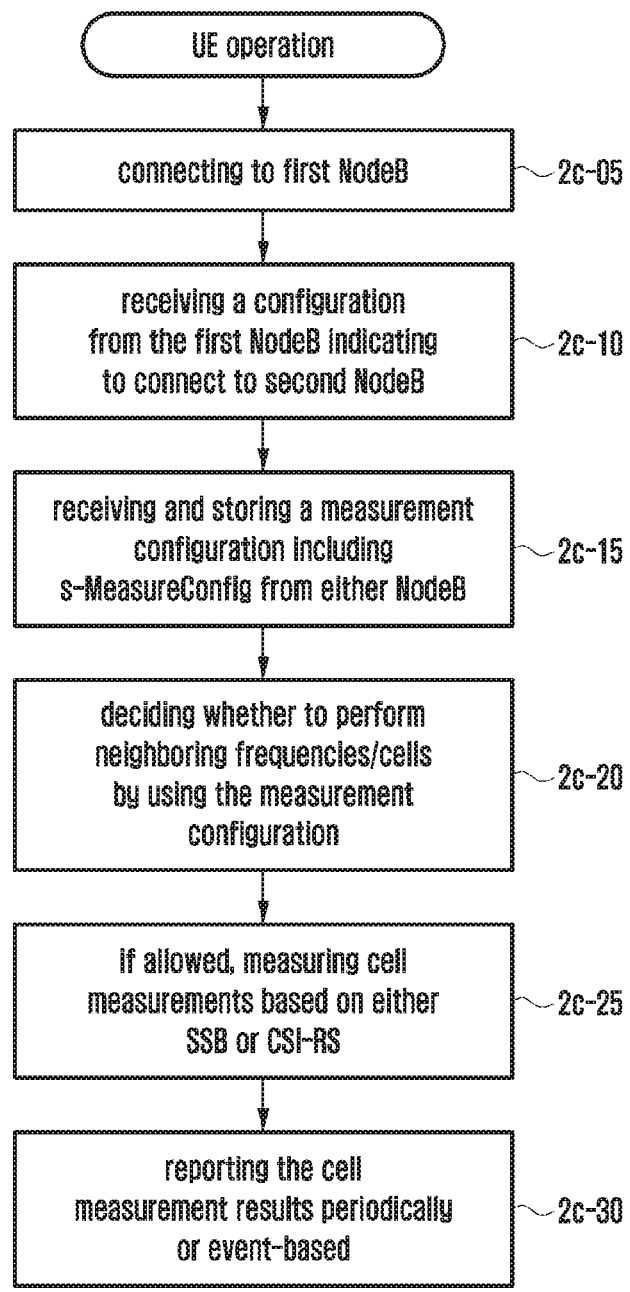
FIG. 2C illustrates a flowchart of the operation of a terminal for performing a cell measurement operation according to an embodiment.

FIG. 2C illustrates a flowchart of the operation of a terminal for performing a cell measurement operation according to an embodiment.

In step 2c-05, a terminal connects with a first base station.

In step 2c-10, the terminal in a connected state with the first base station further connects with a second base station, based on configuration information received from the first base station.

In step 2c-15, the terminal receives measurement configuration including configuration information on "s-measure" from the first base station or the second base station.

In step 2c-20, the terminal applies the configuration information, thereby determining whether or not it is necessary to measure neighboring frequencies and cells.

In step 2c-25, if it is determined that the measurement is necessary, the terminal measures the SSB or CSI-RS indicated by the configuration information, thereby deriving a measurement result.

In step 2c-30, the terminal reports the measurement result to the base station using a predetermined RRC message.

The specific operation of the terminal is not limited thereto, and may include the operation of the terminal described with reference to FIG. 2B.

Figure 2D:
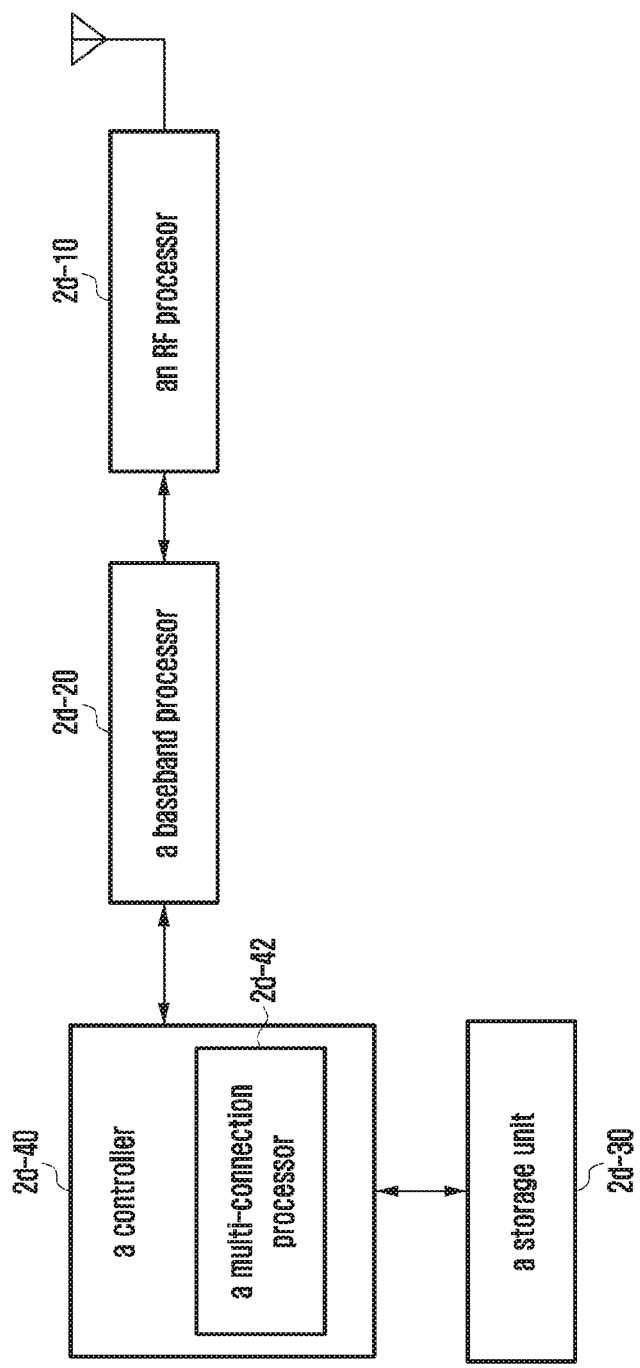
FIG. 2D illustrates a diagram of the configuration of a terminal according to an embodiment.

FIG. 2D illustrates a diagram of the configuration of a terminal according to an embodiment.

Referring to FIG. 2D, the terminal includes a radio frequency (RF) processor 2d-10, a baseband processor 2d-20, a storage unit 2d-30, and a controller 2d-40. The controller 2d-40 may further include a multi-connection processor 2d-42.

The RF processor 2d-10 performs a function of transmitting and receiving a signal through a radio channel, such as band conversion and amplification of a signal. That is, the RF processor 2d-10 up-converts a baseband signal provided from the baseband processor 2d-20 to an RF band signal to thus transmit the same through an antenna, and down-converts an RF band signal received through the antenna to a baseband signal. For example, the RF processor 2d-10 may include a transmission filter, a reception filter, an amplifier, a mixer, an oscillator, a digital-to-analog converter (DAC), an analog-to-digital converter (ADC), and the like. Although only one antenna is illustrated in FIG. 2D, the terminal may have a plurality of antennas. In addition, the RF processor 2d-10 may include a plurality of RF chains. Further, the RF processor 2d-10 may perform beamforming. To perform beamforming, the RF processor 2d-10 may adjust the phases and magnitudes of signals transmitted and received through a plurality of antennas or antenna elements. In addition, the RF processor may perform MIMO, and may receive multiple layers when performing the MIMO operation.

The baseband processor 2d-20 performs a function of conversion between a baseband signal and a bit string according to the physical layer specification of the system. For example, in the case of data transmission, the baseband processor 2d-20 encodes and modulates transmission bit strings, thereby generating complex symbols. In addition, when receiving data, the baseband processor 2d-20 demodulates and decodes a baseband signal provided from the RF processor 2d-10 to thus recover reception bit strings. For example, in the case where an orthogonal frequency division multiplexing (OFDM) scheme is applied, when transmitting data, the baseband processor 2d-20 generates complex symbols by encoding and modulating transmission bit strings, maps the complex symbols to subcarriers, and then configures OFDM symbols through an inverse fast Fourier transform (IFFT) operation and cyclic prefix (CP) insertion. In addition, when receiving data, the baseband processor 2d-20 divides the baseband signal provided from the RF processor 2d-10 into OFDM symbol units, restores the signals mapped to the subcarriers through a fast Fourier transform (FFT) operation, and then restores reception bit strings through demodulation and decoding.

The baseband processor 2d-20 and the RF processor 2d-10 transmit and receive signals as described above. Accordingly, the baseband processor 2d-20 and the RF processor 2d-10 may be referred to as a "transmitter", a "receiver", a "transceiver", or a "communication unit". Further, at least one of the baseband processor 2d-20 and the RF processor 2d-10 may include a plurality of communication modules in order to support a plurality of different radio access techniques. In addition, at least one of the baseband processor 2d-20 and the RF processor 2d-10 may include different communication modules to process signals in different frequency bands. For example, the different radio access techniques may include a wireless LAN (e.g., IEEE 802.11), a cellular network (e.g., LTE), and the like. In addition, the different frequency bands may include super-high frequency (SHF) (e.g., 2.NRHz or NRHz) bands or millimeter wave (e.g., 60 GHz) bands.

The storage unit 2d-30 stores data such as fundamental programs, application programs, and configuration information for the operation of the terminal. In particular, the storage unit 2d-30 may store information related to a second access node that performs wireless communication using a second radio access technique. In addition, the storage unit 2d-30 provides the stored data at the request of the control unit 2d-40.

The controller 2d-40 controls the overall operation of the terminal. For example, the controller 2d-40 transmits and receives signals through the baseband processor 2d-20 and the RF processor 2d-10. In addition, the controller 2d-40 records and reads data in and from the storage unit 2d-30. To this end, the controller 2d-40 may include at least one processor. For example, the controller 2d-40 may include a communication processor (CP) for controlling communication and an application processor (AP) for controlling higher-layers such as application programs.

Figure 2E:
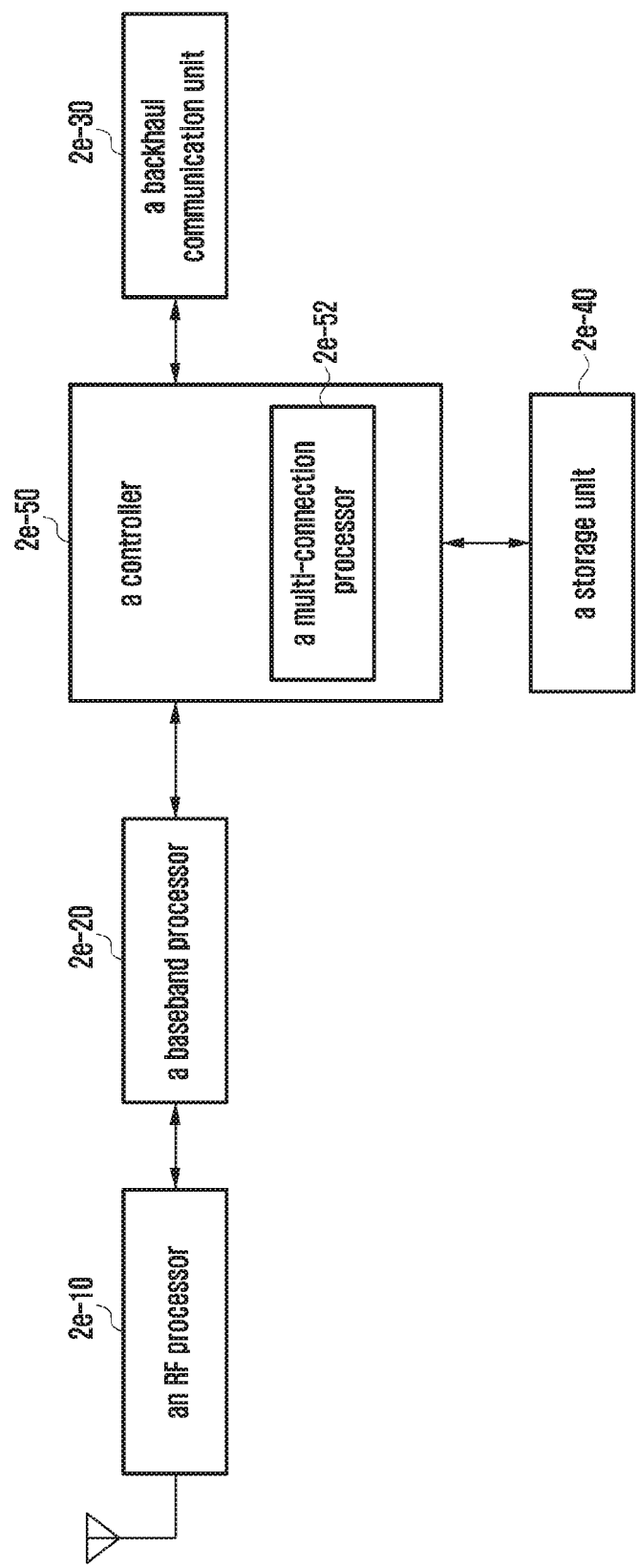
FIG. 2E illustrates a diagram of the configuration of a base station according to an embodiment.

FIG. 2E illustrates a diagram of the configuration of a base station according to an embodiment.

As shown in FIG. 2E, the base station includes an RF processor 2e-10, a baseband processor 2e-20, a backhaul communication unit 2e-30, a storage unit 2e-40, and a controller 2e-50. The controller 2e-50 may further include a multi-connection processor 2e-52.

The RF processor 2e-10 performs a function of transmitting and receiving signals, such as band conversion and amplification of a signal, through a radio channel. That is, the RF processor 2e-10 up-converts a baseband signal provided from the baseband processor 2e-20 to an RF band signal to thus transmit the same through an antenna, and down-converts an RF band signal received through the antenna to a baseband signal. For example, the RF processor 2e-10 may include a transmission filter, a reception filter, an amplifier, a mixer, an oscillator, a DAC, an ADC, and the like. Although only one antenna is shown in the drawing, the first access node may have a plurality of antennas. In addition, the RF processor 2e-10 may include a plurality of RF chains. Further, the RF processor 2e-10 may perform beamforming. To perform beamforming, the RF processor 2e-10 may adjust the phases and magnitudes of signals transmitted and received through a plurality of antennas or antenna elements. The RF processor may perform a downlink MIMO operation by transmitting one or more layers.

The baseband processor 2e-20 performs a function of conversion between a baseband signal and a bit string according to a physical layer specification of a first radio access technique. For example, when transmitting data, the baseband processor 2e-20 encodes and modulates transmission bit strings, thereby generating complex symbols. In addition, when receiving data, the baseband processor 2e-20 demodulates and decodes a baseband signal provided from the RF processor 2e-10 to thus recover reception bit strings. For example, in the case where an OFDM scheme is applied, when transmitting data, the baseband processor 2e-20 generates complex symbols by encoding and modulating transmission bit strings, maps the complex symbols to subcarriers, and then configures OFDM symbols through the IFFT operation and CP insertion. In addition, when receiving data, the baseband processor 2e-20 divides the baseband signal provided from the RF processor 2e-10 into OFDM symbol units, restores the signals mapped to the subcarriers through the FFT operation, and then restores reception bit strings through demodulation and decoding. The baseband processor 2e-20 and the RF processor 2e-10 transmit and receive signals as described above. Accordingly, the baseband processor 2e-20 and the RF processor 2e-10 may be referred to as a "transmitter", a "receiver", a "transceiver", a "communication unit", or a "wireless communication unit".

The backhaul communication unit 2e-30 provides an interface for performing communication with other nodes in the network. That is, the backhaul communication unit 2e-30 converts a bit string, transmitted from the base station to another node, such as a secondary base station, a core network, etc., into a physical signal, and converts physical signals received from other nodes into bit strings.

The storage unit 2e-40 stores data such as fundamental programs, application programs, and configuration information for the operation of the base station. In particular, the storage unit 2e-40 may store information about bearers allocated to a connected terminal, a measurement result reported from a connected terminal, and the like. In addition, the storage unit 2e-40 may store information that is a criterion for determining whether a multi-connection is provided to the terminal or is released. In addition, the storage unit 2e-40 provides the stored data in response to a request from the controller 2e-50.

The controller 2e-50 controls the overall operation of the base station. For example, the controller 2e-50 transmits and receives signals through the baseband processor 2e-20 and the RF processor 2e-10 or the backhaul communication unit 2e-30. In addition, the controller 2e-50 records and reads data in and from the storage unit 2e-40. To this end, the controller 2e-50 may include at least one processor.

The description of the block diagram $00 of electronic device #01 for supporting legacy network communication and 5G network communication described with reference to FIG. 1H may also be applied to the second embodiment.

Third Embodiment

A third embodiment relates to a method and an apparatus for reporting a measurement result by a terminal supporting dual connectivity in a next-generation mobile communication system.

Figure 3A:
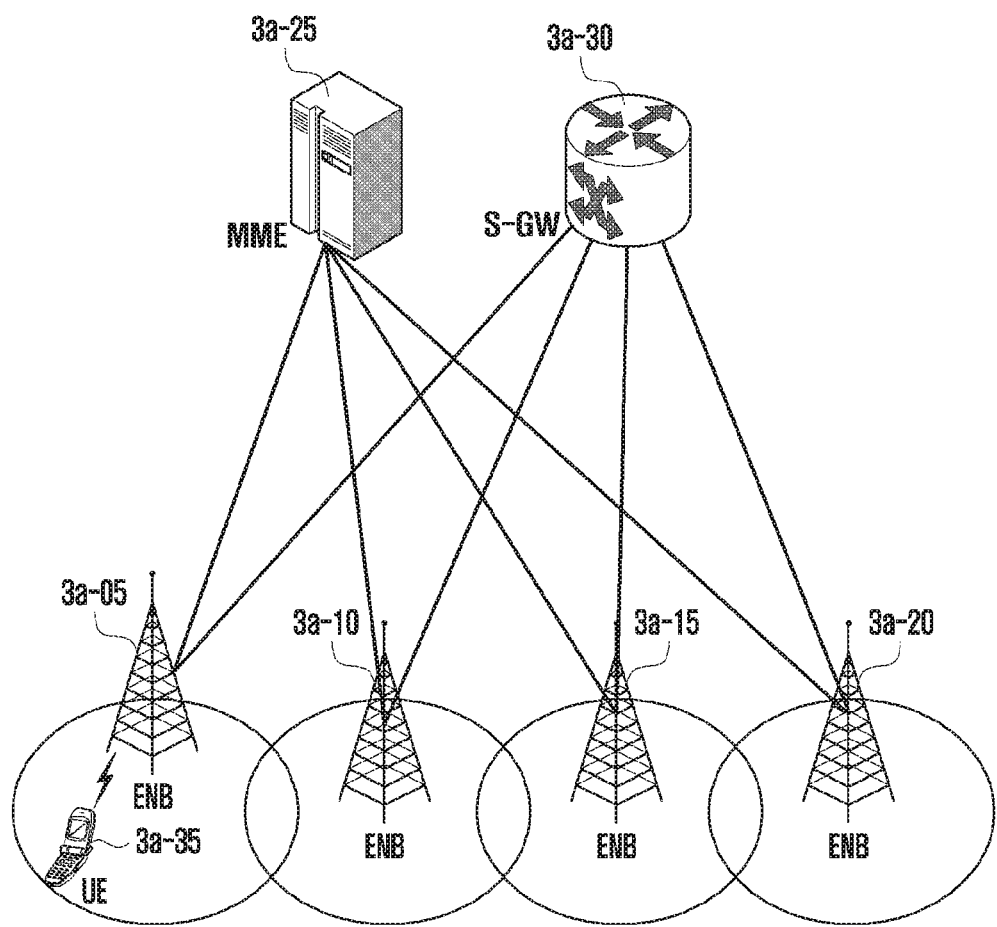
FIG. 3A illustrates a diagram of the structure of an LTE system according to an embodiment.

FIG. 3A illustrates a diagram of the structure of an LTE system according to an embodiment.

Referring to FIG. 3, a radio access network of an LTE system may include evolved Node Bs) (hereinafter, referred to as "ENBs", "Node Bs", or "base stations") 3a-05, 3a-10, 3a-15, and 3a-20, a mobility management entity (MME) 3a-25, and a serving-gateway (S-GW) 3a-30. User equipment (hereinafter, referred to as "UE" or a "terminal") 3a-35 accesses an external network through the ENBs 3a-05, 3a-10, 3a-15, and 3a-20 and the S-GW 3a-30.

In FIG. 3, the ENBs 3a-05, 3a-10, 3a-15, and 3a-20 may correspond to existing Node Bs of a universal mobile telecommunication system (UMTS). The ENBs 3a-05, 3a-10, 3a-15, and 3a-20 may be connected to the UE 3a-35 via a radio channel, and may play a more complex role than the existing Node B. In the LTE system, all user traffic including real-time services, such as voice-over-IP (VoIP) through the Internet protocol, is served through a shared channel. Therefore, a device for collecting status information, such as buffer status, available transmission power status, and channel status of UEs, and performing scheduling is required. The ENBs 3a-05, 3a-10, 3a-15, and 3a-20 serve as such a device.

One ENB typically controls multiple cells. For example, in order to realize a data rate of 100 Mbps, the LTE system uses, as radio access technology, orthogonal frequency division multiplexing (hereinafter, referred to as "OFDM") in, for example, a 20 MHz bandwidth. Further, an adaptive modulation and coding (hereinafter, referred to as "AMC") scheme is applied to determine a modulation scheme and a channel coding rate in accordance with the channel status of a terminal. The S-GW 3a-30 is a device for providing data bearers, and generates or removes data bearers under the control of the MME 3a-25. The MME 3a-25 is a device that performs various control functions, as well as a mobility management function for a terminal, and may be connected to a plurality of base stations.

For the configuration of the SS block and the method of transmitting the SS block, reference is to be made to the configuration described with reference to FIGS. 1AH, 1AI, 1AJ, and 1AK of the first embodiment. For the frame structure, reference is to be made to the configuration described with reference to FIG. 1AL of the first embodiment. For the initial access procedure, reference is to be made to the configuration described with reference to FIG. 1AM of the first embodiment.

Figure 3B:
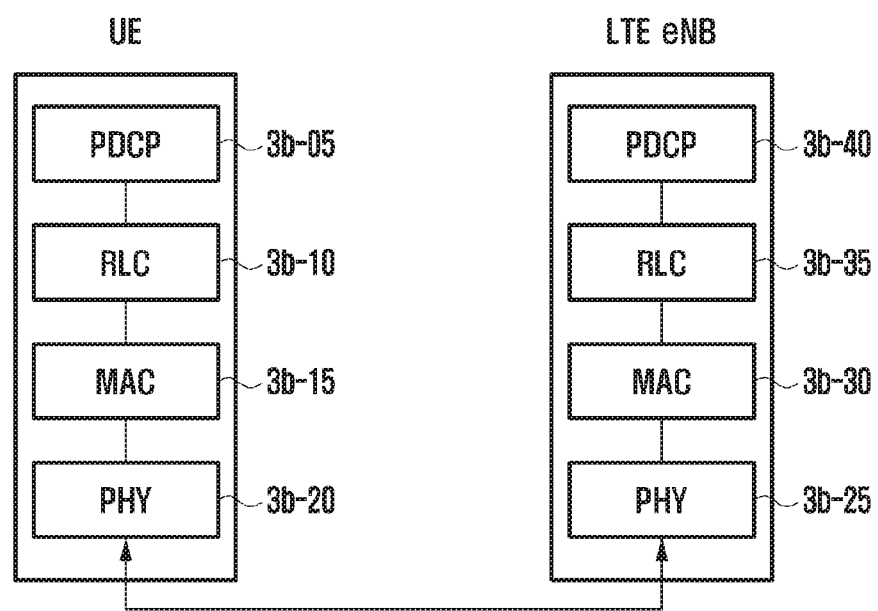
FIG. 3B illustrates a diagram of a radio protocol structure in an LTE system according to an embodiment.

FIG. 3B illustrates a diagram of a radio protocol structure in an LTE system according to an embodiment.

Referring to FIG. 3B, the radio protocol of an LTE system may include a packet data convergence protocol (PDCP) 3b-05 or 3b-40, a radio link control (RLC) 3b-10 or 3b-35, and a medium access control (MAC) 3b-15 or 3b-30 in a terminal and an ENB, respectively. For the primary functions of the PDCP, the RLC, and the MAC, reference is to be made to FIG. 1AF in the first embodiment.

Figure 3C:
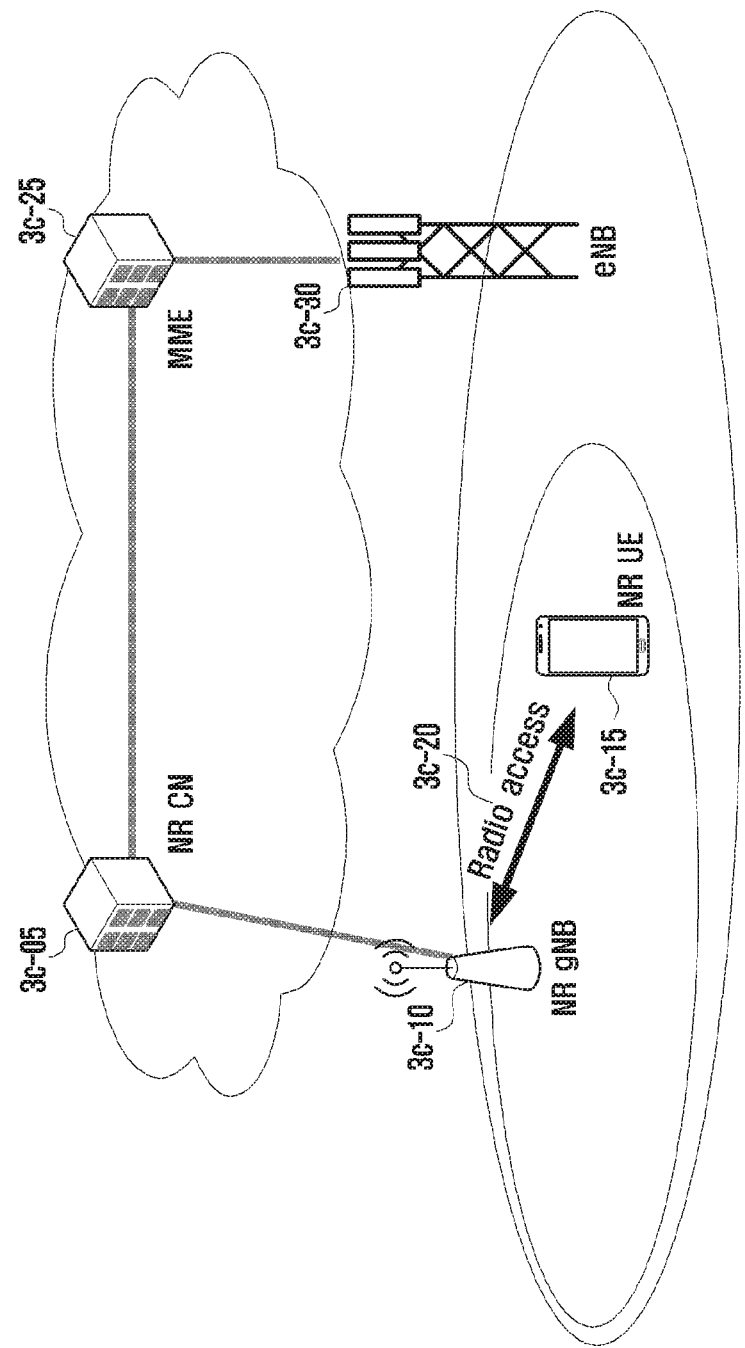
FIG. 3C illustrates a diagram of the structure of a next-generation mobile communication system according to an embodiment.

FIG. 3C illustrates a diagram of the structure of a next-generation mobile communication system according to an embodiment.

Referring to FIG. 3C, a radio access network of a next-generation mobile communication system (hereinafter, referred to as "NR" or "5G") may include a new radio node B (hereinafter, referred to as an "NR gNB" or an "NR base station") 3c-10 and a new radio core network (hereinafter, referred to as an "NR CN") 3c-05. New radio user equipment (hereinafter, referred to as "NR UE" or a "terminal") 3c-15 accesses an external network through the NR gNB 3c-10 and the NR CN 3c-05.

In FIG. 3C, the NR gNB 3c-10 corresponds to an evolved Node B (eNB) in an existing LTE system. The NR gNB 3c-10 is connected to the NR UE 3c-15 through a radio channel, and may provide services superior to those of the existing node B. In the next-generation mobile communication system, all user traffic is served through a shared channel. Therefore, a device for collecting status information, such as buffer status, available transmission power status, and channel status of UEs, and performing scheduling is required. The NR NB 3c-10 serves as such a device. One NR gNB 3c-10 may control multiple cells. In order to realize super-high data rates compared to the existing LTE system, the next-generation mobile communication system may have a bandwidth equal to or greater than the maximum bandwidth of the existing system. In addition, the next-generation mobile communication system may use, as radio access technology, orthogonal frequency division multiplexing (OFDM), and may further employ a beamforming technique in addition thereto. In addition, an adaptive modulation and coding (hereinafter, referred to as "AMC") scheme may be applied to determine a modulation scheme and a channel coding rate in accordance with the channel status of a terminal.

The NR CN 3c-05 performs functions such as mobility support, bearer configuration, and QoS configuration. The NR CN 3c-05 is a device that performs various control functions, as well as a mobility management function for a terminal, and may be connected to a plurality of base stations. In addition, the next-generation mobile communication system may interwork with an existing LTE system, and the NR CN 3c-05 may be connected to the MME 3c-25 through a network interface. The MME 3c-25 may be connected to the eNB 3c-30, which is an existing base station.

For the definition and system configuration of the NR-DC, reference is to be made to the description made with reference to FIGS. 1AB and 1AC in the first embodiment. For the configuration of a BWP, reference is to be made to the description made with reference to FIGS. 1AE and 1AD in the first embodiment.

Figure 3D:
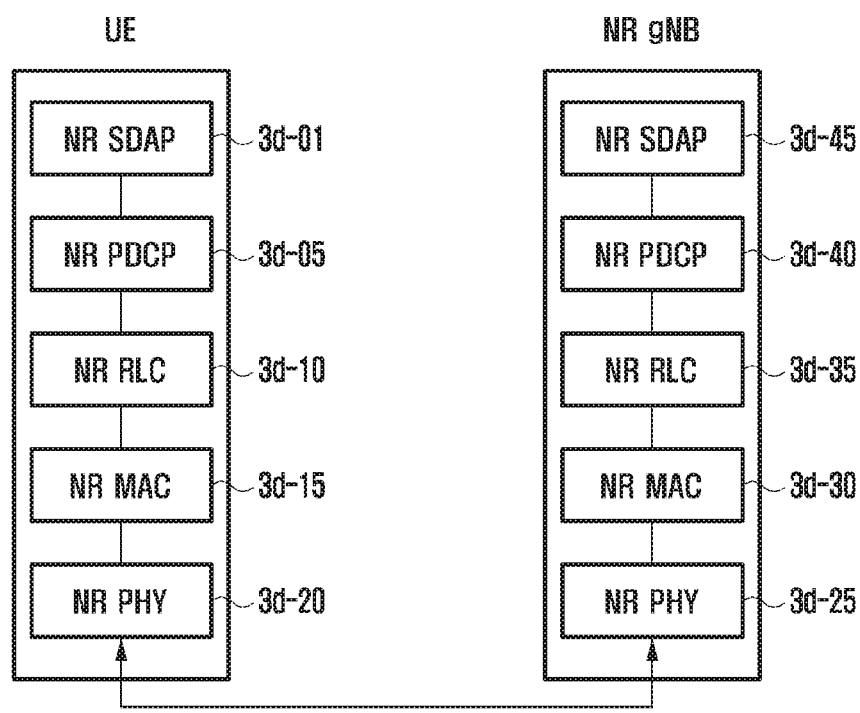
FIG. 3D illustrates a diagram of a radio protocol structure of a next-generation mobile communication system according to an embodiment.

FIG. 3D illustrates a diagram of a radio protocol structure of a next-generation mobile communication system according to an embodiment.

Referring to FIG. 3D, the radio protocol of the next-generation mobile communication system includes NR service data adaptation protocol (SDAP) 3d-01 or 3d-45, NR PDCP 3d-05 or 3d-40, NR RLC 3d-10 or 3d-35, NR MAC 3d-15 or 3d-30, and NR PHY 3d-20 or 3d-25 in a terminal and an NR base station, respectively. For the primary functions of the NR PDCP, the NR RLC, and the NR MAC, reference is to be made to FIG. 1AG in the first embodiment.

Figure 3E:
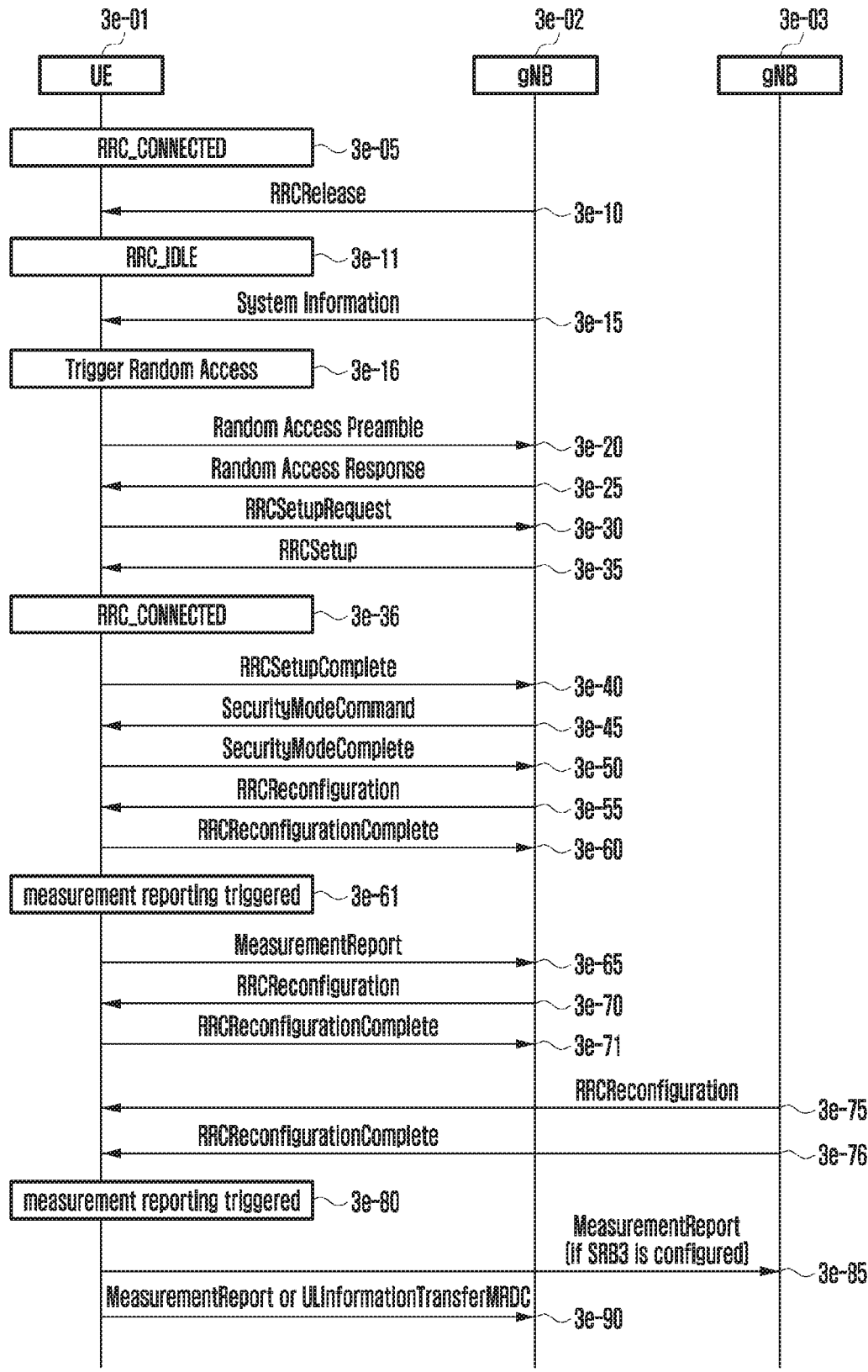
FIG. 3E illustrates a diagram of a procedure in which a terminal establishing dual connectivity (hereinafter, referred to as "DC") reports a measurement result to a base station, based on a measurement configuration according to an embodiment.

FIG. 3E illustrates a diagram of a procedure in which a terminal having established dual connectivity (hereinafter, referred to as "DC") reports a measurement result to a base station, based on measurement configuration according to an embodiment.

Referring to FIG. 3E, a terminal 3e-01 may establish an RRC connection with a base station 3e-02 to thus switch to an RRC-connected mode (3e-05). If there is no transmission or reception of data for a predetermined reason or for a predetermined time, the base station 3e-02 may transmit an RRC connection release message ("RRCRelease"), excluding suspend configuration information ("suspendConfig"), to the terminal 3e-01 (3e-10). Upon receiving the RRC connection release message, the terminal 3e-01 may switch from the RRC-connected mode to an RRC-idle mode (3e-11).

The terminal 3e-01 in the RRC-idle mode may discover an appropriate cell through a cell selection procedure and/or a cell reselection procedure to thus camp thereon, thereby receiving system information (3e-15). The terminal 3e-01 may perform random access to the base station 3e-02 in order to establish an RRC connection therewith. When the random access is triggered (3e-16), the terminal 3e-01 may select a physical random access channel (PRACH) occasion, thereby transmitting a random access preamble to the base station 3e-02 (3e-20). Upon receiving the random access preamble, the base station 3e-02 may transmit a random access response (hereinafter, referred to as "RAR") message to the terminal 3e-01 (3e-25). The terminal 3e-01 in the RRC-idle mode may establish reverse-link transmission synchronization with the base station 3e-02 through steps 3e-20 and 3e-25. Meanwhile, in the embodiment, the same reference numeral is used for the base station in step 3e-10 and the base stations in step 3e-15 and steps subsequent thereto for the convenience of description, but the base stations prior to step 3e-15 and the base stations in the step 3e-15 and steps subsequent thereto may be different from each other depending on the mobility of the terminal and the results of selection and reselection of the cell.

The terminal 3e-01 having established the reverse-link transmission synchronization may perform an RRC connection establishment procedure with the base station 3e-02. First, the terminal 3e-01 may transmit an RRC connection setup request message ("RRCSetupRequest") to the base station 3e-02 (3e-30). The message may include, for example, an identifier of the terminal 3e-01 ("ue-Identity"), a cause for establishing an RRC connection ("establishmentCause"), and the like. If the RRC connection setup request message is received, the base station 3e-02 may transmit an RRC connection setup message ("RRCSetup") to the terminal 3e-01 (3e-35). The RRC connection setup message may include radio bearer configuration information ("radioBearerConfig") and master cell group configuration information ("masterCellGroup"). If the RRC connection setup message is received, the terminal 3e-01 may apply the radio bearer configuration information and the master cell group configuration information, and may then switch to an RRC-connected mode (3e-36). The RRC connection establishment may involve a connection of signaling radio bearer1 (SRB1). Therefore, an RRC message, which is a control message between the terminal 3e-01 and the base station 3e-02, an RRC message including a NAS message, or an initial NAS message may be transmitted and received between the terminal 3e-01 and the base station 3e-02 through SRB1. The terminal 3e-01 that has switched to the RRC-connected mode may transmit an RRC connection setup completion message ("RRCSetupComplete") to the base station 3e-02 through SRB1 (3e-40). The RRC connection setup completion message may include a service request message for the terminal 3e-01 to make a request to the AMF or MME for bearer configuration for a predetermined service.

If the RRC connection establishment procedure is successfully performed, the base station 3e-02 may transmit a security mode command message ("SecurityModeCommand") to the terminal 3e-01 in order to activate AS security with respect to the terminal 3e-01 in the RRC-connected mode (3e-45). When the security mode command message is received and the AS security is activated, the terminal 3e-01 may transmit a security mode completion message ("SecurityModeComplete") to the base station (3e-50).

The base station 3e-02 may perform an RRC connection reconfiguration procedure with the terminal 3e-01 at the time of transmitting the security mode command message, after transmitting the security mode command message, or after receiving the security mode completion message. The base station 3e-02 may transmit an RRC connection reconfiguration message ("RRCReconfiguration") to the terminal 3e-01 (3e-55). The RRC connection reconfiguration message may include at least one piece of radio bearer configuration information ("radioBearerConfig"), master cell group information ("masterCellGroup"), or measurement configuration ("measConfig"). Upon receiving the RRC connection reconfiguration message, the terminal 3e-01 may apply the above information, and may then transmit an RRC connection reconfiguration completion message ("RRCReconfigurationComplete") to the base station 3e-02 (3e-60).

If the RRC connection reconfiguration message includes measurement configuration ("measConfig") in step 3e-55, the terminal 3e-01 in the RRC-connected mode may perform measurement by applying the information, and, if measurement reporting is triggered (3e-61), may transmit a measurement report message ("MeasurementReport") to the base station 3e-02 (3e-65).

The base station 3e-02 having successfully received the measurement report message may discuss with another base station 3e-03, and may then perform an RRC connection reconfiguration procedure in order to establish dual connectivity (DC) with respect to the terminal 3e-01 in the RRC-connected mode. DC according to an embodiment refers to a technique in which a terminal receives a wireless communication service through a master cell group (hereinafter, referred to as an "MCG") and a secondary cell group (hereinafter, referred to as an "SCG"). According to an embodiment, the first base station 3e-02 may denote an MCG, and the second base station 3e-03 may denote an SCG. The MCG may include a primary cell (hereinafter, referred to as a "PCell"), or may include a PCell and one or more secondary cells (hereinafter, referred to as "SCells"). The SCG may include a primary SCG cell (hereinafter, referred to as a "PSCell"), or may include a PSCell and one or more SCells. If DC is configured for the terminal 3e-01, a special cell may be a PCell of the MCG or a PSCell of the SCG.

The second base station 3e-03 may produce a message including at least one piece of NR secondary cell group information ("nr-SCG") or radio bearer configuration information 2 ("radioBearerConfig2"), and may transmit the same to the first base station 3e-02 in order to configure DC for the terminal 3e-01, and the first base station 3e-02 receiving the message may transmit an RRC connection reconfiguration message including the information to the terminal 3e-01 (3e-70). The secondary cell group information included in the RRC connection reconfiguration message may include at least one piece of secondary cell group configuration information ("secondaryCellGroup") and measurement configuration ("measConfig"). Alternatively, in the case where SRB3 is configured in the terminal 3e-01, the second base station 3e-03 may directly transmit, to the terminal, an RRC connection reconfiguration message including at least one piece of NR secondary cell group information ("nr-SCG") and radio bearer configuration information 2 ("radioBearerConfig2") (3e-75). The terminal 3e-02 having successfully received the RRC connection reconfiguration message from the first base station 3e-02 may apply the configuration information, and may then transmit an RRC connection reconfiguration completion message to the first base station 3e-02 (3e-71). The terminal 3e-01 may transmit/receive data to/from the first base station 3e-02 and the second base station 3e-03. Alternatively, the terminal 3e-01 having successfully received the RRC connection reconfiguration message from the second base station 3e-03 may apply the configuration information, and may then transmit an RRC connection reconfiguration completion message to the second base station 3e-03 (3e-76).

If the RRC connection reconfiguration message includes measurement configuration ("measConfig") in step 3e-70 or 3e-75, the terminal 3e-01 may apply the received measurement configuration and then store the same. The measurement configuration may include at least one of "measObjectToRemoveList", "measObjectToAddModList", "reportConfigToRemoveList", "reportConfigToAddModList", "measIdToRemoveList", and "measIdToAddModList", measObjectToRemoveList: This may denote a list including one or more "MeasObjectIds" to be removed (an identifier used to identify a measurement object configuration).

measObjectToAddModList: This may denote a list including one or more pieces of measurement object information to be added or modified. Each piece of measurement object information may include "measObjectId" and "measObject" (a measurement object). One of "measObjectNR" for NR and "measObjectEUTRA" for LTE may be selected and contained in "measObject".

reportConfigToRemoveList: This may denote a list including one or more "ReportConfigIDs" to be removed (identifiers used to identify measurement reporting configurations).

reportConfigToAddModList: This may denote a list including one or more pieces of reporting configuration information to be added or modified. Each piece of reporting configuration information may include "reportConfigId" and "reportConfig". One of "reportConfigNR" for NR and "reportConfigInterRAT" for another radio access technology may be selected and contained in "reportConfig".

"reportConfigNR" may include information on criteria for triggering an NR measurement reporting event. For example, the first base station 3e-02 or the second base station 3e-03 may include information on criteria for triggering event A3 or event A5 in "reportConfigNR".

Event A3: the case in which the measurement result/signal of a neighboring cell becomes greater than the measurement result/signal of an SpCell by an offset Event A5: the case in which the measurement result/signal of an SpCell becomes less than a specific value (threshold1) and in which the measurement result/signal of a neighboring cell/Scell becomes greater than a specific value (threshold 2)

measIdToRemoveList: This may denote a list including one or more "MeasIds" to be removed (an identifier used to identify a measurement configuration and connecting "MeasObjectId" and "ReportConfigId").

measIdToAddModList: This may denote a list including one or more pieces of measurement identification information (measurement identities) to be added or modified. Each piece of measurement identification information may include "measId", "measObjectId", and "reportConfigID".

Since an NR base station may have a plurality of SCSs of the SS/PBCH to be transmitted, "MeasObjectNR" information may indicate the SCS value of the SS/PBCH block to be measured. In addition, since several SS/PBCH blocks may be located in the operating cell, the base station is able to inform the terminal of the frequency position of the SS/PBCH block that is to be measured by the terminal. Since an NR terminal has one or more configured BWPs, the base station is capable of configuring one or more BWPs to be measured and informing the terminal of the same. The terminal may measure the BWP, based on the information received from the base station. Alternatively, the NR terminal is capable of measuring the SS/PBCH block or the CSI-RS included in the activated BWP.

See Table 1 for the MeasObjectNR information element.

In addition, configuration information related to cell measurement, such as "s-MeasureConfig", "quantityConfig", "measGapConfig", and "measGapSharingConfig", may be provided as the measurement configuration to the terminal. If the first base station 3e-02 or the second base station 3e-03 according to the embodiment configures at least one of event A3 or event A5 to the terminal 3e-01, "reportConfigNR" includes an indicator indicating whether the SpCell is the PCell of the MCG or the PSCell of the SCG. The indicator according to the embodiment may indicate the same by one of the following methods.

Method 1: usePSCell BOOLEAN OPTIONAL NEED M usePSCell: This may denote a field indicating whether to apply the PSCell of the SCG or the PCell of the MCG to at least one of event A3 or event A5.

BOOLEAN: "usePSCell" may be configured as 1 bit, and if it is set to 0 (or "FALSE"), the terminal 3e-01 applies the PCell of the MCG to at least one of event A3 or event A5 configured in "reportConfigNR" mapped to "reportConfigId", thereby determining measurement reporting triggering conditions. If it is set to 1 (or "TRUE"), the terminal 3e-01 may apply the PSCell of the SCG to at least one of event A3 or event A5 configured in "reportConfigNR" mapped to "reportConfigId", thereby determining measurement reporting triggering conditions.

OPTIONAL NEED M: "reportConfigNR" mapped to "reportConfigId" may selectively include the field "usePSCell". If the field "usePSCell" is set to 0, the terminal 3e-01 may store the same, and may apply the PCell of the MCG to at least one of event A3 or event A5, thereby determining measurement reporting triggering conditions. Therefore, even though "usePSCell" is not signaled later, the terminal may apply the PCell of the MCG to at least one of event A3 or event A5, thereby determining measurement reporting triggering conditions. If the field "usePSCell" is set to 1, the terminal 3e-01 may store the same, and may apply the PSCell of the SCG to at least one of event A3 or event A5, thereby determining measurement reporting triggering conditions. Therefore, even though "usePSCell" is not signaled later, the terminal may apply the PSCell of the SCG to at least one of event A3 or event A5, thereby determining measurement reporting triggering conditions.

Method 2: usePSCell ENUMERATED {true} OPTIONAL NEED R usePSCell: This may denote a field indicating whether to apply the PSCell of the SCG or the PCell of the MCG to at least one of event A3 or event A5.

ENUMERATED {true}: "usePSCell" may be configured as 1 bit, and if it is not set to "TRUE", the terminal 3e-01 applies the PCell of the MCG to at least one of event A3 or event A5 configured in "reportConfigNR" mapped to "reportConfigId", thereby determining measurement reporting triggering conditions. If it is set to "TRUE", the terminal 3e-01 may apply the PSCell of the SCG to at least one of event A3 or event A5 configured in "reportConfigNR" mapped to "reportConfigId", thereby determining measurement reporting triggering conditions.

OPTIONAL NEED R: "reportConfigNR" mapped to "reportConfigId" may selectively include the field "usePSCell". If the field "usePSCell" is not set to "TRUE", the terminal 3e-01 may apply the PCell of the MCG to at least one of event A3 or event A5, thereby determining measurement reporting triggering conditions. Thereafter, the corresponding field may be deleted. Therefore, in the case where "usePSCell" is not signaled later, the terminal may apply the PCell of the MCG to at least one of event A3 or event A5, thereby determining measurement reporting triggering conditions. If the field "usePSCell" is set to 1, the terminal 3e-01 may apply the PSCell of the SCG to at least one of event A3 or event A5, thereby determining measurement reporting triggering conditions. Thereafter, the corresponding field may be deleted. Therefore, in the case where "usePSCell" is not signaled later, the terminal may apply the PCell of the MCG, which is configured by default, to at least one of event A3 or event A5, thereby determining measurement reporting triggering conditions.

In step 3e-80, the terminal 3e-01 that has configured DC may perform measurement, and may determine whether measurement reporting is triggered. If the base station 3e-02 or 3e-03 configures at least one of event A3 or event A5 for the terminal 3e-01 through "reportConfig" in step 3e-70 or step 3e-75, the terminal 3e-01 may determine whether an entering condition or a leaving condition is satisfied for at least one of event A3 or event A5 during "timeToTrigger" through the following equations.

Event A3 Entering Condition $$Mn+Ofn+Ocn-Hys>Mp+Ofp+Ocp+Off \qquad \text{<Equation 1>}$$

Event A3 Leaving Condition $$Mn+Ofn+Ocn+Hys<Mp+Ofp+Ocp+Off \qquad \text{<Equation 2>}$$

If "usePSCell" is set to "TRUE" in "reportConfig", the above equations may be determined by applying the values Mp, Ofp, and Ocp of the PScell. Otherwise, the equations may be determined by applying the values Mp, Ofp, and Ocp of the PCell.

Definition of the parameters used in Equations 1 and 2 may be determined with reference to the 3GPP standards document "38.331: Radio Resource Control (RRC)", and the parameters may be included in "measConfig".

Event A5 Entering Conditions

Inequality A5-1 (Entering Condition 1)

$$Mp+Hys<Thresh1$$

Inequality A5-2 (Entering Condition 2)

$$Mn+Ofn+Ocn-Hys>Thresh2 \quad \text{<Equation 3>}$$

Event A5 Leaving Conditions
Inequality A5-3 (Leaving Condition 1)

$$Mp-Hys>Thresh1$$

Inequality A5-4 (Leaving Condition 2)

$$Mn+Ofn+Ocn+Hys<Thresh2 \quad \text{<Equation 4>}$$

If "usePSCell" is set to "TRUE" in "reportConfig", the equation may be determined by applying the value Mp of the PScell. Otherwise, the equation may be determined by applying the value Mp of the PCell.

Definition of the parameters used in Equations 3 and 4 may be determined with reference to the 3GPP standards document "38.331: Radio Resource Control (RRC)", and the parameters may be included in "measConfig".

If event A3 or event A5 is triggered by SCG measurement configuration in step 3e-80 (for example, if "usePSCell" is set to "TRUE"), a measurement report message ("MeasurementReport") may be transmitted to the first base station 3e-02 or the second base station 3e-03 depending on whether or not SRB3 is configured in the terminal 3e-01. The terminal 3e-01 configured with SRB3 may transmit a measurement report message ("MeasurementReport") to the second base station 3e-03 (3e-85). The terminal 3e-01, which is not configured with SRB3, may transmit a UE information transmission message for MRDC ("ULInformationTransferMRDC") containing a measurement report message to the first base station 3e-02, or may transmit a measurement report message to the first base station 3e-02 (3e-90).

Figure 3F:
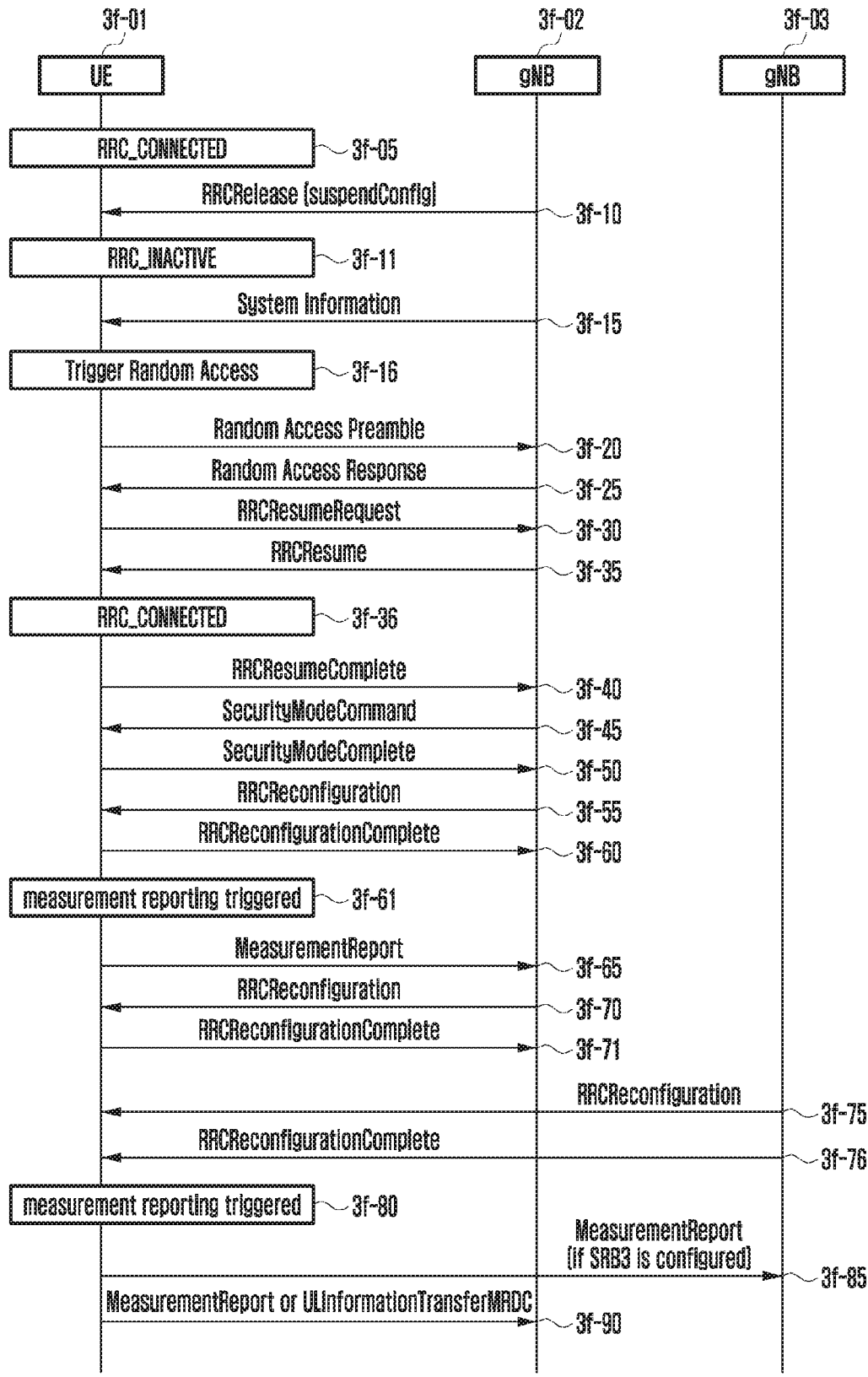
FIG. 3F illustrates a diagram of a procedure in which a terminal establishing dual connectivity (hereinafter, referred to as "DC") reports a measurement result to a base station, based on a measurement configuration according to an embodiment.

FIG. 3F illustrates a diagram of a procedure in which a terminal configuring dual connectivity (hereinafter, referred to as "DC") reports a measurement result to a base station, based on a measurement configuration according to an embodiment.

Referring to FIG. 3F, a terminal 3f-01 may establish an RRC connection with a base station 3f-02 to thus switch to an RRC-connected mode (3f-05). If there is no transmission or reception of data for a predetermined reason or for a predetermined time, the base station 3f-02 may transmit an RRC connection release message ("RRCRelease") including suspend configuration information ("suspendConfig") to the terminal 3f-01 (3f-10). Upon receiving the RRC connection release message, the terminal 3f-01 may switch from the RRC-connected mode to an RRC inactive mode (3f-11). Meanwhile, in the embodiment, the same reference numeral is used for the base station in step 3f-10 and the base stations in step 3f-15 and steps subsequent thereto for the convenience of description, but the base stations prior to step 3f-15 and the base stations in the step 3f-15 and steps subsequent thereto may be different from each other depending on the mobility of the terminal and the results of selection and reselection of the cell.

The terminal 3f-01 in the RRC inactive mode may discover an appropriate cell through a cell selection procedure and/or a cell reselection procedure to thus camp thereon, thereby receiving system information (3f-15). The terminal 3f-01 may perform random access to the base station 3f-02 in order to establish an RRC connection therewith. When the random access is triggered (3f-16), the terminal 3f-01 may select a PRACH occasion, thereby transmitting a random access preamble to the base station 3f-02 (3f-20). Upon receiving the random access preamble, the base station 3f-02 may transmit a random access response (hereinafter, referred to as "RAR") message to the terminal 3f-01 (3f-25). The terminal 3f-01 in the RRC inactive mode may establish reverse-link transmission synchronization with the base station 3f-02 through steps 3f-20 and 3f-25.

The terminal 3f-01 having established the reverse-link transmission synchronization may perform an RRC connection resume procedure with the base station 3f-02. First, the terminal 3f-01 may transmit an RRC connection resume request message ("RRCResumeRequest") to the base station 3f-02 (3f-30). The RRC connection resume request message may include, for example, an identifier of the terminal 3f-01 ("resumeIdentity"), a cause for resuming an RRC connection ("resumeCause"), and the like. If the RRC connection resume request message is received, the base station 3f-02 may transmit an RRC connection resume message ("RRCResume") to the terminal 3f-01 (3f-35). The RRC connection resume message may include at least one piece of radio bearer configuration information ("radioBearerConfig"), master cell group configuration information ("masterCellGroup"), and measurement configuration ("measConfig"). If the RRC connection resume message is received, the terminal 3f-01 may apply the received information, and may then switch to an RRC-connected mode (3f-36). The RRC connection resume may involve a connection of signaling radio bearer1 (SRB1). Therefore, an RRC message, which is a control message between the terminal 3f-01 and the base station 3f-02, an RRC message including a NAS message, or an initial NAS message may be transmitted and received between the terminal 3f-01 and the base station 3f-02 through SRB1. The terminal 3f-01 that has switched to the RRC-connected mode may transmit an RRC connection resume completion message ("RRCResumeComplete") to the base station 3f-02 through SRB1 (3f-40). If the RRC connection resume procedure is successfully performed, the base station 3f-02 may transmit a security mode command message ("SecurityModeCommand") to the terminal 3f-01 in order to activate AS security with respect to the terminal 3f-01 in the RRC-connected mode (3f-45). When the security mode command message is received and the AS security is activated, the terminal 3f-01 may transmit a security mode completion message ("SecurityModeComplete") to the base station (3f-50).

The base station 3f-02 may perform an RRC connection reconfiguration procedure with the terminal 3f-01 at the time of transmitting the security mode command message, after transmitting the security mode command message, or after receiving the security mode completion message. The base station 3f-02 may transmit an RRC connection reconfiguration message ("RRCReconfiguration") to the terminal 3f-01 (3f-55). The RRC connection reconfiguration message may include at least one piece of radio bearer configuration information ("radioBearerConfig"), master cell group information ("masterCellGroup"), or measurement configuration ("measConfig"). Upon receiving the RRC connection reconfiguration message, the terminal 3f-01 may apply the above information, and may then transmit an RRC connection reconfiguration completion message ("RRCReconfigurationComplete") to the base station 3f-02 (3f-60).

If the RRC connection reconfiguration message includes measurement configuration ("measConfig") in step 3f-55, the terminal 3f-01 in the RRC-connected mode may perform measurement by applying the information, and, if measurement reporting is triggered (3f-61), may transmit a measurement report message ("MeasurementReport") to the base station 3f-02 (3f-65).

The base station 3f-02 having successfully received the measurement report message may discuss with another base station 3*f*-03, and may then perform an RRC connection reconfiguration procedure in order to establish dual connectivity (DC) with respect to the terminal 3*f*-01 in the RRC-connected mode. DC according to an embodiment refers to a technique in which a terminal receives a wireless communication service through a master cell group (hereinafter, referred to as an "MCG") and a secondary cell group (hereinafter, referred to as an "SCG"). According to an embodiment, the first base station 3*f*-02 may denote an MCG, and the second base station 3*f*-03 may denote an SCG. The MCG may include a primary cell (hereinafter, referred to as a "PCell"), or may include a PCell and one or more secondary cells (hereinafter, referred to as "SCells"). The SCG may include a primary SCG cell (hereinafter, referred to as a "PSCell"), or may include a PSCell and one or more SCells. If DC is configured for the terminal 3*f*-01, a special cell may be a PCell of the MCG or a PSCell of the SCG.

The second base station 3*f*-03 may produce a message including at least one piece of NR secondary cell group information ("nr-SCG") or radio bearer configuration information 2 ("radioBearerConfig2") and transmit the same to the first base station 3*f*-02 in order to configure DC for the terminal 3*f*-01, and the first base station 3*f*-02 receiving the message may transmit an RRC connection reconfiguration message including the information to the terminal 3*f*-01 (3*f*-70). The secondary cell group information included in the RRC connection reconfiguration message may include at least one piece of secondary cell group configuration information ("secondaryCellGroup") and measurement configuration ("measConfig"). Alternatively, in the case where SRB3 is configured in the terminal 3*f*-01, the second base station 3*f*-03 may directly transmit, to the terminal, an RRC connection reconfiguration message including at least one piece of NR secondary cell group information ("nr-SCG") and radio bearer configuration information 2 ("radioBearerConfig2") (3*f*-75). The terminal 3*f*-02 having successfully received the RRC connection reconfiguration message from the first base station 3*f*-02 may apply the configuration information, and may then transmit an RRC connection reconfiguration completion message to the first base station 3*f*-02 (3*f*-71). The terminal 3*f*-01 may transmit/receive data to/from the first base station 3*f*-02 and the second base station 3*f*-03. Alternatively, the terminal 3*f*-01 having successfully received the RRC connection reconfiguration message from the second base station 3*f*-03 may apply the configuration information, and may then transmit an RRC connection reconfiguration completion message to the second base station 3*f*-03 (3*f*-76).

If the RRC connection reconfiguration message includes measurement configuration ("measConfig") in step 3*f*-70 or 3*f*-75, the terminal 3*f*-01 may apply the received measurement configuration and then store the same. The measurement configuration may include at least one of "measObjectToRemoveList", "measObjectToAddModList", "reportConfigToRemoveList", "reportConfigToAddModList", "measIdToRemoveList", and "measIdToAddModList", measObjectToRemoveList: This may denote a list including one or more "MeasObjectIds" to be removed (an identifier used to identify a measurement object configuration).

measObjectToAddModList: This may denote a list including one or more pieces of measurement object information to be added or modified. Each piece of measurement object information may include "measObjectId" and "measObject" (a measurement object). One of "measObjectNR" for NR and "measObjectEUTRA" for LTE may be selected and contained in "measObject".

reportConfigToRemoveList: This may denote a list including one or more "ReportConfigIDs" to be removed (identifiers used to identify measurement reporting configurations).

reportConfigToAddModList: This may denote a list including one or more pieces of reporting configuration information to be added or modified. Each piece of reporting configuration information may include "reportConfigId" and "reportConfig". One of "reportConfigNR" for NR and "reportConfigInterRAT" for another radio access technology may be selected and contained in "reportConfig".

"reportConfigNR" may include information on criteria for triggering an NR measurement reporting event. For example, the first base station 3*f*-02 or the second base station 3*f*-03 may include information on criteria for triggering event A3 or event A5 in "reportConfigNR".

Event A3: the case in which the measurement result/signal of a neighboring cell becomes greater than the measurement result/signal of an SpCell by an offset Event A5: the case in which the measurement result/signal of an SpCell becomes less than a specific value (threshold1) and in which the measurement result/signal of a neighboring cell/Scell becomes greater than a specific value (threshold 2)

measIdToRemoveList: This may denote a list including one or more "MeasIds" to be removed (an identifier used to identify a measurement configuration and connecting "MeasObjectId" and "ReportConfigId").

measIdToAddModList: This may denote a list including one or more pieces of measurement identification information (measurement identities) to be added or modified. Each piece of measurement identification information may include "measId", "measObjectId", and "reportConfigID".

Since an NR base station may have a plurality of SCSs of the SS/PBCH to be transmitted, "MeasObjectNR" information may indicate the SCS value of the SS/PBCH block to be measured. Since an NR terminal has one or more configured BWPs, the base station is capable of configuring one or more BWPs to be measured and informing the terminal of the same. The terminal may measure the BWP, based on the information received from the base station. Alternatively, the NR terminal is capable of measuring the SS/PBCH block or the CSI-RS included in the activated BWP.

See Table 1 for the MeasObjectNR information element.

In addition, configuration information related to cell measurement, such as "s-MeasureConfig", "quantityConfig", "measGapConfig", and "measGapSharingConfig", may be provided as the measurement configured to the terminal. If the first base station 3*f*-02 or the second base station 3*f*-03 according to the embodiment configures at least one of event A3 or event A5 for the terminal 3*f*-01, "reportConfigNR" includes an indicator indicating whether the SpCell is the PCell of the MCG or the PSCell of the SCG. The indicator according to the embodiment may indicate the same by one of the following methods.

Method 1: usePSCell BOOLEAN OPTIONAL NEED M usePSCell: This may denote a field indicating whether to apply the PSCell of the SCG or the PCell of the MCG to at least one of event A3 or event A5.

BOOLEAN: "usePSCell" may be configured as 1 bit, and if it is set to 0 (or "FALSE"), the terminal 3*f*-01 applies the PCell of the MCG to at least one of event A3 or event A5 configured in "reportConfigNR" mapped to "reportConfigId", thereby determining measurement reporting triggering conditions. If it is set to 1 (or "TRUE"), the terminal 3f-01 may apply the PSCell of the SCG to at least one of event A3 or event A5 configured in "reportConfigNR" mapped to "reportConfigId", thereby determining measurement reporting triggering conditions.

OPTIONAL NEED M: "reportConfigNR" mapped to "reportConfigId" may selectively include the field "usePSCell". If the field "usePSCell" is set to 0, the terminal 3f-01 may store the same, and may apply the PCell of the MCG to at least one of event A3 or event A5, thereby determining measurement reporting triggering conditions. Therefore, even though "usePSCell" is not signaled later, the terminal may apply the PCell of the MCG to at least one of event A3 or event A5, thereby determining measurement reporting triggering conditions. If the field "usePSCell" is set to 1, the terminal 3f-01 may store the same, and may apply the PSCell of the SCG to at least one of event A3 or event A5, thereby determining measurement reporting triggering conditions. Therefore, even though "usePSCell" is not signaled later, the terminal may apply the PSCell of the SCG to at least one of event A3 or event A5, thereby determining measurement reporting triggering conditions.

Method 2: usePSCell ENUMERATED {true} OPTIONAL NEED R usePSCell: This may denote a field indicating whether to apply the PSCell of the SCG or the PCell of the MCG to at least one of event A3 or event A5.

ENUMERATED {true}: "usePSCell" may be configured as 1 bit, and if it is not set to "TRUE", the terminal 3f-01 applies the PCell of the MCG to at least one of event A3 or event A5 configured in "reportConfigNR" mapped to "reportConfigId", thereby determining measurement reporting triggering conditions. If it is set to "TRUE", the terminal 3f-01 may apply the PSCell of the SCG to at least one of event A3 or event A5 configured in "reportConfigNR" mapped to "reportConfigId", thereby determining measurement reporting triggering conditions.

OPTIONAL NEED R: "reportConfigNR" mapped to "reportConfigId" may selectively include the field "usePSCell". If the field "usePSCell" is not set to "TRUE", the terminal 3f-01 may apply the PCell of the MCG to at least one of event A3 or event A5, thereby determining measurement reporting triggering conditions. Thereafter, the corresponding field may be deleted. Therefore, in the case where "usePSCell" is not signaled later, the terminal may apply the PCell of the MCG, which is configured by default, to at least one of event A3 or event A5, thereby determining measurement reporting triggering conditions. If the field "usePSCell" is set to 1, the terminal 3f-01 may apply the PSCell of the SCG to at least one of event A3 or event A5, thereby determining measurement reporting triggering conditions. Thereafter, the corresponding field may be deleted. Therefore, in the case where "usePSCell" is not signaled later, the terminal may apply the PCell of the MCG, which is configured by default, to at least one of event A3 or event A5, thereby determining measurement reporting triggering conditions.

In step 3f-80, the terminal 3f-01 that has configured DC may perform measurement, and may determine whether measurement reporting is triggered. If the base station 3f-02 or 3f-03 configures at least one of event A3 or event A5 for the terminal 3f-01 through "reportConfig" in step 3f-70 or step 3f-75, the terminal may determine whether an entering condition or a leaving condition is satisfied for at least one of event A3 or event A5 during "timeToTrigger" through the following equations.

Event A3 Entering Condition $$Mn+Ofn+Ocn-Hys>Mp+Ofp+Ocp+Off \qquad <\text{Equation 1}>$$

Event A3 Leaving Condition $$Mn+Ofn+Ocn+Hys<Mp+Ofp+Ocp+Off \qquad <\text{Equation 2}>$$

If "usePSCell" is set to "TRUE" in "reportConfig", the above equations may be determined by applying the values Mp, Ofp, and Ocp of the PScell. Otherwise, the equations may be determined by applying the values Mp, Ofp, and Ocp of the PCell.

Definition of the parameters used in Equations 1 and 2 may be determined with reference to the 3GPP standards document "38.331: Radio Resource Control (RRC)", and the parameters may be included in "measConfig".

Event A5 Entering Conditions
Inequality A5-1 (Entering Condition 1)

$$Mp+Hys<\text{Thresh1}$$

Inequality A5-2 (Entering Condition 2)

$$Mn+Ofn+Ocn-Hys>\text{Thresh2} \qquad <\text{Equation 3}>$$

Event A5 Leaving Conditions
Inequality A5-3 (Leaving Condition 1)

$$Mp-Hys>\text{Thresh1}$$

Inequality A5-4 (Leaving Condition 2)

$$Mn+Ofn+Ocn+Hys<\text{Thresh2} \qquad <\text{Equation 4}>$$

If "usePSCell" is set to "TRUE" in "reportConfig", the equations may be determined by applying the value Mp of the PScell. Otherwise, the equations may be determined by applying the value Mp of the PCell.

Definition of the parameters used in Equations 3 and 4 may be determined with reference to the 3GPP standards document "38.331: Radio Resource Control (RRC)", and the parameters may be included in "measConfig".

If event A3 or event A5 is triggered by SCG measurement configuration in step 3f-80 (for example, if "usePSCell" is set to "TRUE"), a measurement report message ("MeasurementReport") may be transmitted to the first base station 3f-02 or the second base station 3f-03 depending on whether or not SRB3 is configured in the terminal 3f-01. The terminal 3f-01 configured with SRB3 may transmit a measurement report message ("MeasurementReport") to the second base station 3f-03 (3f-85). The terminal 3f-01, which is not configured with SRB3, may transmit a UE information transmission message for MRDC ("ULInformationTransfer-MRDC") containing a measurement report message to the first base station 3f-02, or may transmit a measurement report message to the first base station 3f-02 (3f-90).

Figure 3G:
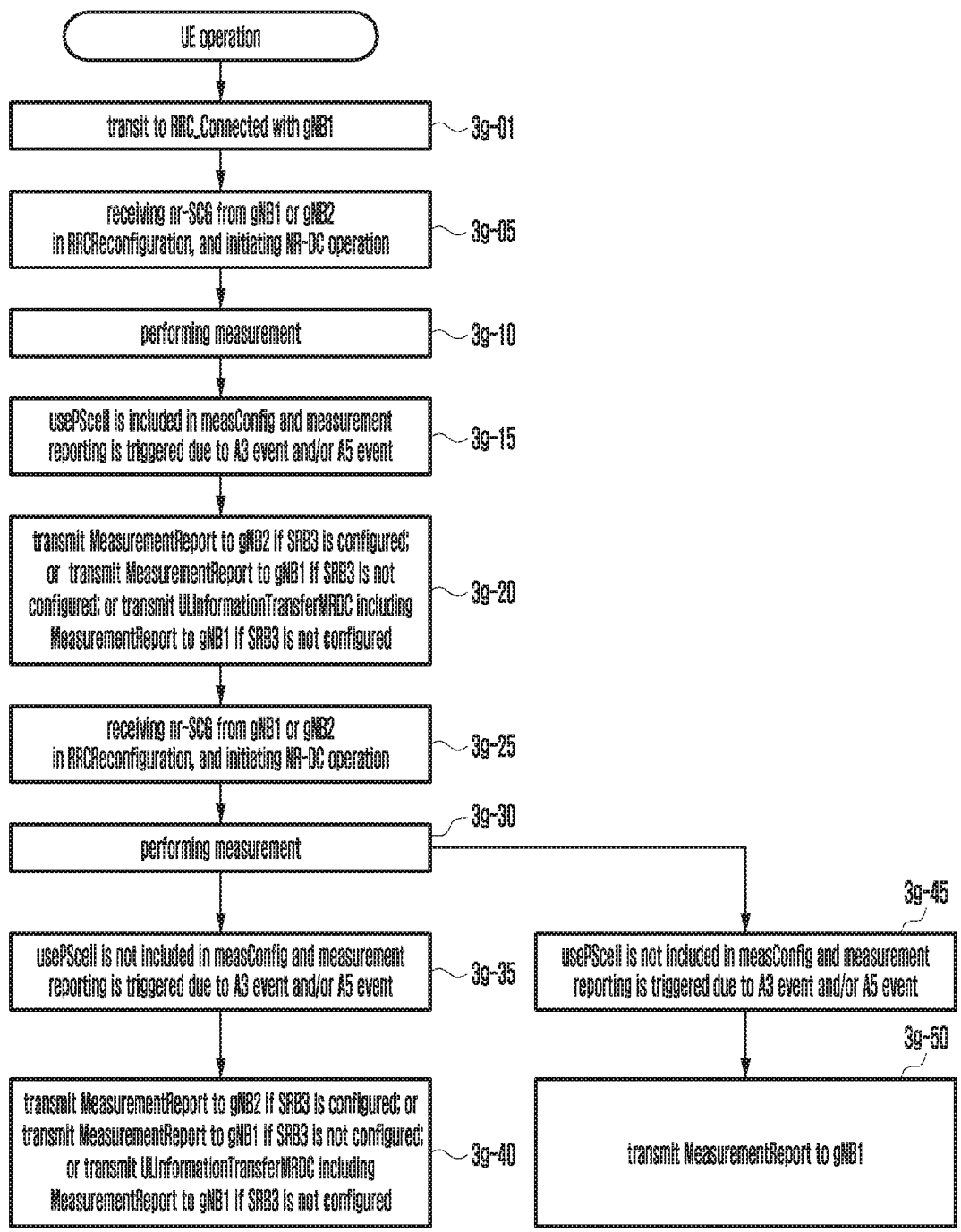
FIG. 3G illustrates a flowchart of an operation in which a terminal establishing dual connectivity (hereinafter, referred to as "DC") reports a measurement result to a base station when measurement reporting is triggered according to an embodiment.

FIG. 3G illustrates a flowchart of an operation in which a terminal configuring dual connectivity (hereinafter, referred to as "DC") reports a measurement result to a base station when measurement reporting is triggered according to an embodiment.

In step 3g-01, the terminal may establish an RRC connection with the first NR base station to thus switch to an RRC-connected mode.

In step 3g-05, if an RRC connection reconfiguration message received from the first base station or the second base station includes configuration information on an NR- DC operation ("nr-SCG"), the terminal may store the same, and may perform the NR-DC operation.

In step 3g-10, the terminal may perform measurement.

In step 3g-15, the measurement configuration ("measConfig") received by the terminal may indicate "usePSCell", and event A3 or event A5 may occur by the SCG configuration, thereby triggering measurement reporting.

In step 3g-20, in the case where SRB3 is configured in the terminal, a measurement result message ("MeasurementReport") including a measurement result may be transmitted to the second base station. Alternatively, in the case where SRB3 is not configured in the terminal in step 3g-20, a measurement result message including a measurement result may be transmitted to the first base station. Alternatively, in the case where SRB3 is not configured in the terminal in steps 3g-20, a UE information transmission message for MRDC ("ULInformationTransferMRDC") containing a measurement report message including a measurement result may be transmitted to the first base station.

In step 3g-25, if an RRC connection reconfiguration message received from the first base station or the second base station includes configuration information on an NR-DC operation ("nr-SCG"), the terminal may store the same, and may perform the NR-DC operation.

In step 3g-30, the terminal may perform measurement.

In step 3g-35, if the measurement configuration ("measConfig") received by the terminal does not indicate "usePSCell", and if the first base station or the second base station configures "reportConfigNR" by method 1 in the embodiment described above, when event A3 or event A5 occurs by applying the PSCell, measurement reporting may be triggered.

In step 3g-40, if SRB3 is configured in the terminal, a measurement result message ("MeasurementReport") including a measurement result may be transmitted to the second base station. Alternatively, if SRB3 is not configured in the terminal in step 3g-40, a measurement result message including a measurement result may be transmitted to the first base station. Alternatively, if SRB3 is not configured in the terminal in steps 3g-40, a UE information transmission message for MRDC ("ULInformationTransferMRDC") containing a measurement report message including a measurement result may be transmitted to the first base station.

In step 3g-45, if the measurement configuration ("measConfig") received by the terminal does not indicate "usePSCell", and if the first base station or the second base station configures "reportConfigNR" by method 2 in the embodiment described above, when event A3 or event A5 occurs by applying the PCell, measurement reporting may be triggered.

In step 3g-50, the terminal may transmit a measurement result message including a measurement result to the first base station.

Figure 3H:
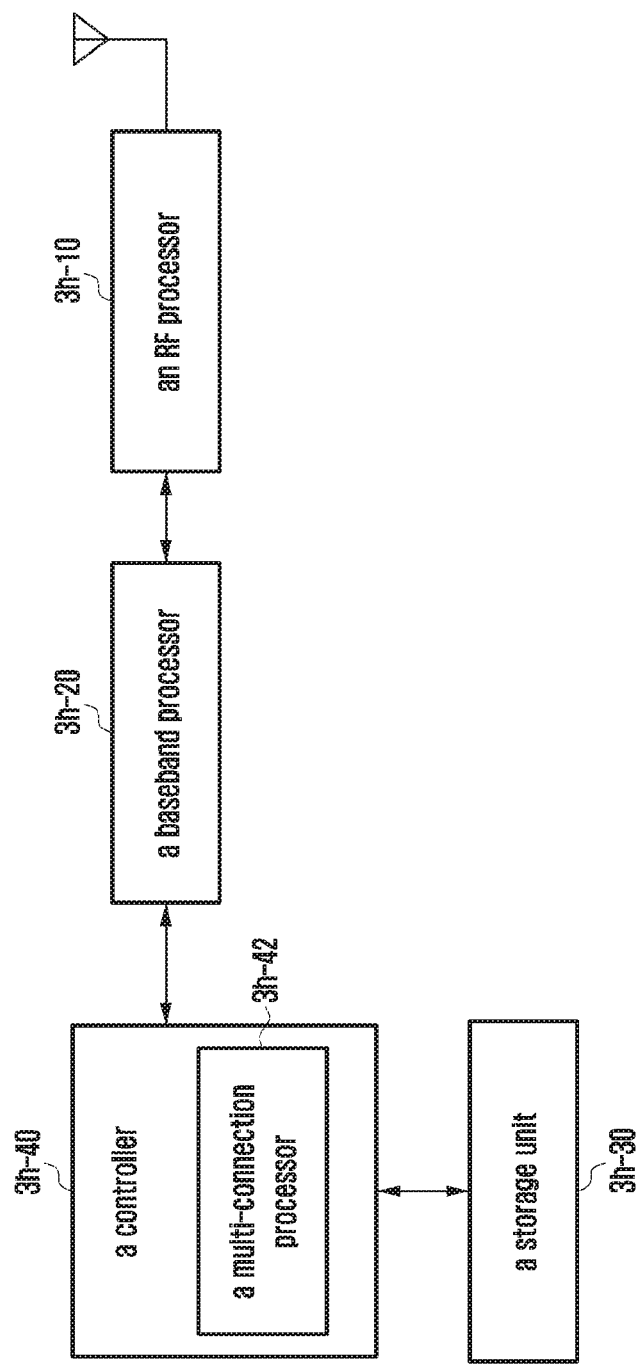
FIG. 3H illustrates a diagram of the configuration of a terminal according to an embodiment.

FIG. 3H illustrates a block diagram of the internal configuration of a terminal according to an embodiment.

Referring to FIG. 3H, the terminal includes a radio frequency (RF) processor 3h-10, a baseband processor 3h-20, a storage unit 3h-30, and a controller 3h-40. The controller 3h-40 may further include a multi-connection processor 3h-42.

The RF processor 3h-10 performs a function of transmitting and receiving a signal through a radio channel, such as band conversion and amplification of a signal. That is, the RF processor 3h-10 up-converts a baseband signal provided from the baseband processor 3h-20 to an RF band signal to thus transmit the same through an antenna, and down-converts an RF band signal received through the antenna to a baseband signal. For example, the RF processor 3h-10 may include a transmission filter, a reception filter, an amplifier, a mixer, an oscillator, a digital-to-analog converter (DAC), an analog-to-digital converter (ADC), and the like. Although only one antenna is illustrated in FIG. 3h, the terminal may have a plurality of antennas. In addition, the RF processor 3h-10 may include a plurality of RF chains. Further, the RF processor 3h-10 may perform beamforming. To perform beamforming, the RF processor 3h-10 may adjust the phases and magnitudes of signals transmitted and received through a plurality of antennas or antenna elements. In addition, the RF processor may perform MIMO, and may receive multiple layers when performing the MIMO operation.

The baseband processor 3h-20 performs a function of conversion between a baseband signal and a bit string according to the physical layer specification of the system. For example, in the case of data transmission, the baseband processor 3h-20 encodes and modulates transmission bit strings, thereby generating complex symbols. In addition, upon receiving data, the baseband processor 3h-20 demodulates and decodes a baseband signal provided from the RF processor 3h-10 to thus recover reception bit strings. For example, in the case where an orthogonal frequency division multiplexing (OFDM) scheme is applied, when transmitting data, the baseband processor 3h-20 generates complex symbols by encoding and modulating transmission bit strings, maps the complex symbols to subcarriers, and then configures OFDM symbols through an inverse fast Fourier transform (IFFT) operation and cyclic prefix (CP) insertion. In addition, when receiving data, the baseband processor 3h-20 divides the baseband signal provided from the RF processor 3h-10 into OFDM symbol units, restores the signals mapped to the subcarriers through a fast Fourier transform (FFT) operation, and then restores reception bit strings through demodulation and decoding.

The baseband processor 3h-20 and the RF processor 3h-10 transmit and receive signals as described above. Accordingly, the baseband processor 3h-20 and the RF processor 3h-10 may be referred to as a "transmitter", a "receiver", a "transceiver", or a "communication unit". Further, at least one of the baseband processor 3h-20 and the RF processor 3h-10 may include a plurality of communication modules in order to support a plurality of different radio access techniques. In addition, at least one of the baseband processor 3h-20 and the RF processor 3h-10 may include different communication modules to process signals in different frequency bands. For example, the different radio access techniques may include a wireless LAN (e.g., IEEE 802.11), a cellular network (e.g., LTE), and the like. In addition, the different frequency bands may include super-high frequency (SHF) (e.g., 2.NRHz or NRHz) bands or millimeter wave (e.g., 60 GHz) bands.

The storage unit 3h-30 stores data such as fundamental programs, application programs, and configuration information for the operation of the terminal. In particular, the storage unit 3h-30 may store information related to a second access node that performs wireless communication using a second radio access technique. In addition, the storage unit 3h-30 provides the stored data at the request of the control unit 3h-40.

The controller 3h-40 controls the overall operation of the terminal. For example, the controller 3h-40 transmits and receives signals through the baseband processor 3h-20 and the RF processor 3h-10. In addition, the controller 3h-40 records and reads data in and from the storage unit 3h-30. To this end, the controller 3h-40 may include at least one processor. For example, the controller 3h-40 may include a communication processor (CP) for controlling communication and an application processor (AP) for controlling higher-layers such as application programs.

Figure 3I:
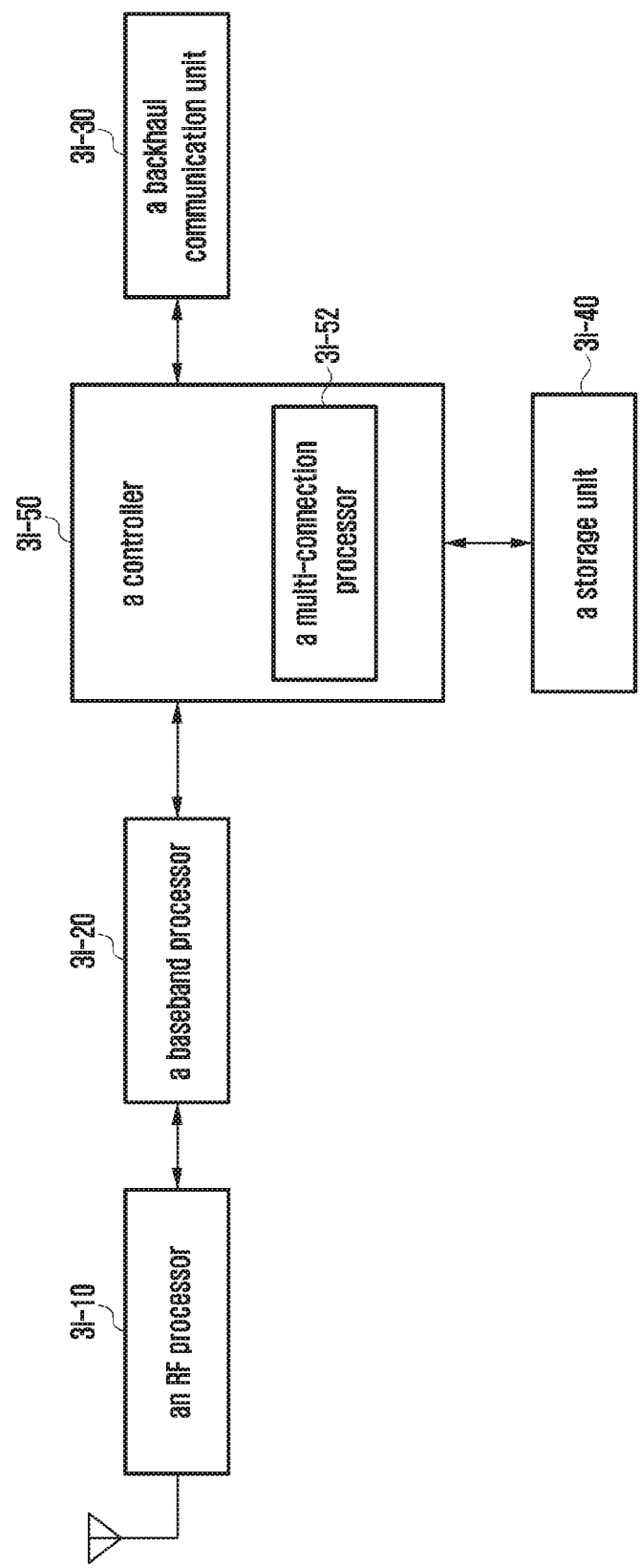
FIG. 3I illustrates a diagram of the configuration of a base station according to an embodiment.

FIG. 3I illustrates a diagram of the configuration of a base station according to an embodiment.

As shown in FIG. 3I, the base station includes an RF processor 3i-10, a baseband processor 3i-20, a backhaul communication unit 3i-30, a storage unit 3i-40, and a controller 3i-50. The controller 3i-50 may further include a multi-connection processor 3i-52.

The RF processor 3i-10 performs a function of transmitting and receiving signals, such as band conversion and amplification of a signal, through a radio channel. That is, the RF processor 3i-10 up-converts a baseband signal provided from the baseband processor 3i-20 to an RF band signal to thus transmit the same through an antenna, and down-converts an RF band signal received through the antenna to a baseband signal. For example, the RF processor 3i-10 may include a transmission filter, a reception filter, an amplifier, a mixer, an oscillator, a DAC, an ADC, and the like. Although only one antenna is shown in the drawing, the first access node may have a plurality of antennas. In addition, the RF processor 3i-10 may include a plurality of RF chains. Further, the RF processor 3i-10 may perform beamforming. To perform beamforming, the RF processor 3i-10 may adjust the phases and magnitudes of signals transmitted and received through a plurality of antennas or antenna elements. The RF processor may perform a downlink MIMO operation by transmitting one or more layers.

The baseband processor 3i-20 performs a function of conversion between a baseband signal and a bit string according to a physical layer specification of a first radio access technique. For example, in the case of data transmission, the baseband processor 3i-20 encodes and modulates transmission bit strings, thereby generating complex symbols. In addition, when receiving data, the baseband processor 3i-20 demodulates and decodes a baseband signal provided from the RF processor 3i-10 to thus recover reception bit strings. For example, in the case where an OFDM scheme is applied, when transmitting data, the baseband processor 3i-20 generates complex symbols by encoding and modulating transmission bit strings, maps the complex symbols to subcarriers, and then configures OFDM symbols through the IFFT operation and CP insertion. In addition, when receiving data, the baseband processor 3i-20 divides the baseband signal provided from the RF processor 3i-10 into OFDM symbol units, restores the signals mapped to the subcarriers through the FFT operation, and then restores reception bit strings through demodulation and decoding. The baseband processor 3i-20 and the RF processor 3i-10 transmit and receive signals as described above. Accordingly, the baseband processor 3i-20 and the RF processor 3i-10 may be referred to as a "transmitter", a "receiver", a "transceiver", a "communication unit", or a "wireless communication unit".

The backhaul communication unit 3i-30 provides an interface for performing communication with other nodes in the network. That is, the backhaul communication unit 3i-30 converts a bit string, transmitted from the base station to another node, such as a secondary base station, a core network, etc., into a physical signal, and converts physical signals received from other nodes into bit strings.

The storage unit 3i-40 stores data such as fundamental programs, application programs, and configuration information for the operation of the base station. In particular, the storage unit 3i-40 may store information about bearers allocated to a connected terminal, a measurement result reported from a connected terminal, and the like. In addition, the storage unit 3i-40 may store information that is a criterion for determining whether a multi-connection is provided to the terminal or is released. In addition, the storage unit 3i-40 provides the stored data in response to a request from the controller 3i-50.

The controller 3i-50 controls the overall operation of the base station. For example, the controller 3i-50 transmits and receives signals through the baseband processor 3i-20 and the RF processor 3i-10 or the backhaul communication unit 3i-30. In addition, the controller 3i-50 records and reads data in and from the storage unit 3i-40. To this end, the controller 3i-50 may include at least one processor.

The details in the block diagram $00 of electronic device #01 for supporting legacy network communication and 5G network communication described with reference to FIG. 1H may also be applied to the third embodiment.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal configured with a dual connectivity (DC), the method comprising:
   receiving configuration information related to a measurement including measurement object information, wherein the measurement object information includes a frequency of a synchronization signal block (SSB) and a measurement timing configuration information of the SSB;
   determining a reference cell to which the measurement timing configuration information of the SSB is applied based on a type of a signaling radio bearer (SRB) for which the configuration information is provided;
   measuring the SSB on the frequency of the SSB based on the reference cell and the measurement timing configuration information of the SSB; and
   transmitting a measurement report including a measurement result of the SSB on the frequency of the SSB,
   wherein the measurement timing configuration information includes at least one of a duration, a period, or an offset, and
   wherein a measurement duration of the SSB is determined based on a system frame number of the reference cell, a subframe of the reference cell and at least one of the duration, the period, or the offset included in the measurement timing configuration information.

2. The method of claim 1, wherein the reference cell corresponds to a primary cell (PCell) of a master cell group (MCG), in case that the configuration information is received via a signaling radio bearer1 (SRB1).

3. The method of claim 1, wherein the reference cell corresponds to a primary secondary cell (PSCell) of a secondary cell group (SCG), in case that the configuration information is received via a signaling radio bearer 3 (SRB3).

4. The method of claim 1, wherein the reference cell corresponds to a primary cell (PSCell) of a secondary cell group (SCG) even though the configuration information is received via a SRB 1, in case that a SRB 3 is not configured and the configuration information is generated by a base station of a SCG.

5. A terminal configured with a dual connectivity (DC), the terminal comprising:

a transceiver; and
a controller configured to:
receive, via the transceiver, configuration information related to a measurement including measurement object information, wherein the measurement object information includes a frequency of a synchronization signal block (SSB) and a measurement timing configuration information of the SSB,
determine a reference cell to which the measurement timing configuration information of the SSB is applied based on a type of a signaling radio bearer (SRB) for which the configuration information is provided,
measure the SSB on the frequency of the SSB based on the reference cell and the measurement timing configuration information of the SSB, and
transmit, via the transceiver, a measurement report including a measurement result of the SSB on the frequency of the SSB,
wherein the measurement timing configuration information includes at least one of a duration, a period, or an offset, and
wherein a measurement duration of the SSB is determined based on a system frame number of the reference cell, a subframe of the reference cell and at least one of the duration, the period, or the offset included in the measurement timing configuration information.

6. The terminal of claim 5, wherein the reference cell corresponds to a primary cell (PCell) of a master cell group (MCG), in case that the configuration information is received via a signaling radio bearer1 (SRB1).

7. The terminal of claim 5, wherein the reference cell corresponds to a primary secondary cell (PSCell) of a secondary cell group (SCG), in case that the configuration information is received via a signaling radio bearer 3 (SRB3).

8. The terminal of claim 5, wherein the reference cell corresponds to a primary secondary cell (PSCell) of a secondary cell group (SCG) even though the configuration information is received via a SRB 1, in case that a SRB 3 is not configured and the configuration information is generated by a base station of a SCG.

9. A method performed by a base station, the method comprising:
transmitting, to a terminal configured with a dual connectivity (DC), configuration information related to a measurement including measurement object information, wherein the measurement object information includes a frequency of a synchronization signal block (SSB) and a measurement timing configuration information of the SSB;
receiving, from the terminal, a measurement report including a measurement result of the SSB on the frequency of the SSB,
wherein the measurement result is obtained based on a measurement of the SSB on the frequency of the SSB according to a reference cell and the configuration information,
wherein the reference cell to which the measurement timing configuration information of the SSB is applied is determined based on a type of a signaling radio bearer (SRB) for which the configuration information is provided,
wherein the measurement timing configuration information includes at least one of a duration, a period, or an offset, and
wherein a measurement duration of the SSB is determined based on a system frame number of the reference cell, a subframe of the reference cell and at least one of the duration, the period, or the offset included in the measurement timing configuration information.

10. The method of claim 9, wherein the reference cell corresponds to a primary cell (PCell) of a master cell group (MCG), in case that the configuration information is received via a signaling radio bearer1 (SRB1).

11. The method of claim 9, wherein the reference cell corresponds to a primary secondary cell (PSCell) of a secondary cell group (SCG), in case that the configuration information is received via a signaling radio bearer 3 (SRB3).

12. The method of claim 9, wherein the reference cell corresponds to a primary secondary cell (PSCell) of a SCG even though the configuration information is received via a SRB 1, in case that a SRB 3 is not configured and the configuration information is generated by a base station of a secondary cell group (SCG).

13. A base station comprising:
a transceiver; and
a controller configured to:
transmit, to a terminal configured with a dual connectivity (DC) via the transceiver, configuration information related to a measurement including measurement object information, wherein the measurement object information includes a frequency of a synchronization signal block (SSB) and a measurement timing configuration information of the SSB, and
receive, from the terminal via the transceiver, a measurement report including a measurement result of the SSB on the frequency of the SSB,
wherein the measurement result is obtained based on a measurement of the SSB on the frequency of the SSB according to a reference cell and the configuration information,
wherein the reference cell to which the measurement timing configuration information of the SSB is applied is determined based on a type of a signaling radio bearer (SRB) for which the configuration information is provided,
wherein the measurement timing configuration information includes at least one of a duration, a period, or an offset, and
wherein a measurement duration of the SSB is determined based on a system frame number of the reference cell, a subframe of the reference cell and at least one of the duration, the period, or the offset included in the measurement timing configuration information.

14. The base station of claim 13, wherein the reference cell corresponds to a primary cell (PCell) of a master cell group (MCG), in case that the configuration information is received via a signaling radio bearer1 (SRB1).

15. The base station of claim 13, wherein the reference cell corresponds to a primary secondary cell (PSCell) of a secondary cell group (SCG), in case that the configuration information is received via a signaling radio bearer 3 (SRB3).

16. The base station of claim 13, wherein the reference cell corresponds to a primary secondary cell (PSCell) of a SCG even though the configuration information is received via a SRB 1, in case that a SRB 3 is not configured and the configuration information is generated by a base station of a secondary cell group (SCG).

* * * * *